(12) United States Patent
Kitamura

(10) Patent No.: US 8,395,842 B2
(45) Date of Patent: Mar. 12, 2013

(54) METHOD FOR MANUFACTURING AN OPTICAL ELEMENT THAT ENABLES REORDERING AND REPRODUCTION OF A STEREOSCOPIC IMAGE AS A HOLOGRAM

(75) Inventor: Mitsuru Kitamura, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 13/236,123

(22) Filed: Sep. 19, 2011

(65) Prior Publication Data

US 2012/0044551 A1 Feb. 23, 2012

Related U.S. Application Data

(62) Division of application No. 12/009,986, filed on Jan. 23, 2008, now Pat. No. 8,045,267.

(30) Foreign Application Priority Data

Feb. 7, 2007 (JP) .................................. 2007-027792

(51) Int. Cl.
*G02B 5/18* (2006.01)
(52) U.S. Cl. ........ 359/569; 359/572; 359/575; 359/576; 359/9
(58) Field of Classification Search .................. None
See application file for complete search history.

(56) References Cited

U.S. PATENT DOCUMENTS

| 5,113,286 A | 5/1992 | Morrison |
| 5,784,200 A | 7/1998 | Modegi |
| 6,618,190 B2 | 9/2003 | Kitamura et al. |
| 6,865,001 B2 | 3/2005 | Long et al. |
| 6,934,074 B2 | 8/2005 | Kitamura et al. |
| 7,221,496 B2 | 5/2007 | Kitamura |
| 7,573,622 B2 | 8/2009 | Kitamura |
| 8,045,267 B2 * | 10/2011 | Kitamura ..................... 359/569 |
| 2002/0001109 A1 | 1/2002 | Hamano et al. |
| 2004/0027627 A1 | 2/2004 | Kitamura |
| 2007/0206254 A1 | 9/2007 | Kitamura |
| 2007/0216978 A1 | 9/2007 | Kitamura et al. |

(Continued)

FOREIGN PATENT DOCUMENTS

| EP | 0 678 651 | 10/1995 |
| JP | 2002-40219 A | 2/2002 |

(Continued)

OTHER PUBLICATIONS

Japanese Office Action dated Dec. 6, 2011 for Japanese Application No. 2007-027792 and English translation.

(Continued)

*Primary Examiner* — Arnel C Lavarias
(74) *Attorney, Agent, or Firm* — Ladas & Parry LLP

(57) ABSTRACT

A hologram recording medium is manufactured using a computer. On a recording plane, cell position points Q are defined at a pitch Ph along cell position lines f(i) which are arranged on the recording plane at a pitch Pv. For each individual cell position point Q, an amplitude A and a phase θ of a synthetic wave of object light components emitted from a plurality of sample points on an associated image contour are determined by computation. At each individual cell position point Q is positioned a three-dimensional cell C, having a diffraction grating G, with a phase that is in accordance with the phase θ, formed in an effective region E having an area that is in accordance with the amplitude A. The diffraction grating G is formed by periodically positioning staircase steps with a period ξ.

32 Claims, 30 Drawing Sheets

U.S. PATENT DOCUMENTS

| | | |
|---|---|---|
| 2007/0242325 A1 | 10/2007 | Kitamura |
| 2007/0285748 A1 | 12/2007 | Kitamura |
| 2007/0285749 A1 | 12/2007 | Kitamura |
| 2007/0285750 A1 | 12/2007 | Kitamura |
| 2007/0291340 A1 | 12/2007 | Kitamura |
| 2008/0198428 A1 | 8/2008 | Kitamura |
| 2008/0239423 A1 | 10/2008 | Kitamura et al. |
| 2010/0188717 A1 | 7/2010 | Kitamura |
| 2011/0216296 A1* | 9/2011 | Matsubara et al. ............. 355/67 |

FOREIGN PATENT DOCUMENTS

| | | |
|---|---|---|
| JP | 2002-72837 A | 3/2002 |
| JP | 2004-264839 A | 9/2004 |
| JP | 2004-309709 A | 11/2004 |
| JP | 2007-17643 A | 1/2007 |
| WO | 2005/073816 | 8/2005 |
| WO | 2007/067524 | 6/2007 |
| WO | 2008/025664 | 3/2008 |

OTHER PUBLICATIONS espacenet English abstract of JP 2002-72837 A.
espacenet English abstract of JP 2007-17643 A.
espacenet English abstract of JP 2002-40219 A.
espacenet English abstract of JP 2004-309709 A.
espacenet English abstract of JP 2004-264839 A.
U.S. Appl. No. 11/811,599, filed Jun. 11, 2007.

* cited by examiner

PRIOR ART

METHOD FOR MANUFACTURING AN OPTICAL ELEMENT THAT ENABLES REORDERING AND REPRODUCTION OF A STEREOSCOPIC IMAGE AS A HOLOGRAM

RELATED APPLICATION

This application is a divisional of application Ser. No. 12/009,986, filed on Jan. 23, 2008,now U.S. Pat. No. 8,045,267, claims the benefit thereof, and incorporates the same by reference.

BACKGROUND OF THE INVENTION

The present invention relates to an optical element and a method for manufacturing the same, and particularly relates to an optical element that enables recording and reproduction of a stereoscopic image as a hologram.

Holography arts have been known from a long time ago as methods for recording and reproducing a stereoscopic image onto and from a medium, and holograms prepared by such methods are used in various fields, such as ornamental art, forgery prevention seals, etc. In a general method for preparing a hologram optically, interference fringes of an object light, which is emitted from an object, and a reference light are recorded onto a photosensitive medium. Normally, laser light, which is excellent in coherence, is used as a light source for the object light and the reference light. In general, the behavior of light and other electromagnetic waves can be grasped in the form of propagation of a wavefront, having an amplitude and a phase, and a hologram can be said to be an optical element having a function of reproducing such wavefronts. Thus in a hologram recording medium, information for accurately reproducing phases and amplitudes of the object light at respective positions in space must be recorded. By recording interference fringes, resulting from an object light and a reference light, on a photosensitive medium, information that include both phases and amplitudes of the object light can be recorded, and by illuminating this medium with a reconstruction illumination light equivalent to the reference light, a portion of the reconstruction illumination light can be observed as light with wavefronts equivalent to those of the object light.

In preparing a hologram by such an optical method using laser light, etc., the phases and amplitudes of the object light can be recorded only in the form of interference fringes with the reference light. This is because the photosensitive medium on which the hologram is recorded has the characteristic of becoming photosensitized according to light intensity. Meanwhile, techniques for preparing holograms by computation using a computer have come to be put to practical use recently. Such techniques are referred to as CGHs (computer generated holograms), with which a computer is used to calculate wavefronts of an object light and a hologram is prepared by recording the phases and amplitudes of the object light by some means on a physical medium. By using such a computer generated hologram technique, not only can an image obviously be recorded in the form of interference fringes of an object light and a reference light but information concerning the phases and amplitudes of the object light can also be recorded directly onto a recording plane without the use of the reference light.

For example, U.S. Pat. No. 6,618,190, U.S. Pat. No. 6,934,074 and WO 2005/073816A1 (patent applications of inventions by the same inventor as that of the present application) disclose an invention, with which an arbitrary original image and a recording plane, having representative points positioned at a predetermined pitch, are defined, and a computer is used to calculate, for each representative point position, a complex amplitude of a wavefront of a synthetic wave of object light components emitted from respective portions of the original image, determine a complex amplitude distribution (distribution of amplitudes A and phases θ) on the recording plane, and record the complex amplitude distribution by means of a set of three-dimensional cells. The invention disclosed in the above-mentioned publications shall be referred to hereinafter as the "prior invention." With the method disclosed in the prior invention, three-dimensional cells, each having a groove on one surface, are prepared, and by positioning these cells at each representative point position, an optical element, constituted of a set of a large number of three-dimensional cells, is arranged. In this process, the phase θ, determined for an individual representative point position, is recorded as a depth of the groove of the corresponding three-dimensional cell, and the amplitude A is recorded as the width of the groove of the three-dimensional cell. Because a unique phase θ and amplitude A are thus recorded at each individual representative point position on the recording plane, when a reconstruction illumination light is illuminated, a hologram reproduction image of the original image is obtained.

Because the optical element is constituted of the set of the three-dimensional cells, in which the amplitudes A and the phases θ are recorded, the method of the prior invention described above provides the merit of enabling manufacture of an element that can provide a high diffraction efficiency during reproduction. However, microfabrication techniques and a manufacturing process of high precision are required for physically manufacturing an optical element constituted of such three-dimensional cells. For example, the abovementioned U.S. Pat. No. 6,618,190 discloses an example of forming grooves of various widths in accordance with the values of the amplitudes A on upper surfaces of three-dimensional cells, each having a microscopic size of 0.6×0.25×0.25 μm. Not only is high-precision processing required to form a groove on the upper surface of a physical cell of such microscopic size but extremely high processing precision is required to control the width of the groove accurately to be a width that is in accordance with the value of the amplitude A.

SUMMARY OF THE INVENTION

Thus an object of the present invention is to provide an optical element that enables a high diffraction efficiency to be provided during reproduction and yet with which the manufacturing process is comparatively easy and the productivity is excellent.

(1) The first feature of the present invention resides in a method for manufacturing an optical element that comprises a set of a plurality of three-dimensional cells and is enabled to reproduce an original image, the optical element manufacturing method comprising:

an original image defining step of defining, in a three-dimensional space, the original image that emits a predetermined object light;

a recording plane defining step of defining, in the three-dimensional space, a recording plane for recording the original image;

a slice plane defining step of defining a plurality N of slice planes, each constituted of a plane that enables slicing of the original image and the recording plane;

an image contour defining step of defining image contours each of which is located at each sliced portion obtained by slicing the original image by the respective slice planes;

a sample point defining step of defining a plurality of sample points S on each of the image contours;

a cell position line defining step of defining cell position lines each of which is located at each sliced portion obtained by slicing the recording plane by the respective slice planes;

a cell position point defining step of defining a plurality of cell position points Q on each of the cell position lines;

an associated sample point determining step of associating an image contour and a cell position line defined by slicing by a same slice plane and determining, for each cell position point Q, sample points S on an image contour which is associated with a cell position line to which said cell position point Q belongs, as associated sample points;

an amplitude and phase computing step of determining by computation, for said each cell position point Q, an amplitude A and a phase θ at a predetermined time of a synthetic wave of object light components, among object light components emitted from the associated sample points, that reach a position of said each cell position point Q;

a three-dimensional structure determining step of determining, on the basis of amplitudes A and phases θ determined for respective cell position points Q on the recording plane, structures of the three-dimensional cells to be positioned at positions of the respective cell position points Q to determine a three-dimensional structure comprising a set of a plurality of the three-dimensional cells positioned on the recording plane; and an element forming step of forming a physical optical element having the determined three-dimensional structure; wherein in the three-dimensional structure determining step, the structures of the three-dimensional cells, in each of which a diffraction grating, having a phase that is in accordance with the phase θ, is formed in an effective region having an area that is in accordance with the amplitude A, are determined.

(2) The second feature of the present invention resides in the optical element manufacturing method according to the first feature, wherein in the original image defining step, a three-dimensional stereoscopic image or a two-dimensional planar image is defined as the original image.

(3) The third feature of the present invention resides in the optical element manufacturing method according to the first feature, wherein in the original image defining step, an original image that emits object light components that differ according to direction is defined.

(4) The fourth feature of the present invention resides in the optical element manufacturing method according to the third feature, wherein in the original image defining step, an original image is defined as a set of sample points, each having a plurality of types of pixel values, a rule for selecting one of the pixel values according to an emission direction is set, and an emitted object light component is determined based on a selected pixel value.

(5) The fifth feature of the present invention resides in the optical element manufacturing method according to the third feature, wherein in the original image defining step, an original image is defined by a main original image, in which sample points that are distributed in a discrete manner are defined, and a sub original image, in which predetermined pixel values are defined at respective portions of surface, and an object light component, propagating from a certain sample point to a certain cell position point Q, is determined based on a pixel value defined at an intersection of a straight line, joining the certain cell position point Q and the certain sample point, and the sub original image.

(6) The sixth feature of the present invention resides in the optical element manufacturing method according to the first to the fifth features, wherein a recording plane, comprising a plane, is defined in the recording plane defining step, a plurality of N of slice planes, comprising mutually parallel planes, are defined in the slice plane defining step, and N cell position lines, comprising mutually parallel straight lines, are defined on the recording plane in the cell position line defining step.

(7) The seventh feature of the present invention resides in the optical element manufacturing method according to the sixth feature, wherein N slice planes, positioned at a fixed pitch Pv and orthogonal to the recording plane, are defined in the slice plane defining step, N cell position lines, positioned at the fixed pitch Pv, are defined on the recording plane in the cell position line defining step, cell position points Q, positioned at a fixed pitch Ph, are defined on each cell position line, to thereby define cell position points Q positioned in a two-dimensional matrix form at a vertical direction pitch Pv and a horizontal direction pitch Ph on the recording plane in the cell position point defining step, and a three-dimensional structure, in which three-dimensional cells, each having a rectangular parallelepiped basic shape, with a vertical dimension Cv equal to the pitch Pv and a horizontal dimension Ch equal to the pitch Ph, are positioned on the two-dimensional matrix, is determined in the three-dimensional structure determining step.

(8) The eighth feature of the present invention resides in the optical element manufacturing method according to the first to the seventh features, wherein in the amplitude and phase computing step, a computation is performed with which a restriction is applied to an emission angle of object light components emitted from each associated sample point.

(9) The ninth feature of the present invention resides in the optical element manufacturing method according to the first to the eighth features, wherein in the amplitude and phase computing step, an amplitude attenuation term of an object light component emitted from a line light source is used to compute an attenuation amount of an amplitude of an object light component propagating from a sample point S to a cell position point Q.

(10) The tenth feature of the present invention resides in the optical element manufacturing method according to the ninth feature, wherein when for an object light component, emitted from a k-th (k=1 to K) sample point S(k), among a total of K sample points that emit object light components reaching a predetermined cell position point Q, a wavelength of the object light component is λ, an amplitude of the object light component at a position separated by just a unit distance from the sample point S(k) is Ak, a phase of the object light component at the sample point S(k) is θk, and a distance between the cell position point Q and the k-th sample point S(k) is rk, a synthetic complex amplitude, at the cell position point Q, of object light components from K sample points is defined by a formula:

$$\Sigma_{(k=1-K)}(Ak/\sqrt{rk}\cdot\cos(\theta k\pm 2\pi rk/\lambda)+iAk/\sqrt{rk}\cdot\sin(\theta k\pm 2\pi rk/\pi));$$

and an amplitude A and a phase θ at the cell position point Q are determined by computation using the formula.

(11) The eleventh feature of the present invention resides in the optical element manufacturing method according to the first to the tenth features, wherein in the three-dimensional structure determining step, the structure of each three-dimensional cell is determined by positioning a diffraction grating, having a relief structure surface on which a same uneven shape variation is repeated at a predetermined period ξ, at a position of a phase θ with respect to a reference position of the three-dimensional cell, inside an effective area with an area that is in accordance with an amplitude A.

(12) The twelfth feature of the present invention resides in the optical element manufacturing method according to the eleventh feature, wherein in the three-dimensional structure determining step, three-dimensional cells, each having a rectangular parallelepiped basic shape that has a vertical dimension Cv, a horizontal dimension Ch, and a depth dimension Cd and includes a grating forming surface with a rectangular shape, a dimension of vertical sides of the grating forming surface being Cv and a dimension of horizontal sides of the grating forming surface being Ch, are positioned so that the grating forming surface is parallel to the recording plane and the horizontal sides are parallel to a cell position line, an effective region, comprising a portion having an area that is in accordance with the amplitude A, and a blank region, comprising a portion other than the effective region, are defined on each grating forming surface, and a structure of each three-dimensional cell is determined by positioning a diffraction grating, having a relief structure surface, on the effective region.

(13) The thirteenth feature of the present invention resides in the optical element manufacturing method according to the twelfth feature, wherein in the three-dimensional structure determining step, an effective region with a rectangular shape, having a vertical dimension Ce and a horizontal dimension Ch, is defined, wherein the horizontal dimension Ch of the effective region equals the horizontal dimension Ch of the cells so that an area of the effective region of each individual three-dimensional cell is defined by the vertical dimension Ce.

(14) The fourteenth feature of the present invention resides in the optical element manufacturing method according to the twelfth or the thirteenth feature, wherein in the three-dimensional structure determining step, a square value $A^2$ of the amplitude A is determined for all cell position points Q defined on the recording plane, $A^2$max is defined as a maximum value of the square values $A^2$, a value $A^2$base such that $A^2$max≧$A^2$base is set, and for each three-dimensional cell to be positioned at an individual cell position point Q, an effective region is made a region corresponding to "$A^2$/$A^2$base" of a total area of a grating forming surface (a region corresponding to a total area of grating forming surface in the case where "$A^2$>$A^2$base).

(15) The fifteenth feature of the present invention resides in the optical element manufacturing method according to the twelfth to the fourteenth features, wherein in the three-dimensional structure determining step, a diffraction grating is formed so that an uneven shape variation occurs in a direction orthogonal to a cell position line.

(16) The sixteenth feature of the present invention resides in the optical element manufacturing method according to the fifteenth feature, wherein in the three-dimensional structure determining step, a slope, a depth of which monotonously decreases continuously from a deepest portion to a shallowest portion, is formed in a periodic section of a length ξ along a direction orthogonal to a cell position line, and a relief structure surface is formed by setting the slope repeatedly.

(17) The seventeenth feature of the present invention resides in the optical element manufacturing method according to the sixteenth feature, wherein in the three-dimensional structure determining step, a standard observation condition, premised on using a reconstruction illumination light of a predetermined standard wavelength λ, is set, and a depth h from the shallowest portion to the deepest portion of the slope is set so that under the standard observation condition, a phase difference, between a light component reaching an observation position via the deepest portion and a light component reaching the observation position via the shallowest portion, is 2π.

(18) The eighteenth feature of the present invention resides in the optical element manufacturing method according to the fifteenth feature, wherein in the three-dimensional structure determining step, a staircase, a depth of which monotonously decreases in stepwise manner from a deepest portion to a shallowest portion, is formed in a periodic section of a length ξ along a direction orthogonal to a cell position line, and a relief structure surface is formed by setting the staircase repeatedly.

(19) The nineteenth feature of the present invention resides in the optical element manufacturing method according to the eighteenth feature, wherein in the three-dimensional structure determining step, a standard observation condition, premised on using a reconstruction illumination light of a predetermined standard wavelength λ, is set, and a slope, with which a depth from a shallowest portion to a deepest portion is h and the depth from the deepest portion to the shallowest portion monotonously decreases continuously and is set so that under the standard observation condition, a phase difference, between a, light component reaching an observation position via the deepest portion and a light component reaching the observation position via the shallowest portion, is 2π, is defined, and a staircase approximating the slope is positioned to form a relief structure surface.

(20) The twentieth feature of the present invention resides in the optical element manufacturing method according to the seventeenth or the nineteenth feature, wherein in the element forming step, a relief structure surface is formed on a top surface of a light transmitting layer made of a substance having a refractive index n2, so that a reconstruction illumination light, transmitted through the light transmitting layer, is observed, and in the three-dimensional structure determining step, supposing that the optical element is used in a space filled with a substance having a refractive index n1, h is set to a value determined by: "h=λ/|n2−n1|."

(21) The twenty-first feature of the present invention resides in the optical element manufacturing method according to the seventeenth or the nineteenth feature, wherein in the element forming step, a relief structure surface is formed as an interface of a first light transmitting layer made of a substance having a refractive index n1, and a second light transmitting layer made of a substance having a refractive index n2, so that a reconstruction illumination light, transmitted through both the first light transmitting layer and the second light transmitting layer, is observed, and in the three-dimensional structure determining step, h is set to a value determined by "h=λ/|n2-n1|."

(22) The twenty-second feature of the present invention resides in the optical element manufacturing method according to the seventeenth or the nineteenth feature, wherein in the element forming step, a relief structure surface is formed on a top surface of a reflecting layer having a property of reflecting a reconstruction illumination light, so that the reconstruction illumination light reflected by the reflecting layer is observed, and in the three-dimensional structure determining step, supposing that the optical element is used in a space filled with a substance having a refractive index n1, h is set to a value determined by: "$h=\lambda/(2 \times n1)$."

(23) The twenty-third feature of the present invention resides in the optical element manufacturing method according to the seventeenth or the nineteenth feature, wherein in the element forming step, a relief structure surface is formed as an interface of a light transmitting layer made of a substance having a refractive index n2, and a reflecting layer having a property of reflecting a reconstruction illumination light, so that the reconstruction illumination light, transmitted through the light transmitting layer, reflected by the reflecting layer, and transmitted again through the light transmitting layer, is observed, and in the three-dimensional structure determining step, h is set to a value determined by: "$h=\lambda/(2 \times n2)$."

(24) The twenty-fourth feature of the present invention resides in the optical element manufacturing method according to the seventeenth or the nineteenth feature, wherein in the element forming step, a relief structure surface is formed on a top surface of a light transmitting layer made of a substance having a refractive index n2, and a reflecting layer having a property of reflecting a reconstruction illumination light is formed on a surface of the light transmitting layer at an opposite side of the relief structure surface, so that the reconstruction illumination light, transmitted through the light transmitting layer, reflected by the reflecting layer, and transmitted again through the light transmitting layer, is observed, and in the three-dimensional structure determining step, supposing that the optical element is used in a space filled with a substance having a refractive index n1, h is set to a value determined by: "$h=\lambda/(2 \times |n2-n1|)$."

(25) The twenty-fifth feature of the present invention resides in the optical element manufacturing method according to the seventeenth or the nineteenth feature, wherein in the element forming step, a relief structure surface is formed as an interface of a first light transmitting layer made of a substance having a refractive index n1, and a second light transmitting layer made of a substance having a refractive index n2, and a reflecting layer having a property of reflecting a reconstruction illumination light is formed on a surface of the second light transmitting layer at an opposite side of a surface in contact with the first light transmitting layer, so that the reconstruction illumination light, transmitted through both the first light transmitting layer and the second light transmitting layer, reflected by the reflecting layer, and transmitted again through both the first light transmitting layer and the second light transmitting layer, is observed, in the three-dimensional structure determining step, h is set to a value determined by: "$h=\lambda/(2 \times |n2-n1|)$."

(26) The twenty-sixth feature of the present invention resides in the optical element manufacturing method according to the twenty-second to the twenty-fifth features, wherein the reflecting layer is formed only inside the effective region of each three-dimensional cell and is not formed inside the blank region.

(27) The twenty-seventh feature of the present invention resides in the optical element manufacturing method according to the twelfth to the twenty-sixth features, wherein in the three-dimensional structure determining step, the standard observation condition is set on a premise of observing from a predetermined observation direction when a reconstruction illumination light of a predetermined standard wavelength $\lambda$ is illuminated from a predetermined illumination direction onto the optical element, the period $\xi$ of an uneven shape variation of the diffraction grating is set to a value suited for obtaining a diffraction angle required to guide light, made incident from the illumination direction, to the observation direction, the vertical dimension Cv of each three-dimensional cell is set to a value no less than a dimension necessary for the diffraction grating to give rise to an adequate diffraction phenomenon, and the horizontal dimension Ch of each three-dimensional cell is set to a value no less than a dimension necessary for obtaining a required stereoscopic angle in a horizontal direction.

(28) The twenty-eighth feature of the present invention resides in the optical element manufacturing method according to the twenty-seventh feature, wherein in the three-dimensional structure determining step, the period $\xi$ of the uneven shape variation of the diffraction grating is set in a range of 0.6 to 2 μm, the vertical dimension Cv of each three-dimensional cell is set in a range of 3 to 300 μm, and the horizontal dimension Ch is set in a range of 0.2 to 4 μm.

(29) The twenty-ninth feature of the present invention resides in the optical element manufacturing method according to the twelfth to the twenty-eighth features, wherein in the element forming step, a light blocking layer or a light absorbing layer is formed in the blank region.

(30) The thirtieth feature of the present invention resides in an optical element, comprising a set of a plurality of three-dimensional cells, wherein with each individual cell, a specific amplitude and a specific phase are defined, a diffraction grating, having a phase that is in accordance with the specific phase, is formed in an effective region with an area that is in accordance with the specific amplitude, so that when a predetermined incident light is provided to an individual cell, an emitted light, with which an amplitude and a phase of the incident light is modulated according to the specific amplitude and the specific phase defined in the cell, is obtained.

(31) The thirty-first feature of the present invention resides in the optical element according to the thirtieth feature, wherein each individual three-dimensional cell is formed by positioning a diffraction grating, having a relief structure surface with which a same uneven shape variation is repeated at a predetermined period $\xi$, at a position of a phase $\theta$ with respect to a predetermined reference position.

(32) The thirty-second feature of the present invention resides in the optical element according to the thirty-first feature, wherein each individual three-dimensional cell has a rectangular parallelepiped basic shape with a vertical dimension Cv, a horizontal dimension Ch, and a depth dimension Cd, includes a grating forming surface with a rectangular shape that has vertical sides of the dimension Cv and horizontal sides of the dimension Ch and is parallel to one surface of the rectangular parallelepiped, and has a relief structure surface formed along the grating forming surface, and the respective three-dimensional cells are positioned in a two-dimensional matrix form.

(33) The thirty-third feature of the present invention resides in the optical element according to the thirty-second feature, wherein an effective region, comprising a rectangular shape having vertical sides, each of a dimension Ce, and horizontal sides, each of the dimension Ch, is defined on the grating forming surface of each individual three-dimensional cell, and for each of all three-dimensional cells, a horizontal width of the effective region is made equal to the horizontal width Ch of the cell itself and the diffraction grating, comprising a relief structure, is formed so that an uneven shape variation occurs in a direction along the vertical sides.

(34) The thirty-fourth feature of the present invention resides in the optical element according to the thirty-third feature, wherein a slope, a depth of which monotonously decreases continuously from a deepest portion to a shallowest portion, is formed in a periodic section of a length $\xi$ along the vertical sides of the effective region, and the relief structure surface is formed by setting the slope repeatedly.

(35) The thirty-fifth feature of the present invention resides in the optical element according to the thirty-third feature, wherein a staircase, a depth of which monotonously decreases in stepwise manner from a deepest portion to a shallowest portion, is formed in a periodic section of a length $\xi$ along the vertical sides of the effective region, and the relief structure surface is formed by setting the staircase repeatedly.

(36) The thirty-sixth feature of the present invention resides in the optical element according to the thirty-third to the thirty-fifth features, wherein the period $\xi$ of the uneven shape variation of the diffraction grating is set in a range of 0.6 to 2 μm, the vertical dimension Cv of each three-dimensional cell is set in a range of 3 to 300 μm, and the horizontal dimension Ch is set in a range of 0.2 to 4 μm.

(37) The thirty-seventh feature of the present invention resides in the optical element according to the thirty-first to the thirty-sixth features, wherein each individual three-dimensional cell comprises a light transmitting layer or a reflecting layer having a relief structure surface formed on a top surface.

(38) The thirty-eighth feature of the present invention resides in the optical element according to the thirty-first to the thirty-sixth features, wherein each individual three-dimensional cell has a layered structure of a first light transmitting layer made of a substance having a refractive index n1, and a second light transmitting layer made of a substance having a refractive index n2, and has a relief structure surface formed at an interface of the first light transmitting layer and the second light transmitting layer.

(39) The thirty-ninth feature of the present invention resides in the optical element according to the thirty-first to the thirty-sixth features, wherein each individual three-dimensional cell has a layered structure of a light transmitting layer and a reflecting layer and has a relief structure surface formed at an interface of the light transmitting layer and the reflecting layer.

(40) The fortieth feature of the present invention resides in the optical element according to the thirty-first to the thirty-sixth features, wherein each individual three-dimensional cell has a layered structure of a light transmitting layer and a reflecting layer and has a relief structure surface formed on a surface of the light transmitting layer at an opposite side of a surface in contact with the reflecting layer.

(41) The forty-first feature of the present invention resides in the optical element according to the thirty-first to the thirty-sixth features, wherein each individual three-dimensional cell has a layered structure of a first light transmitting layer made of a substance having a refractive index n1, a second light transmitting layer made of a substance having a refractive index n2, and a reflecting layer, has a relief structure surface formed at an interface of the first light transmitting layer and the second light transmitting layer, and has the reflecting layer formed on a surface of the second light transmitting layer at an opposite side of a surface in contact with the first light transmitting layer.

(42) The forty-second feature of the present invention resides in the optical element according to the thirty-first to the thirty-sixth features, wherein a light blocking layer that blocks light that does not propagate via the effective region or a light absorbing layer that absorbs light that reaches a portion other than the effective region is formed.

(43) The forty-third feature of the present invention resides in the optical element according to the thirty-seventh and the thirty-ninth to the forty-first features, wherein the reflecting layer is formed only inside the effective region of each three-dimensional cell.

(44) The forty-fourth feature of the present invention resides in the optical element according to the thirtieth to the forty-third features, wherein a complex amplitude distribution of an object light from an object image is recorded so that the object image is reproduced upon observation from a predetermined viewpoint position, thereby enabling use as a hologram.

With the present invention, because the original image is recorded not in the form of interference fringes but as a complex amplitude distribution of an object light, a high diffraction efficiency is provided during reproduction. Moreover, a complex amplitude distribution is recorded in the form of diffraction gratings on three-dimensional cells, with an amplitude being expressed as an effective area in which the diffraction grating is formed and a phase being expressed as a spatial position of the diffraction grating. The region for recording the amplitude can thus be set to be comparatively wide, thereby enabling manufacture of a physical optical element by a process that is not so high in processing precision. Thus by the present invention, an optical element, with which the manufacturing process is comparatively easy and the productivity is excellent, can be provided.

DESCRIPTION OF THE PREFERRED EMBODIMENTS

The present invention shall now be described based on illustrated embodiments.

<<<Section 1. Basic Principles of Recording a Complex Amplitude Distribution>>>

Figure 1:
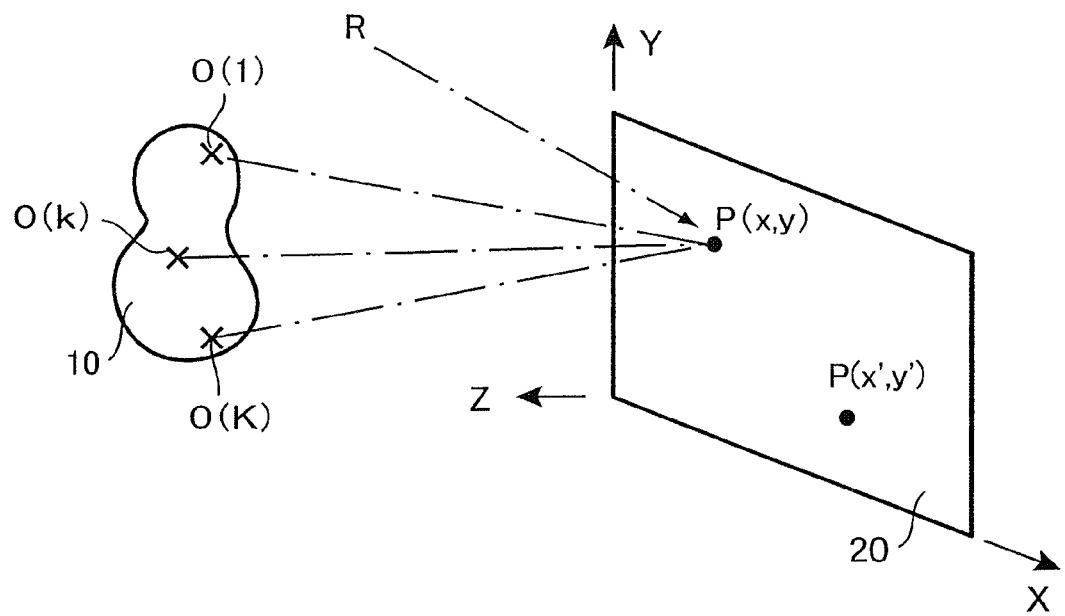
FIG. 1 is a perspective view of a general holography technique for optically recording an object image in the form of interference fringes using a reference light.

FIG. 1 is a perspective view of a general holography technique that uses a reference light to optically record an object image in the form of interference fringes. To record a three-dimensional image of an object 10 onto a recording medium 20, the object 10 is illuminated by a light (normally, laser light) of the same wavelength as the reference light R and interference fringes formed on the recording medium 20 by an object light from the object 10 and the reference light R are recorded. Here, an XY coordinate system is defined on the recording medium 20, and in regard to an arbitrary point P(x, y) positioned at coordinates (x, y), an amplitude intensity of a synthetic wave, resulting from the interference of respective object light components, from points O(1), O(2), ..., O(k), ..., O(K) on the object 10, and the reference light R, is recorded at the point P(x, y). Although an amplitude intensity of a synthetic wave, resulting from the interference of the respective object light components from the respective points and the reference light R, is recorded in likewise manner at another point P(x', y') on the recording medium 20, the amplitude intensity recorded at point P(x, y) and the amplitude intensity recorded at point P(x', y') differ due to differences in the propagation distances of the light components. An amplitude intensity distribution is thus recorded on the recording medium 20 and the amplitudes and the phases of the object light are expressed by this amplitude intensity distribution. During reproduction, by illuminating a reconstruction illumination light of the same wavelength as the reference light R from the same direction as the reference light R (or a direction that is plane symmetrical with respect to the recording medium 20), a stereoscopic reproduction image of the object 10 is obtained.

For recording interference fringes on the recording medium 20 by an optical method, a photosensitive material is used as the recording medium 20, and the interference fringes are recorded as a dark-and-light pattern on the recording medium 20. Meanwhile, in a case where a computer generated hologram technique is used, the phenomenon occurring in the optical system of FIG. 1 is simulated on a computer. Specifically, in place of the actual object 10, the recording medium 20, etc., an object image 10, which is to be an original image, and a recording plane 20 are defined in a virtual three-dimensional space on the computer, and a large number of point light sources O(1), O(2), ..., O(k), ..., O(K) are defined on the object image 10. For each point light source, an object light (spherical wave) of a predetermined wavelength, amplitude, and phase is defined, and furthermore, a reference light, having the same wavelength as the object light, is defined. Meanwhile, on the recording plane 20, a large number of representative points P(x, y) are defined, and an amplitude intensity of a synthetic wave of the object light and the reference light that reaches the position of each individual representative point is determined by computation. Because an amplitude intensity distribution (interference fringes) is thus determined by computation on the recording plane 20, by recording this amplitude intensity distribution on a physical recording medium as a dark-and-light distribution or a relief distribution, a physical hologram recording medium can be prepared.

When a computer generated hologram technique is used, the reference light R does not necessarily have to be used to record interference fringes, and the object light from the object image 10 itself can be recorded directly onto the recording plane 20. That is, in preparing a hologram optically, interference waves must be generated for a fixed time necessary for photosensitization and be recorded in the form of interference fringes on the recording medium 20, constituted of a photosensitive material. Interference waves that are standing waves must thus be generated by using the reference light. However, when a computer generated hologram technique is used, a state of a wave that is present at a certain instant on the recording plane 20 can be observed and be recorded as if time was stopped. In other words, the amplitude and the phase of the object light at each representative point position on the recording plane 20 at a predetermined reference time can be determined by computation. The present invention makes use of this merit of computer generated holograms and employs, not a technique of recording the object light in the form of interference fringes formed by interference with a reference light, but a technique of directly recording the amplitude and the phase of the object light.

Figure 2:
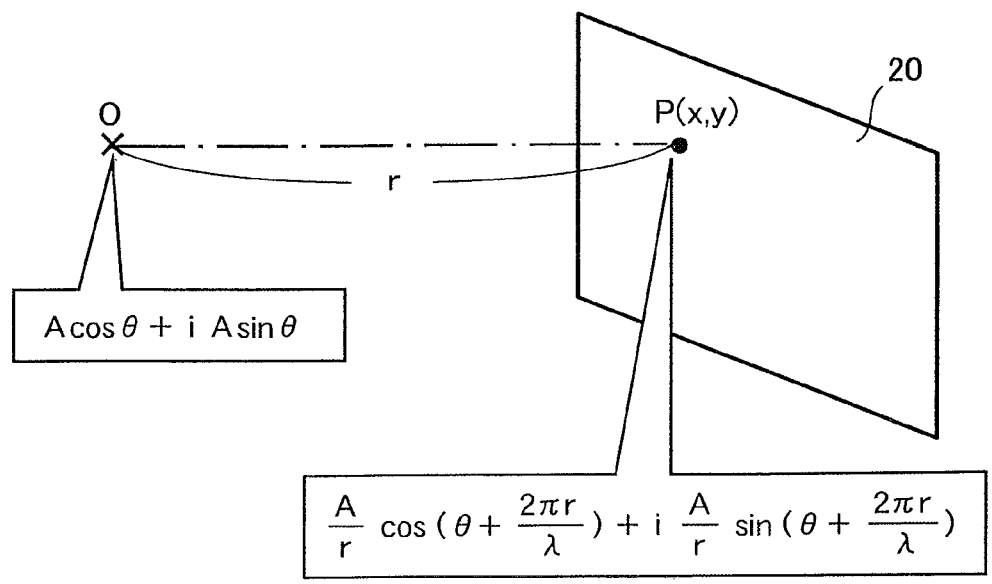
FIG. 2 is a perspective view of an amplitude and a phase of an object light component that reaches a representative point P(x, y) on a recording plane 20 when a point light source O and the recording plane 20 are defined.

Consider, for example, how, when a point light source O and a recording plane 20 are defined as shown in the perspective view of FIG. 2, the amplitude and the phase of an object light component that reaches a representative point P(x, y) on the recording plane 20 is calculated. In general, in consideration of the amplitude and the phase, a wave motion is expressed by the complex function:

$$A \cos \theta + iA \sin \theta$$

(where i is the imaginary unit). Here, A is a parameter that indicates the amplitude, and θ is a parameter that indicates the phase. By defining the object light component emitted from the point light source O by the above complex function, the object light component at the representative point P(x, y) is expressed by the complex function:

$$A/r \cdot \cos(\theta + 2\pi r/\lambda) + iA/r \cdot \sin(\theta + 2\pi r/\lambda).$$

Here, A is an amplitude value that is to be a reference, r is a distance from the point light source O to the representative point P(x, y), and λ is a wavelength of the object light. The amplitude of the object light attenuates with increasing distance r, and the phase is determined by a relationship of the distance r and the wavelength λ. Although the complex function does not contain a variable that indicates time, this is because the function indicates an instantaneous state of a wave that is observed when the time is stopped at a predetermined reference time as mentioned above.

Figure 3:
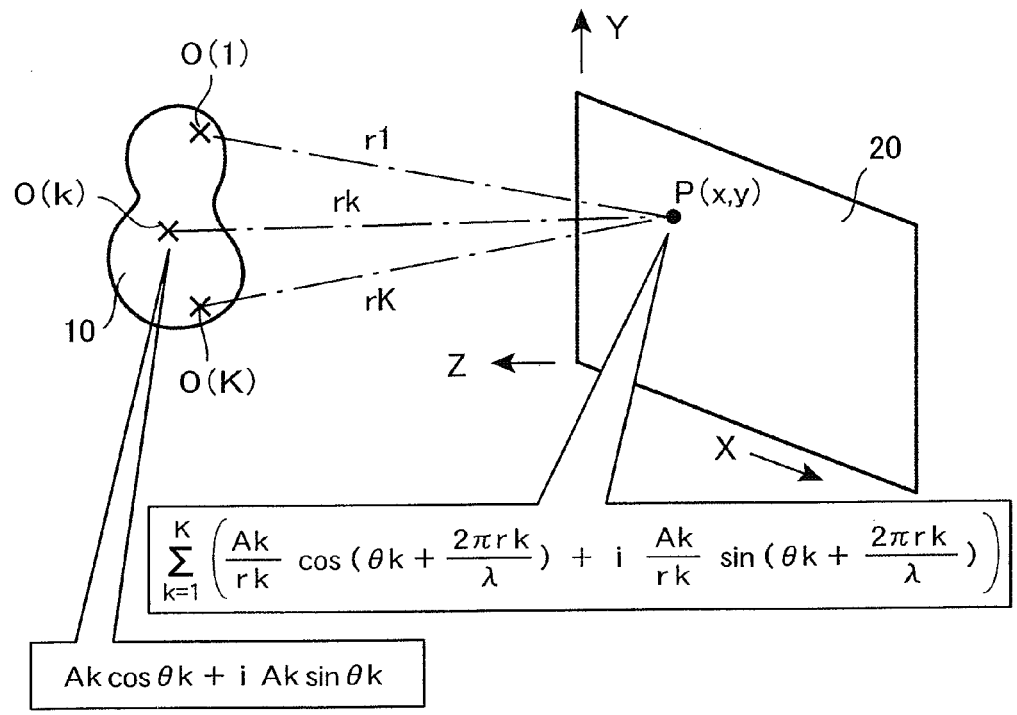
FIG. 3 is a perspective view of a complex amplitude of object light components at the representative point P(x, y) on the recording plane 20 when the object light components, emitted from respective point light sources on an object image 10, reach the representative point P on the recording plane 20.

Thus to record the information of the object image 10 on the recording plane 20, a large number of point light sources O(1), O(2), . . . , O(k), . . . , O(K) are defined on the object image 10, the amplitude and the phase of the synthetic wave of the object light components emitted from the respective point light sources are determined by computation at each representative point position on the recording plane 20, and these are recorded by some method. Here, it shall be deemed that a total of K point light sources are defined on the object image 10 and that an object light component emitted from a k-th point light source O(k) is expressed, as shown in FIG. 3, by the following complex function:

$$Ak \cos \theta k + iAk \sin \theta k.$$

If the object image 10 is deemed to be constituted of a set of pixels, each having a predetermined gradation value (density value), the parameter Ak that indicates the amplitude is determined according to the gradation value of the pixel present at the position of the point light source O(k). Although the phase θk may generally be set as θk=0, settings, such that object light components that differ in phase are emitted from respective portions of the object image 10, are also possible if necessary. When object light components, each expressed by the above complex function, are defined for all K point light sources, a synthetic wave of all K object light components at the position of an arbitrary representative point P(x, y) on the recording plane 20 is expressed, as shown in FIG. 3, by the following complex function:

$$\Sigma_{k=1-K}(Ak/rk \cos(\theta k + 2\pi rk/\lambda) + iAk/rk \sin(\theta k + 2\pi rk/\lambda))).$$

In the above, Ak is the amplitude at a position that is separated from the k-th point light source O(k) by just a unit distance, and rk is the distance from the k-th point light source O(k) to the representative point P(x, y). The above formula corresponds to a case of reproducing the object image 10 behind the recording medium. To reproduce the object image 10 so that it seems to project out in front of the recording medium, the following complex function (in which the sign of the phase term is negative) is used for calculation:

$$\Sigma_{k=1-K}(Ak/rk \cos(\theta k - 2\pi rk/\lambda) + i Ak/rk \sin(\theta k - 2\pi rk/\lambda)).$$

A complex function that takes both cases into consideration thus takes on the following form:

$$\Sigma_{k=1-K}(Ak/rk \cos(\theta k - 2\pi rk/\lambda) + i Ak/rk \sin(\theta k - 2\pi rk/\lambda)).$$

Figure 4:
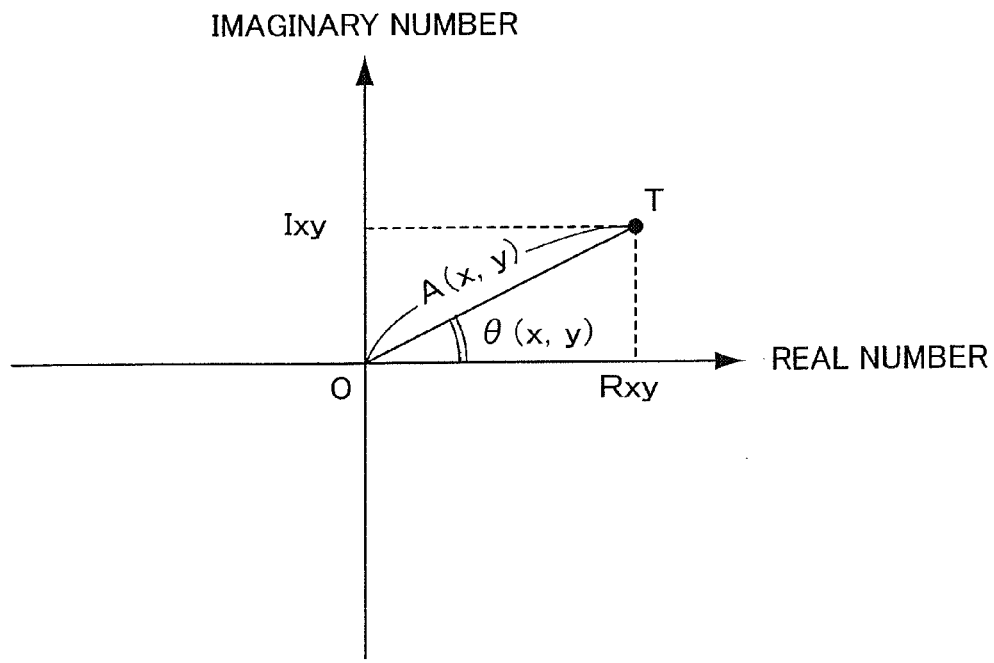
FIG. 4 is a diagram showing how an amplitude A(x, y) and a phase θ(x, y) are determined from a complex amplitude indicated by a coordinate point T on a complex coordinate plane.

If the real part of this function is expressed as Rxy and the imaginary part is expressed as Ixy so that the function takes on the form, Rxy+iIxy, the complex amplitude (the amplitude that takes the phase into consideration) of the synthetic wave at the representative point P(x, y) can be indicated as a coordinate point T on a complex coordinate plane as shown in FIG. 4.

The amplitude of the synthetic object light wave at the representative point P(x, y) is thus given by a distance A(x, y) between an origin O of the coordinate plane and the coordinate point T as shown in FIG. 4, and the phase is given by an angle θ(x, y) formed by a vector OT and the real number axis.

The amplitude A(x, y) and the phase θ(x, y) of a synthetic object light wave at the position of an arbitrary representative point P(x, y) defined on the recording plane 20 are thereby determined by calculation. A complex amplitude distribution (distribution of the amplitudes and phases of synthetic object light waves) of the object light emitted from the object image 10 is thus obtained on the recording plane 20. By then recording the thus obtained complex amplitude distribution onto a physical recording medium in some form so that when a predetermined reconstruction illumination light is provided, the wavefronts of the object light are reproduced, the object image 10 can be recorded as a hologram.

Figure 5:
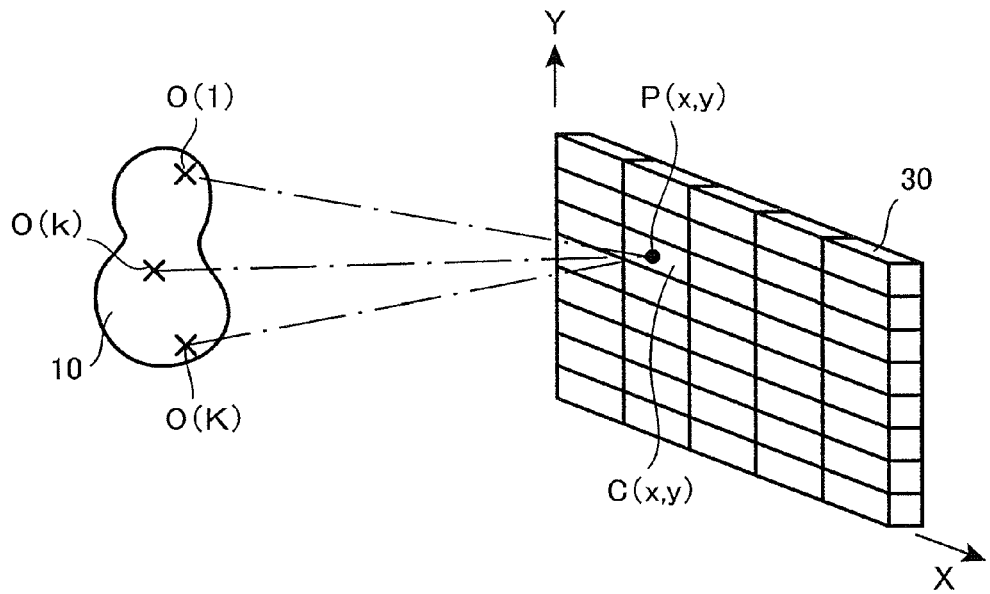
FIG. 5 is a perspective view of an example of a virtual three-dimensional cell set 30 defined for recording the object image 10.

The present inventor thus conceived a method of using three-dimensional cells for recording the complex amplitude distribution of the object light, emitted from the object image 10, on the recording plane 20. To record a complex amplitude distribution using three-dimensional cells to record the object image 10 as a hologram, the following procedure is performed. First, a virtual three-dimensional cell set 30 is defined at the position of the recording plane 20, for example as shown in FIG. 5. With this virtual three-dimensional cell set 30, block-like virtual cells with predetermined dimensions are aligned vertically and horizontally and thereby arrayed two-dimensionally. For each individual virtual cell, a representative point is defined. The position of the representative point may be any single point inside the cell and here, a representative point of a cell shall be defined at a central point position of a front surface (surface facing the object image 10) of the cell. For example, if an XY coordinate system is defined on a front surface (surface facing the object image 10) of the virtual three-dimensional cell set 30 and a virtual cell with a representative point P(x, y) at the position of coordinates (x, y) in the coordinate system is referred to as the virtual cell C(x, y), the representative point P(x, y) is located at a central point on the front surface of the virtual cell C(x, y).

Meanwhile, the object image 10 is defined as a set of point light sources. In the example shown in FIG. 5, the object image 10 is defined as a set of K point light sources O(1), O(2), . . . , O(k), . . . , O(K). From each of these light sources is emitted an object light component having a predetermined amplitude and phase, and a synthetic wave of these object light components arrive at the representative point P(x, y). The complex amplitude of the synthetic wave can be calculated by the formula given above and is indicated by a coordinate point T on the complex coordinate plane shown in FIG. 4, and based on the coordinate point T, an amplitude A(x, y) and a phase θ(x, y) are obtained as described above. Here, the amplitude A(x, y) and the phase θ(x, y) that are obtained for the representative point P(x, y) shall be referred to as the "specific amplitude A(x, y)" and the "specific phase θ(x, y)" for the virtual cell C(x, y) that contains the representative point P(x, y).

In actuality, the above procedure is executed as a computation process using a computer. Consequently, by this computation process, a specific amplitude and a specific phase can be determined for each of all virtual cells that constitute the virtual three-dimensional cell set 30. By then replacing each individual virtual cell with a tangible, physical cell, an optical element, constituted of a set of three-dimensional physical cells (a hologram recording medium, in which the object image 10 is recorded) can be prepared. Here, each physical cell that takes the place of a virtual cell must have optical characteristics that enable modulation of the amplitude and the phase of incident light according to the specific amplitude and the specific phase defined for the virtual cell. In other words, an individual physical cell that replaces a virtual cell must have specific optical characteristics corresponding to a function of generating, when provided with a predetermined incident light, an emitted light by changing the amplitude and the phase of the incident light according to the specific amplitude and the specific phase defined for the virtual cell before replacement.

When a predetermined reconstruction illumination light (ideally, a monochromatic plane wave with the same wavelength as the object light wavelength λ used in the computation process) is illuminated onto the optical element, constituted of the physical cells with such specific optical characteristics, because the reconstruction illumination light is modulated by the specific amplitude and the specific phase in each individual physical cell, the wavefronts of the original object light are reproduced. The hologram recorded in the optical element is thus reproduced.

<<<Section 2. Specific Arrangement Example of a Three-Dimensional Cell>>>

Figure 6:
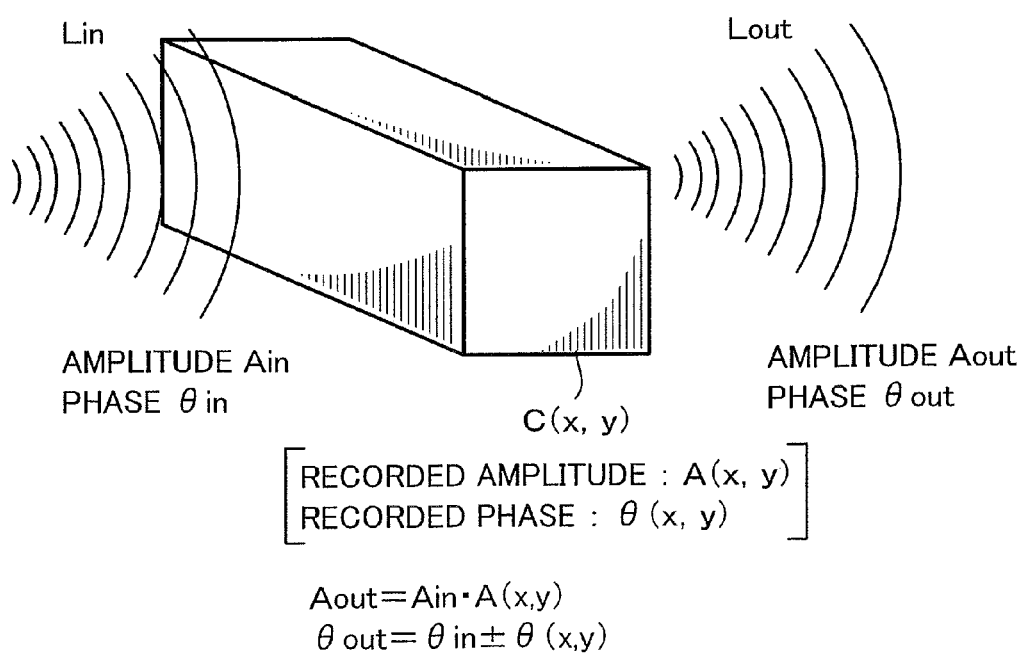
FIG. 6 is a diagram of amplitude modulation and phase modulation functions of a three-dimensional cell C(x, y) used in the present invention.

A specific arrangement example of a three-dimensional cell suitable for recording a complex amplitude (amplitude A and phase θ) shall now be described. Each cell described here is a three-dimensional cell, with which a specific amplitude and a specific phase are defined and which has specific optical characteristics such that when a predetermined incident light is provided to the individual cell, an emitted light, resulting from changing the amplitude and the phase of the incident light in accordance with the specific amplitude and the specific phase defined for the cell, is obtained. For example, when for a three-dimensional cell C(x, y), such as shown in FIG. 6, an amplitude A(x, y) and a phase θ(x, y) are recorded and an incident light Lin, with an amplitude Ain and a phase θ in, is provided to this cell, an emitted light Lout, with an amplitude Aout=Ain·A(x, y) and a phase θout=θin±θ(x, y), is obtained. The amplitude Ain of the incident light is modulated by the specific amplitude A(x, y), recorded in the cell, and changed to the amplitude Aout, and the phase θ in of the incident light is modulated by the specific phase θ(x, y), recorded in the cell, and changed to the phase θ out.

One method for amplitude modulation inside a three-dimensional cell is to set up an amplitude modulating portion, with a transmittance that is in accordance with a specific amplitude, inside the cell (the entire cell may be used as the amplitude modulating portion or an amplitude modulating portion may be disposed at a portion of the cell). For example, a cell having an amplitude modulating portion with a transmittance of Z % functions as a cell, in which a specific amplitude of A(x, y)=Z/100 is recorded, and when the incident light with the amplitude Ain passes through this cell, it is amplitude-modulated to emitted light having an amplitude Aout=Ain·Z/100. To set the transmittance of each individual three-dimensional cell to an arbitrary value, for example, a content of a colorant is changed accordingly.

Another method for amplitude modulation inside a three-dimensional cell is to set up an amplitude modulating portion, with a reflectance that is in accordance with a specific amplitude, inside the cell. For example, a cell having an amplitude modulating portion with a reflectance of Z % functions as a cell in which a specific amplitude of A(x, y)=Z/100 is recorded, and when the incident light with the amplitude Ain is reflected by and emitted from the amplitude modulating portion, it is amplitude-modulated to emitted light having an amplitude Aout=Ain·Z/100. To set the reflectance of an individual three-dimensional cell to an arbitrary value, for example, a reflecting surface is prepared within the cell (this reflecting surface functions as the amplitude modulating portion) and the reflectance of this reflecting surface is set to an arbitrary value. Specifically for example, by adjusting a surface roughness of the reflecting surface, the proportion of reflected light and scattered light can be adjusted, and thus a cell with an arbitrary reflectance can be prepared by adjusting the surface roughness.

Yet another method for amplitude modulation inside a three-dimensional cell is to set up an amplitude modulating portion, having an effective area that is in accordance with a specific amplitude, inside the cell. For example, when a cell has an amplitude modulating portion with a structure such that, when an area of an entire incidence region for incident light is given as 100%, an emitted light that is effective for reproduction of an object image is obtained from just the incident light that is made incident on a portion with an effective area of Z % of the entire incidence region, the cell functions as a cell in which a specific amplitude of A(x, y)=Z/100 is recorded. That is, when the incident light with the amplitude Ain is made incident on the amplitude modulating portion, only Z % of the light is emitted as the effective emitted light, and this is thus equivalent to the incident light being amplitude modulated to the emitted light having an amplitude of Aout=Ain·Z/100.

Meanwhile, one method for phase modulation inside a three-dimensional cell is to set up a phase modulating portion, having a refractive index that is in accordance with a specific phase, inside the cell (the entire cell may be used as the phase modulating portion or a phase modulating portion may be disposed at a portion of the cell). For example, with a cell, having a phase modulating portion that is formed of a material with a refractive index n1, and a cell, having a phase modulating portion that is formed of a material with a refractive index n2, even when incident light of the same phase is provided to both cells, a difference arises in the phases of the emitted light emitted from the respective cells. Thus by forming the respective cells from various materials that differ in refractive index, an arbitrary phase modulation can be applied to the incident light.

Another method for phase modulation inside a three-dimensional cell is to set up a phase modulating portion, having an optical path length that is in accordance with a specific phase, inside the cell (the entire cell may be used as the phase modulating portion or a phase modulating portion may be disposed at a portion of the cell). For example, even with cells having phase modulating portions, formed of the same material with a refractive index n, if the optical path lengths of the phase modulating portions differ, a difference arises in the phases of the emitted light emitted from the respective cells even when incident light of the same phase is provided to the cells. For example, if an optical path length of a phase modulating portion provided in a first cell is L and an optical path length of a phase modulating portion provided in a second cell is 2L, even when incident light of the same phase is provided to the two cells, because in comparison to the emitted light from the first cell, the distance of propagation through the material with refractive index n is twice for the emitted light from the second cell, a phase difference of a corresponding magnitude occurs between the two. To realize a phase modulating portion with an arbitrary optical path length, a cell with a physically relief structure is used.

Figure 7:
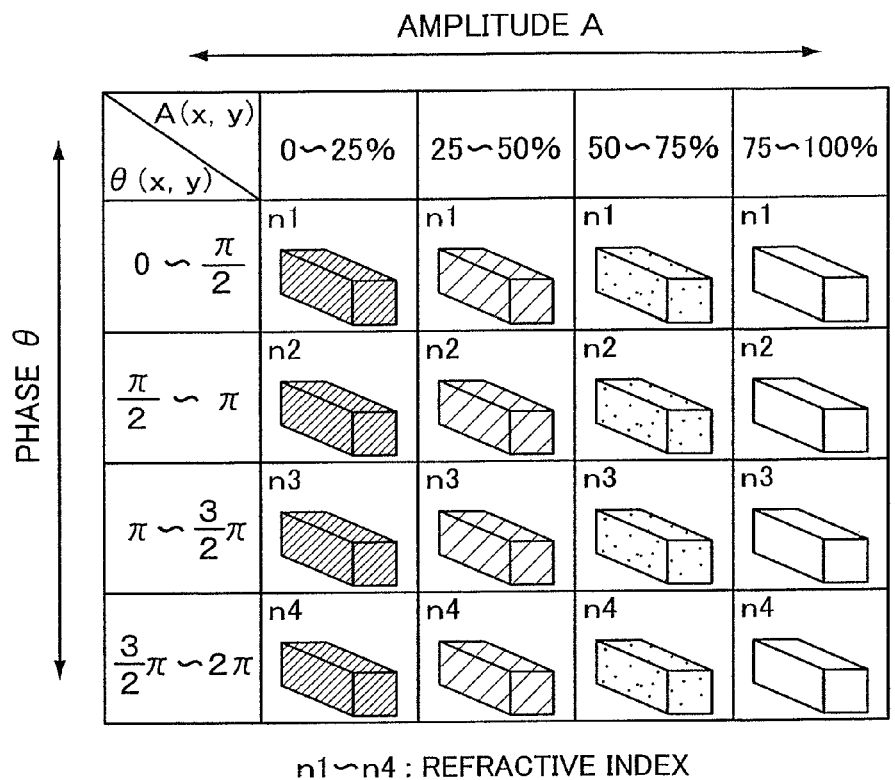
FIG. 7 is a diagram of an example of 16 types of physical cells that differ in transmittance and refractive index and are to be components of an optical element according to a prior invention.

Such three dimensional cells, each having an amplitude modulating function based on a specific amplitude, and three dimensional cells, each having a phase modulating function based on a specific phase, can be realized by any of various methods. For example, if the method of providing a cell with an amplitude modulating portion, having a transmittance according to a specific amplitude, is to be employed as the amplitude modulation method, the method of providing a cell with a phase modulating portion, having a refractive index according to a specific phase, is to be employed as the phase modulation method, and an entire cell is to be used as the amplitude modulating portion and the phase modulating portion, an optical element can be formed by selectively arraying 16 types of physical cells, such as shown in the table of FIG. 7. In this table, a horizontal axis corresponds to the amplitude A, a vertical axis corresponds to the phase $\theta$, and the amplitude A and the phase $\theta$ are each divided into four ranges.

Here, the cells indicated in the range corresponding to an amplitude A of "0 to 25%" (cells of a first column of the table) are cells formed of a material of extremely low transmittance, the cells indicated in the range corresponding to an amplitude A of "25 to 50%" (cells of a second column of the table) are cells formed of a material of somewhat low transmittance, the cells indicated in the range corresponding to an amplitude A of "50 to 75%" (cells of a third column of the table) are cells formed of a material of somewhat high transmittance, and the cells indicated in the range corresponding to an amplitude A of "75 to 100%" (cells of a fourth column of the table) are cells formed of a material of extremely high transmittance.

Meanwhile, the cells indicated in the range corresponding to a phase $\theta$ of "0 to $\pi/2$" (cells of a first row of the table) are cells formed of a material of a refractive index n1 that is extremely close to the refractive index of air, the cells indicated in the range corresponding to a phase $\theta$ of "$\pi/2$ to $\pi$" (cells of a second row of the table) are cells formed of a material of a refractive index n2 that is somewhat higher than the refractive index of air, the cells indicated in the range corresponding to a phase $\theta$ of "$\pi$ to $3\pi/2$" (cells of a third row of the table) are cells formed of a material of a refractive index n3 that is considerably higher than the refractive index of air, and the cells indicated in the range corresponding to a phase $\theta$ of "$3\pi/2$ to $2\pi$" (cells of a fourth row of the table) are cells formed of a material of a refractive index n4 that is much higher than the refractive index of air.

Although with the example shown in FIG. 7, a total of 16 cells of four types of transmittance and four types of refractive index are prepared, to record amplitudes and phases at even higher precision in the cells, the transmittance and refractive index steps are set more finely to prepare a larger number of types of cells. In replacing virtual cells using such 16 types of physical cells, physical cells, having optical characteristics closest to the optical characteristics required to perform the modulations according to the specific amplitudes and the specific phases defined for the respective individual virtual cells, are selected.

<<<Section 3. Three-Dimensional Cell Proposed in the Prior Invention>>>

As mentioned above, the three-dimensional cells for recording the complex amplitudes may, in principle, be realized by any arrangement as long as each cell has a function of modulating an incident light in accordance with a specific amplitude and a specific phase. FIG. 7 shows an example where modulation according to specific amplitude is controlled by transmittance and modulation according to specific phase is controlled by refractive index. Although in theory, several such methods of amplitude and phase modulation exist, not all methods are necessarily practical in terms of industrial mass production. In reproducing an object image at some level of definition by using an optical element, in which complex amplitudes are recorded, the dimensions of each individual three-dimensional cell must inevitably be restricted to no more than a certain level (to put it generally, reproduction of an object image of good visibility is difficult when a cell dimension is no less than 100 μm). Thus in combining the 16 types of physical cells shown in FIG. 7 to prepare an optical element, a task of arraying microscopic cells as parts in two dimensions becomes necessary, and a specific cell, among the 16 types of cells, must be positioned at a specific position. In consideration of such a task, it can be understood that the method of forming an optical element using physical cells, such as those shown in FIG. 7, is not suitable for industrial mass production.

Figure 8:
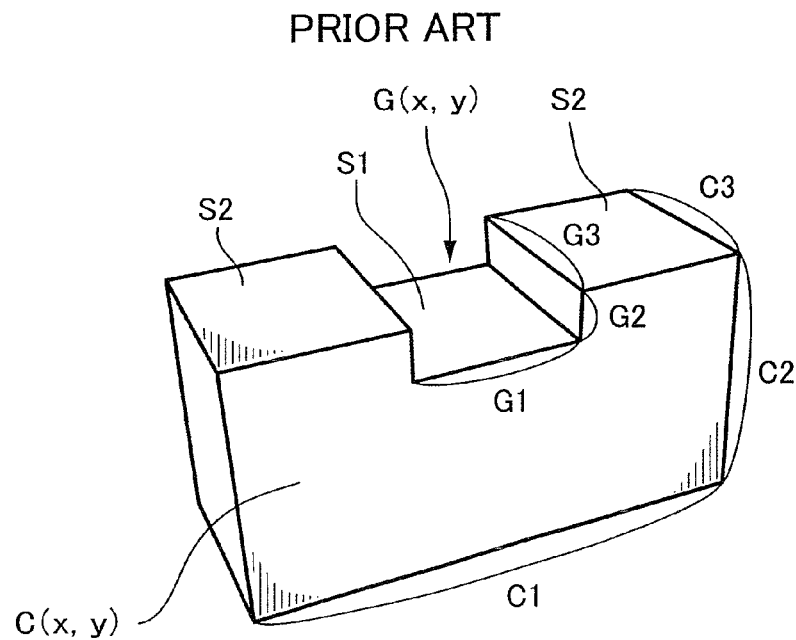
FIG. 8 is a perspective view of an example of a structure of a physical three-dimensional cell C(x, y) that is an optimal embodiment of the prior invention.

Thus in U.S. Pat. No. 6,618,190 and U.S. Pat. No. 6,934,074 mentioned above, a three-dimensional cell C(x, y) having a structure, such as shown in FIG. 8, is disclosed as a best embodiment. As illustrated, this three-dimensional cell has a substantially rectangular parallelepiped block-like form and a groove G(x, y) is formed on an upper surface thereof. In the figure, specific dimensions of respective portions are: C1=0.6 μm; C2=0.25 μm; and C3=0.25 μm, and dimensions of the groove G(x, y) are: G1=0.2 μm; G2=0.05 μm; and G3=C3=0.25 μm. In using a three-dimensional cell C(x, y) with such a structure, amplitude information can be recorded as the value of the width G1 in a horizontal direction of the groove G(x, y) and phase information can be recorded as the depth G2 of the groove G(x, y). In other words, in replacing a virtual cell, for which a specific amplitude and a specific phase are defined, with a physical cell with such a structure, replacement by a physical cell having the dimension G1 that is in accordance with the specific amplitude and the dimension G2 that is in accordance with the specific phase is performed.

Figure 9:
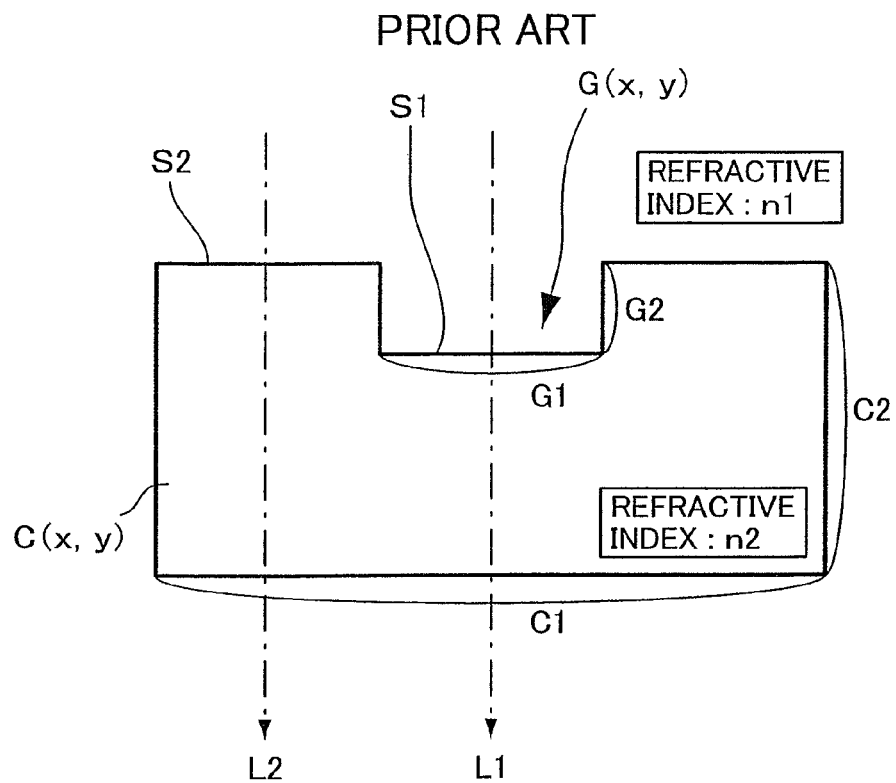
FIG. 9 is a front view for describing why, in a case where the three-dimensional cell C(x, y) shown in FIG. 8 is used as a transmitting cell, amplitude information is recorded as a width G1 of a groove G(x, y) and phase information is recorded as a depth G2 of the groove G(x, y)

The reason why, in the three-dimensional cell shown in FIG. 8, the amplitude information is recorded as the width G1 of the groove G(x, y) and the phase information is recorded as the depth G2 of the groove G(x, y) shall now be described with reference to FIG. 9. Here it shall be deemed that the physical cell C(x, y) is constituted of a substance with a refractive index n2 and the exterior of the physical cell C(x, y) is constituted of a substance (such as air) with a refractive index n1. In this case, when a light component L1 that is made incident perpendicularly onto a surface S1 at the interior of the groove G(x, y) and a light component L2 that is made incident perpendicularly onto a surface S2 at the exterior of the groove G(x, y) are compared in terms of an optical path length of passage through a medium with the refractive index n2, it can be understood that the optical path length of the light component L1 is shorter than the optical path length of the light component L2 by the depth G2 of the groove G(x, y). Thus if the refractive indices n1 and n2 differ, a predetermined phase difference arises between the light component L1 and the light component L2 that are emitted as transmitted light from the physical cell C(x, y).

Figure 10:
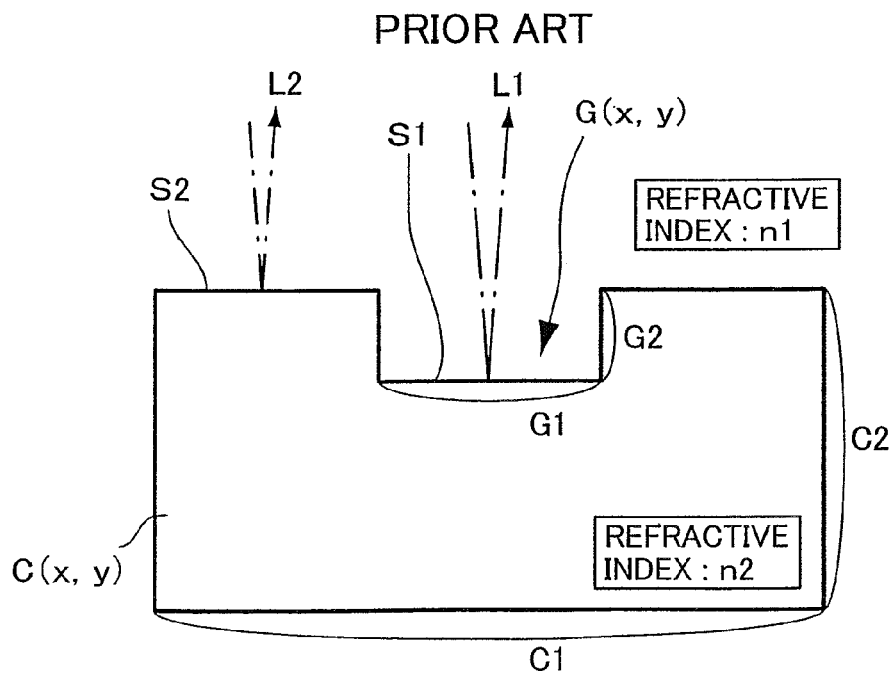
FIG. 10 is a front view for describing why, in a case where the three-dimensional cell C(x, y) shown in FIG. 8 is used as a reflecting cell, amplitude information is recorded as a width G1 of a groove G(x, y) and phase information is recorded as a depth G2 of the groove G(x, y)

Meanwhile, FIG. 10 is a front view of a case where emitted light components are obtained as reflected light components from the three-dimensional cell C(x, y). In this example, upper surfaces of the three-dimensional cell C(x, y), that is, the surfaces S1 and S2 are reflecting surfaces, and a light component L1 that is made incident substantially perpendicularly onto the surface S1 at the interior of the groove G(x, y) and a light component L2 that is made incident substantially perpendicularly onto the surface S2 at the exterior of the groove G(x, y) are reflected and emitted substantially perpendicularly from the respective surfaces. Here, it can be understood from a comparison of the total optical path lengths along the paths of incidence and reflection that the optical path length of the light component L1 is longer by twice the depth G2 of the groove G(x, than the optical path length of the light component L2. A predetermined phase difference thus arises between the light component L1 and the light component L2 that are emitted as reflected light from the physical cell C(x, y).

Thus when the three-dimensional cell C(x, y) is a transmitting type cell or a reflecting type cell, a predetermined phase difference arises between the light component made incident on the surface S1 at the interior of the groove G(x, y), and the light component L2, made incident on the surface S2 at the exterior of the groove G(x, y), and the phase difference is determined according to the depth G2 of the groove G(x, y). Thus when just the emitted light components, which are obtained based on the light components that, among the light components made incident on the upper surface of the three-dimensional cell C(x, y), are made incident on the surface S1 at the interior of the groove G(x, y), are handled as the emitted light components effective for the reproduction of the object image 10 (in other words, when just the light components L1 are handled as the emitted light components effective for reproduction of the image in FIGS. 9 and 10), the emitted light components L1 that are effective for image reproduction are subject to phase modulation by the specific phase corresponding to the depth G2 of the groove G(x, y) in the three-dimensional cell C(x, y). The phase information of the object light can thus be recorded as the depth G2 of the groove G(x, y).

Also by handling just the emitted light components, obtained based on the light components made incident onto the surface S1 at the interior of the groove G(x, y), as the emitted light components effective for reproduction of the object image 10 as described above, the amplitude information of object light can be recorded as the width G1 of the groove G(x, y). This is because the wider the width G1 of the groove G(x, y), the greater the area of the surface S1 at the interior of the groove G(x, y) and thus the greater the proportion of the emitted light components effective for reproduction of the object image 10. That is, because the emitted light components L2, shown in FIGS. 9 and 10, do not contain any meaningful phase components, even if the emitted light components L2 are observed at a viewpoint position during reproduction, these are merely observed as so-called background noise components and are not recognized as light components effective for reproduction of a meaningful image. On the other hand, the emitted light components L1 contain meaningful phase components and are thus observed as signal components effective for image reproduction. The width G1 of the groove G(x, y) is thus a factor that determines the proportion of the light components L1 that are observed as signal components from among the light components emitted from the physical cell C(x, y) and is thus a parameter that provides amplitude information of signal waves.

Figure 11:
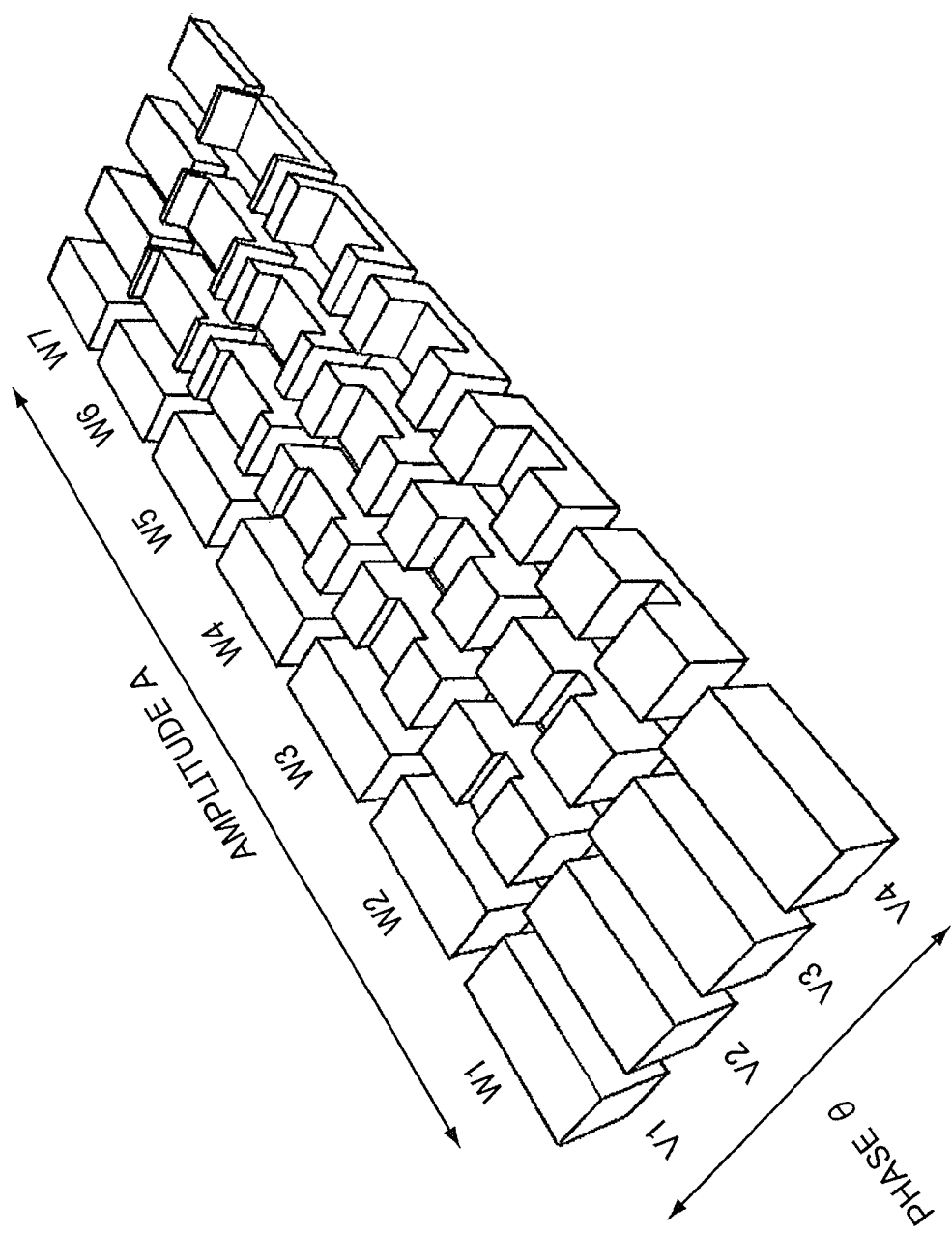
FIG. 11 is a perspective view of an example of preparing a total of 28 types of physical cells upon determining seven types of groove widths and four types of depths for the structure of the three-dimensional cell C(x, shown in FIG. 8.

With the physical cell C(x, y), having the groove G(x, y) as shown in FIG. 8, the width G1 and the depth G2 of the groove can be varied continuously, and thus theoretically speaking, infinite types of physical cells can be prepared. By using such infinite types of physical cells, a virtual cell can be replaced by a physical cell having an accurate groove width G1 that is in accordance with the specific amplitude defined for the virtual cell and an accurate depth G2 that is in accordance with the specific phase. However, for practical use, a types of groove width and b types of depth are determined in advance, a total of a×b types of physical cells are prepared, and physical cells that are closest to the required optical characteristics are selectively used from among the prepared physical cells. FIG. 11 is a perspective view of an example where seven types of groove width and four types of depth are determined and a total of 28 types of physical cells are prepared. These 28 types of physical cells are all block-like physical cells of the form shown in FIG. 8, and FIG. 11 shows a state in which these physical cells are positioned in array form in four rows and seven columns.

The seven columns of the array shown in FIG. 11 indicate variations of the amplitude A and the four rows indicate variations of the phase θ. For example, the cells positioned in a column W1 are cells corresponding to a minimum value of the amplitude A and are cells with which the groove width G1=0, that is, cells with which the groove G is not formed at all. In the rightward direction from a column W2 to a column W7, the cells correspond to greater values of the amplitude A and the groove width G1 widens gradually. The cells positioned in the column W7 are cells corresponding to a maximum value of the amplitude A and are cells with which the groove width G1=cell width C1, that is, cells with which an entire surface is excavated. Also, to take note of the rows of the array shown in FIG. 11, for example, the cells positioned in a row V1 are cells corresponding to a minimum value of the phase θ and are cells with which the groove depth G2=0, that is, cells with which the groove G is not formed at all. In the downward direction from a row V2 to a row V4, the cells correspond to greater values of the phase θ and the groove depth G2 increases gradually.

However, physical manufacture of an optical element constituted of a set of the three-dimensional cells with the structure according to the prior invention requires microfabrication techniques and a manufacturing process of high precision. For example, with the three-dimensional cell shown in FIG. 8, the horizontal width C1 of the cell is set to 0.6 μm. Thus in order to record values of the amplitude A at a precision of seven stages as in the example shown in FIG. 11, seven variations of the groove width G1 must be prepared, and a setting, such as G1=0 for the cells of the column W1, G1=0.1 μm for the cells of the column W2, G1=0.2 μm for the cells of the column W3, G1=0.3 μm for the cells of the column W4, G1=0.4 μm for the cells of the column W5, G1=0.5 μm for the cells of the column W6, and G1=0.6 μm (that is, equal to the horizontal width C1 of each cell) for the cells of the column W7, becomes necessary.

For forming grooves of such microscopic widths as 0.1 μm, 0.2 μm, 0.3 μm, 0.4 μm, and 0.5 μm at high precision, a device of extremely high processing precision is required. It is thus difficult to improve productivity when an optical element is formed by a set of three-dimensional cells with the structure shown in FIG. 8. The present invention proposes a new method of providing an optical element, with which the manufacturing process is comparatively easy and the productivity is excellent in comparison to the optical element disclosed by the prior invention. This method shall now be described from Section 4 onward.

<<<Section 4. Basic Structure of a Three-Dimensional Cell Used in the Present Invention>>>

Figure 12:
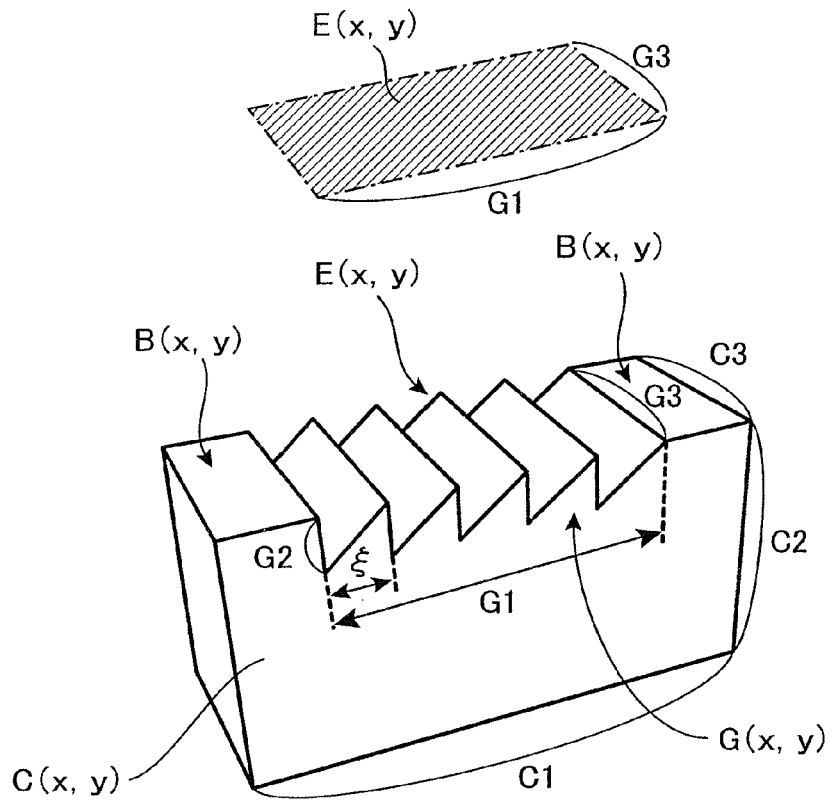
FIG. 12 is a perspective view of an example of a structure of a physical three-dimensional cell C(x, y) used in a basic embodiment of the present invention.

FIG. 12 is a perspective view of an example of a structure of a physical, three-dimensional cell C(x, y) used in a basic embodiment according to the present invention. A comparison of the three-dimensional cell C(x, y) proposed in the prior invention shown in FIG. 8 and the three-dimensional cell C(x, y) according to the present invention shown in FIG. 12 shows that both are three-dimensional cells with a rectangular parallelepiped basic shape and have a point in common in that a specific amplitude and a specific phase are recorded in each individual cell. However, the cells differ in the form of recording of the specific amplitude and the specific phase.

That is, as shown in FIG. 8, with the former arrangement, the groove G(x, y) is formed on the upper surface of the cell with the rectangular parallelepiped basic shape, the amplitude A is expressed by the width G1, and the phase θ is expressed by the depth G2. Meanwhile, as shown in FIG. 12, with the latter arrangement, a diffraction grating G(x, y) is formed on an upper surface of the cell with the rectangular parallelepiped basic shape to record the amplitude A and the phase θ. Because the role of the groove in the former arrangement is served by the diffraction grating in the latter arrangement, the same symbol G(x, y) as that of the groove in FIG. 8 shall be used for the diffraction grating in FIG. 12 for the sake of description. The symbol (x, y) of the diffraction grating G(x, y) and the three-dimensional cell C(x, y) indicates that the cell is disposed at the position of the representative point P(x, y) on the XY coordinate system shown in FIG. 5.

In FIG. 12, dimensions C1, C2, and C3 are dimensions of the rectangular parallelepiped that is the basic shape of the three-dimensional cell C(x, y), a dimension G1 is a length of a region in which the diffraction grating G(x, y) is formed, a dimension G2 is a depth from a shallowest portion to a deepest portion of a relief structure that constitutes the diffraction grating G(x, y), and a dimension G3 is a width of the region in which the diffraction grating G(x, y) is formed. Consequently, the diffraction grating G(x, y) is formed in a rectangular region E(x, y), having the dimensions G1×G3, as indicated by hatching at an upper portion of the figure. Here, this rectangular region shall be referred to as the "effective region E(x, y)," and regions of the cell upper surface besides the effective region E(x, y) shall be referred as "blank regions B(x, y)."

With the present invention, the specific amplitude A for the three-dimensional cell C(x, y) is recorded as an area of the effective region E(x, y). That is, with a cell with a low specific amplitude A, the area of the effective region E(x, y) is set to a small area, and with a cell with a high specific amplitude A, the area of the effective region E(x, y) is set to a large area. The minimum value of the effective region E(x, y) is 0 (a diffraction grating is not formed at all in this case), and the maximum value is the area of the entire upper surface of the cell (in this case, there are no blank regions B(x, y)). Thus in the case of the illustrated example, the dynamic range of the magnitude of the specific amplitude A is 0 to "C1×C3." As shall be described below, for an observer of the optical element according to the present invention, diffracted light due to the diffraction grating G(x, is observed and thus a stronger diffracted light is observed with a cell with an effective region E(x, y) of larger area. The three-dimensional cell shown in FIG. 12 thus functions as a cell according to the model shown in FIG. 6 in regard to the amplitude A.

Obviously in putting the present invention into practice, cells having a rectangular parallelepiped basic shape do not necessarily have to be used as the three-dimensional cells. However, for practical use, because the optical element is formed by positioning the three-dimensional cells in matrix form as shown in FIG. 5, a rectangular parallelepiped is most preferable as the basic shape of the cells. Also, although the shape of the effective region E(x, y) does not necessarily have to be a rectangle, in order to simplify a process of physically forming a diffraction grating, a rectangle is most preferable in terms of practical use. Furthermore, although in the example shown in FIG. 12, the effective region E(x, y) is set at substantially the center of the section of the length C1 of the cell and the blank regions B(x, y) are disposed at the respective sides, for example, an arrangement is also possible in which the effective region E(x, y) is moved to a left end of the upper surface of the cell C(x, y) and a blank region B(x, y) is disposed at just a right side portion in the figure.

With the embodiment described here, a structure is employed in which the variation of the uneven shape of the diffraction grating occurs in a direction along a side of the effective region E(x, y) with the dimension G1, and there is no variation whatsoever of the uneven shape in a direction along a side with the dimension G3. The width G3 of the effective region E(x, y) is also set to be always equal to the width C3 of the cell. Thus for any cell, a diffraction grating is formed across the entire width (dimension C3) of the cell, and the area of the effective region E(x, y) is mainly defined by the dimension G-1 (the area of the effective region E(x, y) is proportional to the dimension G1).

Obviously, the width G3 of the effective region E(x, y) does not necessarily have to be always set equal to the width C3 of the cell. However, as shall be described later, in putting the present invention into practice, it is preferable to make the dimension C3 of the three-dimensional cell C(x, y) considerably small in comparison to the dimension C1 (in order to heighten the effect of stereoscopic vision). Thus for practical use, it is preferable to set the width G3 of the effective region E(x, y) to be always equal to the width C3 of the cell and to form the diffraction grating across the entire width (dimension C3) of the cell in all cells regardless of the value of the amplitude A to be recorded. Although an example where the diffraction grating G(x, y) is formed as a relief structure formed of a large number of slopes (a structure with which a cross-section takes on a sawtooth-like alignment of triangles) is described here, the relief structure that forms the diffraction grating is not restricted to such an example (a structural example of a staircase form shall be described later).

Figure 13:
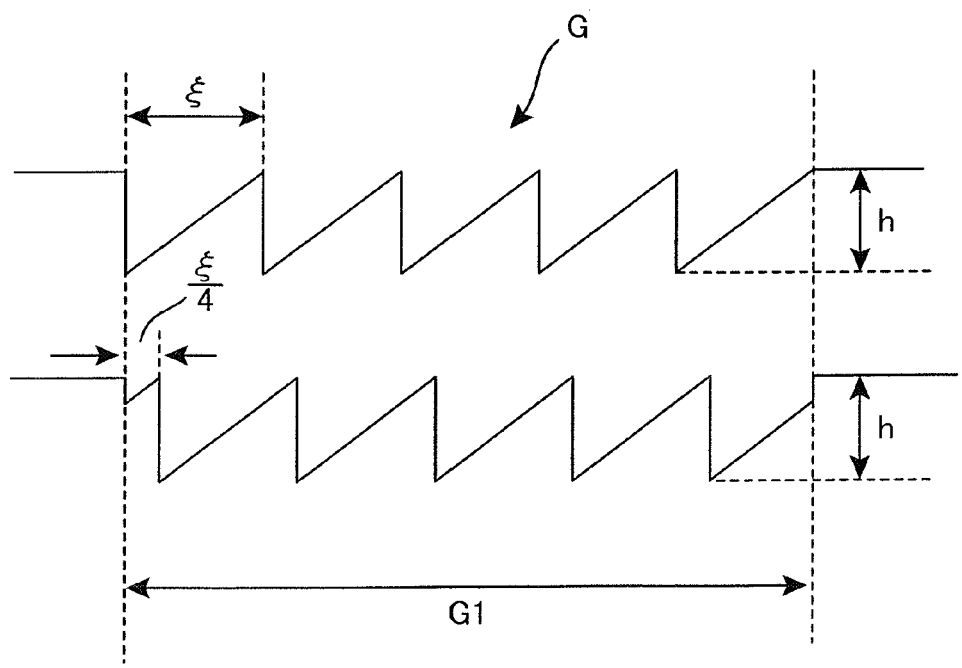
FIG. 13 is an enlarged front view of principles of recording a phase θ in the three-dimensional cell C(x, y) shown in FIG. 12.

A method for recording the specific phase θ in the three-dimensional cell shown in FIG. 12 shall now be described. FIG. 13 shows enlarged front views of principles of recording the phase θ. An enlarged front view of a portion of the diffraction grating G(x, y), shown in FIG. 12, is shown at an upper stage of the figure, and this shows a state where the diffraction grating G with the relief structure formed of slopes is formed inside the effective region E(x, y) with the length G1. As illustrated, the diffraction grating G is a structure having a periodic uneven shape variation with a period ξ, and a depth from a shallowest portion to a deepest portion of this relief structure is h (corresponds to the dimension G2 in FIG. 12). With a structure having such a periodic uneven shape with the predetermined period ξ, the phase θ can be defined as a spatial, positional phase.

For example, the structure shown at a lower stage of FIG. 13 can be obtained by moving the relief structure portion (the portion in the effective region having the length G1), shown at the upper stage of FIG. 13, by just ξ/4 to the right. Because the period ξ corresponds to a phase difference of 2π, the movement amount ξ/4 corresponds to a phase difference of π/2. Thus when the phase θ of the diffraction grating, shown in the upper stage of FIG. 13, is defined as a reference value of 0, the phase θ of the diffraction grating shown at the lower stage of FIG. 13 is π/2. By thus shifting the relief structure portion in the horizontal direction of the figure by just a predetermined amount within the range of the period ξ, structures corresponding to phases θ within a range of 0 to 2π can be obtained. Thus, for example, for a three-dimensional cell, in which a specific phase θ=0 is to be recorded, a diffraction grating with a structure such as that shown at the upper stage of FIG. 13 is formed, and for a three-dimensional cell, in which a specific phase θ=π/2 is to be recorded, a diffraction grating with a structure such as that shown at the lower stage of FIG. 13 is formed.

A three-dimensional cell, with which the phase θ is recorded as a spatial, positional phase of a periodic variation of uneven shape, functions as a cell that is in accordance with the model shown in FIG. 6 in regard to the phase θ. The reasons for this shall now be described. First, an optical element shall be arranged by arraying physical, three-dimensional cells with such a structure in the form of a two-dimensional matrix and an environment of illuminating reconstruction illumination light onto this optical element to reproduce an object image 10, recorded as a hologram, shall be considered.

Figure 14:
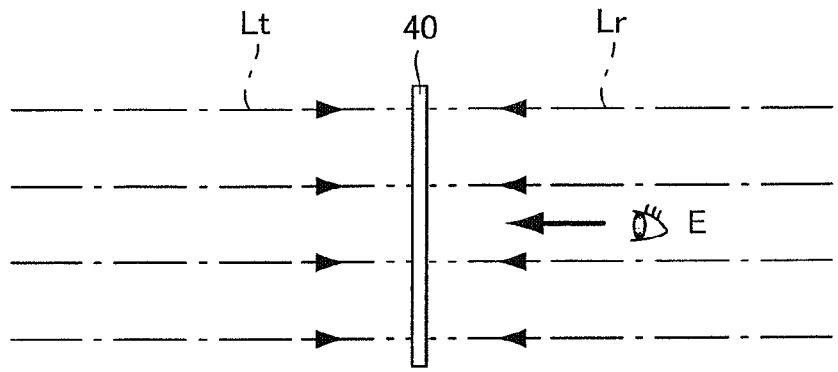
FIG. 14 is a side view of an embodiment of illuminating a reconstruction illumination light onto an optical element from normal directions and observing an object image, recorded as a hologram, from a normal direction.

FIG. 14 is a side view showing a relationship of an optical element 40 (a hologram recording medium using physical cells), a reconstruction illumination light Lt or Lr, and a viewpoint E in a case of carrying out such reproduction. In a case where the optical element 40 is a transmitting type that uses transmitting cells, the reconstruction illumination light Lt is illuminated onto a surface at the opposite side of the viewpoint E as illustrated to observe light transmitted through the optical element 40 at the viewpoint E, and in a case where the optical element 40 is a reflecting type that uses reflecting cells, the reconstruction illumination light Lr is illuminated onto a surface at the same side as the viewpoint E as illustrated to observe light reflected from the optical element 40 at the viewpoint E. In either case, when the optical element 40 is arranged by using physical cells that each function as a cell that is in accordance with the model shown in FIG. 6, the reconstruction illumination light Lt or Lr is provided as planar waves of monochromatic light, the reconstruction illumination light Lt or Lr is illuminated from a direction of a normal to a recording plane (the two-dimensional array surface on which the physical cells are arrayed) as shown in FIG. 14 (in other words, the reconstruction illumination light is illuminated so that the wavefronts are parallel to the recording plane of the optical element 40), and image observation is performed in a direction of a normal to the recording plane, a correct reproduction image is observed.

Figure 15:
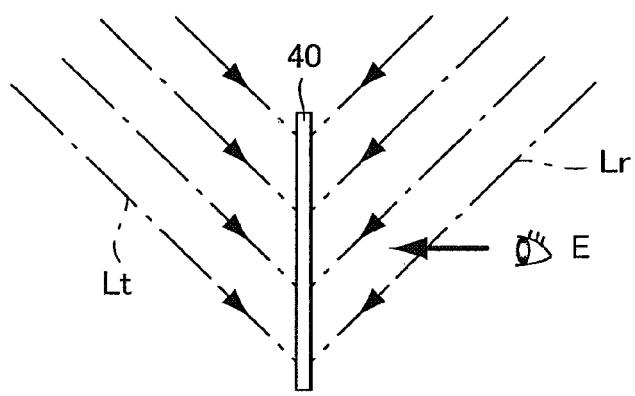
FIG. 15 is a side view of an embodiment of illuminating reconstruction illumination light onto an optical element from oblique directions and observing an object image, recorded as a hologram, from a normal direction.
Figure 16:
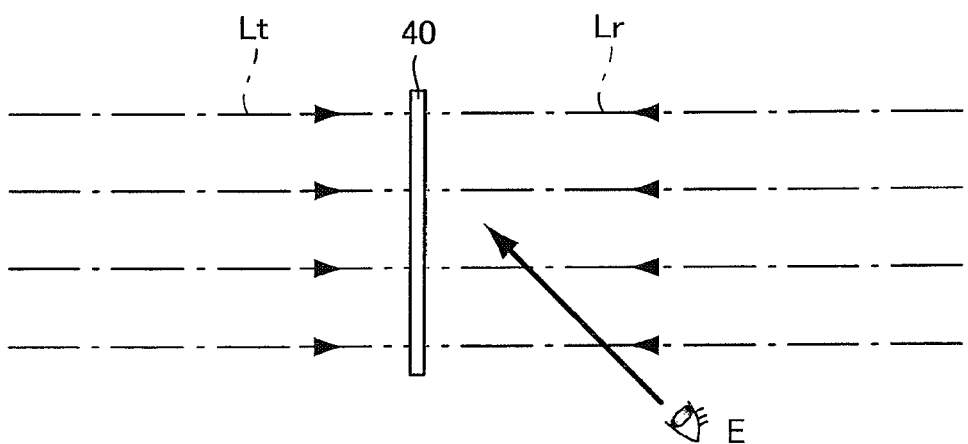
FIG. 16 is a side view of an embodiment of illuminating reconstruction illumination light onto an optical element from normal directions and observing an object image, recorded as a hologram, from an oblique direction.

However, an actual reproduction environment of the optical element 40, having the object image 10 recorded as a hologram, is not necessarily an ideal environment, such as that shown in FIG. 14. Especially in the case of a reflecting type, because a head of an observer is positioned at the position of the viewpoint E, even if the reconstruction illumination light Lr is illuminated from the direction shown in FIG. 14, a shadow of observer is formed on the optical element 40 and good reproduction cannot be carried out. Thus generally, an actual reproduction environment takes on a form where, as shown in FIG. 15, the reconstruction illumination light Lt or Lr is illuminated from a direction oblique to the recording plane of the optical element 40 and the reproduced image is observed at a viewpoint E that is positioned in a normal direction, or a form where, as shown in FIG. 16, the reconstruction illumination light Lt or Lr is illuminated from a direction of a normal to the recording plane of the optical element 40 and the reproduced image is observed at a viewpoint E that is positioned in an oblique direction, or a form where both the illumination direction of the reconstruction illumination light Lt or Lr and the direction of observation from the viewpoint E are set as oblique directions.

In order to prepare the optical element 40 that can provide a good reproduction image in such an actual reproduction environment, a means of directing the reconstruction illumination light, emitted from the optical element 40, in the direction of the predetermined viewpoint E is needed. In the prior invention, a method of performing a modification process in regard to the specific phase to be recorded as the depth of the groove of each individual three-dimensional cell (cell with the groove shown in FIG. 8) is employed as this means. On the other hand, with the three-dimensional cell according to the present invention, because the diffraction grating is formed in place of the groove, the reconstruction illumination light can be directed to propagate in the direction of the predetermined viewpoint E by using the diffraction function of the diffraction grating.

Figure 17:
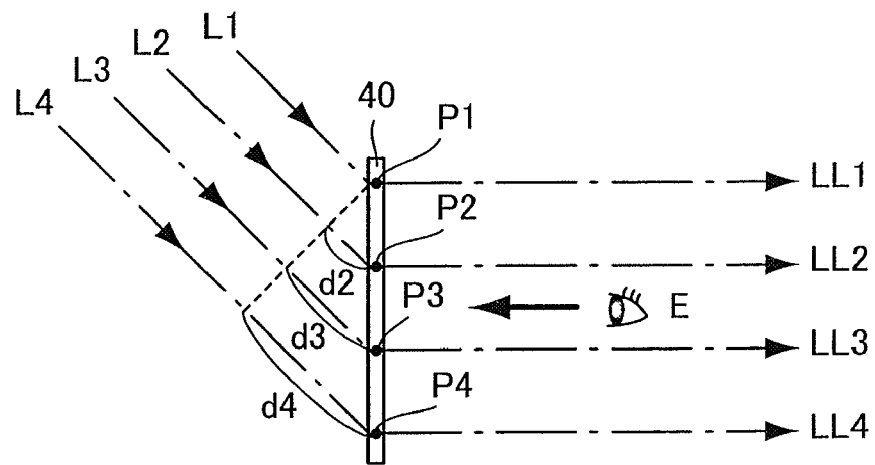
FIG. 17 is a side view of principles of using a diffraction phenomenon by a diffraction grating to prepare an optical element corresponding to the reproduction environment shown in FIG. 15.

As an example, a case shall be considered where, as shown in FIG. 17, reconstruction illumination light components L1 to L4 are illuminated from oblique directions and light components LL1 to LL4 that are modulated in amplitude and phase by transmission through the optical element 40 (LL1 to LL4 are the light components that reproduce the wavefronts of the object light from the object image 10) are observed from the viewpoint E that is positioned in a normal direction. Here, it is noted that the optical element 40 functions as a diffraction grating, and arrangements are made to make the reconstruction illumination light components L1 to L4, incident on the diffraction grating, be diffracted and directed toward the viewpoint E as the diffracted light components LL1 to LL4.

Here, a simple case where the reconstruction illumination light components L1 to L4 are monochromatic planar waves with a wavelength λ shall be considered. When such reconstruction illumination light components are illuminated in oblique directions onto the optical element 40, optical path differences arise at the point in time at which points P1 to P4 on the optical element 40 are reached, and phase differences are thus already present in the incident light itself at the respective points P1 to P4. For example, because the light components incident on the positions of the points P2, P3, and P4 are longer in optical path length by d2, d3, and d4, respectively, with respect to the light component incident onto the position of the point P1, phase differences, corresponding to these optical path differences, are already present in the incident light itself. To begin with, the phenomenon of diffraction of light can be said to be a phenomenon by which light components are emitted in directions such that eliminate such phase differences that arise according to position. Thus if the diffracted light components LL1 to LL4 are obtained in the illustrated directions by the diffraction function of the optical element 40, the phase differences that had arisen among the diffracted light components LL1 to LL4 are already eliminated and among the light components that reach the viewpoint E, there are no phase differences due to the optical path lengths d2, d3, and d4.

Figure 18:
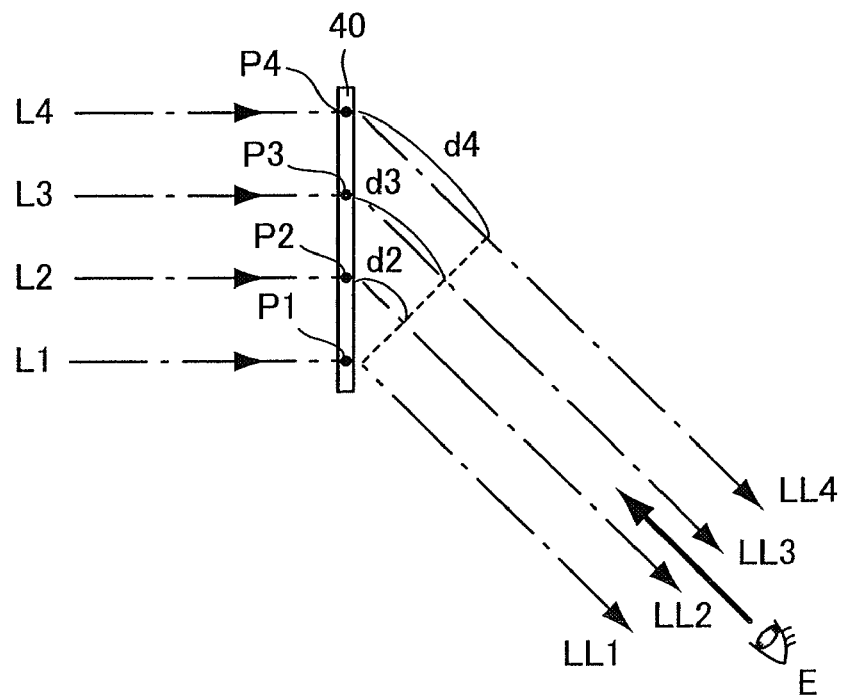
FIG. 18 is a side view of principles of using a diffraction phenomenon by a diffraction grating to prepare an optical element corresponding to the reproduction environment shown in FIG. 16.

Meanwhile, FIG. 18 is a side view of a case where the reconstruction illumination light components L1 to L4 are illuminated from normal directions and the light components LL1 to LL4 that are modulated in amplitude and phase by transmission through the optical element 40 (LL1 to LL4 are the light components that reproduce the wavefronts of the object light from the object image 10) are observed from the viewpoint E that is positioned in an oblique direction. It shall be deemed that the reconstruction illumination light components L1 to L4 are monochromatic planar waves with the wavelength λ in this case as well and here, it shall be deemed that the reconstruction illumination light components are illuminated onto the optical element 40 from normal directions.

In this case, although at the point of arrival at the respective points P1 to P4 on the optical element 40, no optical path differences have arisen and the phases of the incident light components are equal at the respective points P1 to P4, differences in optical path length arise as the emitted light components emitted from the respective positions of the points P1 to P4 reach the viewpoint E. For example, in comparison to the light component emitted from the position of the point P1, the light components emitted from the positions of the points P2, P3, and P4 are longer in optical path length by just d2, d3, and d4, respectively. However, that the diffracted light components LL1 to LL4 are obtained in the respective illustrated directions by the diffraction function of the optical element 40 means that, for the diffracted light components LL1 to LL4 emitted in these directions, the phase differences due to the optical path lengths d2, d3, and d4 are canceled out and that among the light components that reach the viewpoint E, there are no phase differences due to the optical path lengths d2, d3, and d4.

Although the phenomenon regarding the transmitting type optical element 40 was described above, the basic phenomenon is completely the same with a reflecting type optical element 40 as well. Thus with the present invention, three-dimensional cells, each having a diffraction grating, are used, and by setting a diffraction angle suited for a specific observation environment in advance, an optical element premised on the observation environment shown in FIG. 17 or FIG. 18 is prepared.

Although the phenomenon of diffraction of light by a diffraction grating can be said to be a phenomenon by which the phase differences, based on the optical path differences of light components observed via the positions P1 to P4 shown in FIGS. 17 and 18, are eliminated, in the present invention, the phase $\theta$ that is recorded in each individual three-dimensional cell is irrelevant to the phase differences that are eliminated by this diffraction phenomenon. That is, when the light components that arrive at the viewpoint E in the final stage of observation are noted, the phase differences that arise due to the optical path differences d2 to d4, shown in FIGS. 17 and 18, are eliminated by the diffraction phenomenon, and phase differences due to geometrical positions on the optical element 40 do not arise. However, each individual three-dimensional cell has a specific phase $\theta$ recorded therein (this is recorded as the shift amount of the relief structure portion as in the example shown in FIG. 13), and the phase difference that arises due to the specific phase $\theta$ influences the phase of the light that arrives at the viewpoint E in the final stage of observation. The object image 10 can thus be observed as a hologram image at the viewpoint E.

Figure 19:
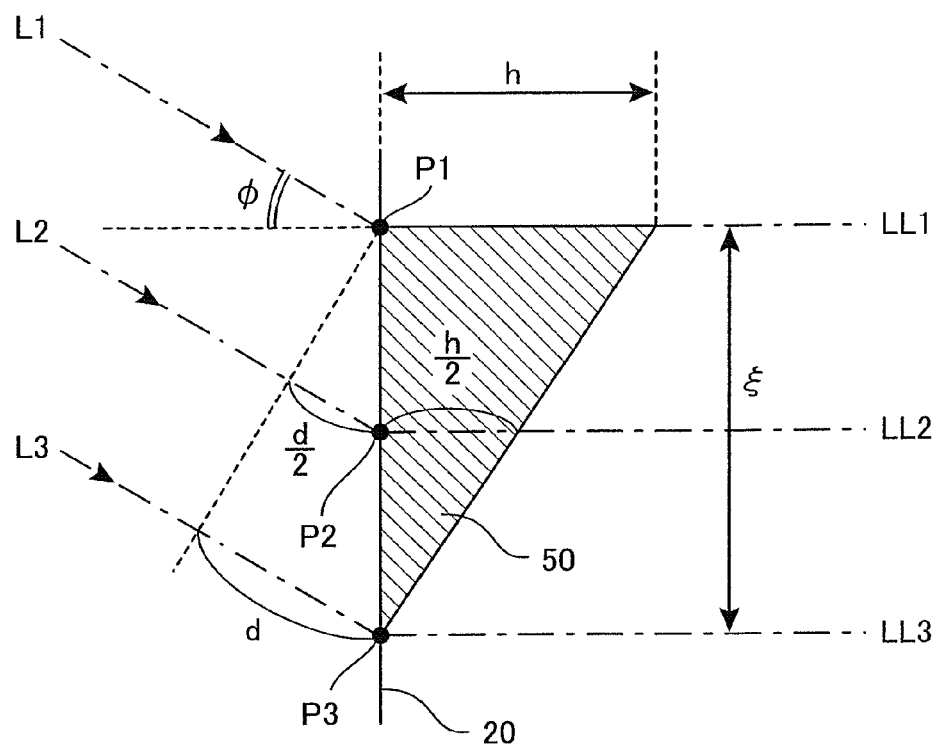
FIG. 19 is a side view of the principles of the diffraction phenomenon shown in FIG. 17.
Figure 20:
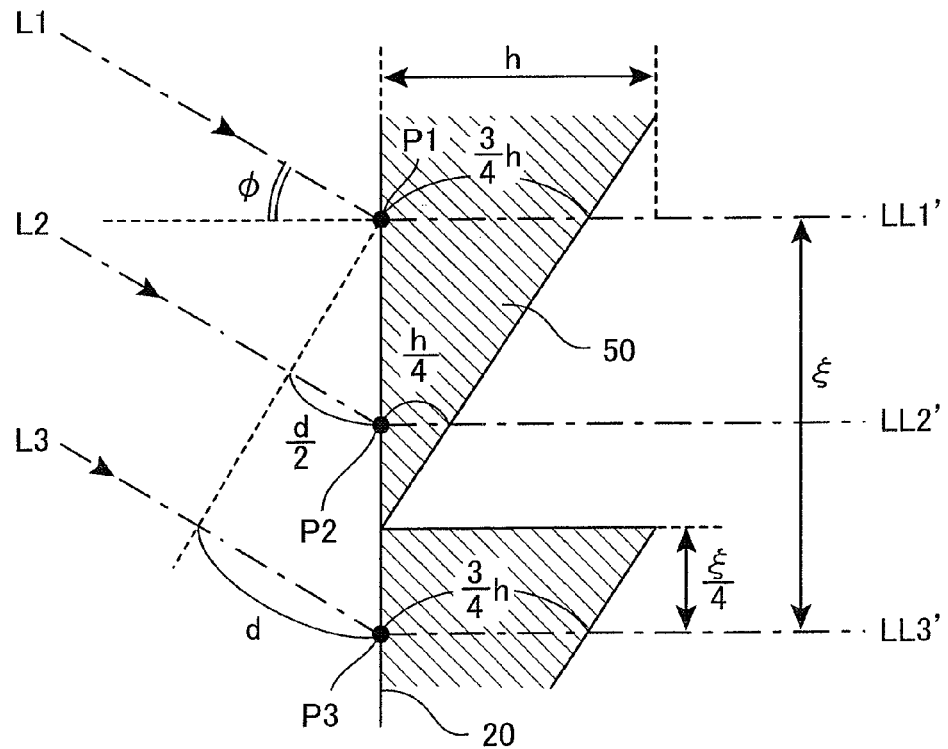
FIG. 20 is another side view of the principles of the diffraction phenomenon shown in FIG. 17.

This point shall now be described in more detail with reference to FIGS. 19 and 20. Although both drawings show a portion of the optical element 40 prepared under the premise of the observation environment shown in FIG. 17, that is, both drawings are enlarged views of a portion corresponding to a single period $\xi$ of a diffraction grating of a three-dimensional cell, the two differ in terms of the phase of the diffraction grating. FIG. 19 shows a cell in which a phase $\theta=0$ is recorded as shown at the upper stage of FIG. 13, and FIG. 20 shows a cell in which a phase $\theta=\pi/2$ is recorded as shown at the lower stage of FIG. 13. In both drawings, a triangular portion 50, provided with hatching, is shown at a right side portion of the recording plane 20, and this triangular portion 50 is a portion that constitutes the relief structure of the diffraction grating and it shall be deemed that this portion is constituted of a light transmitting material with a predetermined refractive index. Here, it shall be deemed that the triangular portion 50 is placed in a medium with a refractive index n1 (in a general case of observing the optical element in the air, n1 is the refractive index of air) and that the triangular portion 50 itself has a refractive index n2.

Although in actuality, a main body portion of the cell that is formed of the same material is present at the left side portion of the recording plane 20, here, for the sake of description, the behavior of light in regard to just the hatched triangular portion 50 shall be considered. A dimension h in a horizontal direction of the triangular portion 50 is a depth from a shallowest portion to a deepest portion of the relief structure, and a dimension $\xi$ in a vertical direction is a single period of the uneven shape variation.

First, a case of the cell, shown in FIG. 19 and in which the phase $\theta=0$ is recorded, shall be considered. In the illustrated example, when reconstruction illumination light components L1 to L3 are illuminated in an oblique direction from the upper left of the triangular portion, diffracted light components LL1 to LL3 are obtained in a right direction of the figure. Here, if an incidence angle of the reconstruction illumination light components L1 to L3 is $\phi$, the reconstruction illumination light components L1 to L3 are emitted upon being diffracted by just a diffraction angle $\phi$ by the diffraction grating. In general, a diffraction angle $\phi$ of light of a wavelength $\lambda$ by a diffraction grating with a periodic structure of a period $\xi$ is given by the formula:

$$\tau \sin \phi = m\lambda$$

where m is an order of diffracted light (m=0, ±1, ±2, ±3, ...).

In the observation environment shown in FIG. 17 or 18, because a comparatively bright reproduction image can be obtained in a case where first-order diffracted light (m=±1) is obtained at the viewpoint E, for practical use, it is preferable to carry out design based on the case of m=1 (or on the case of m=−1). Thus if the case of m=1 is to be considered, the following formula is obtained from the above formula:

$$\xi \sin \phi = \lambda$$

Here, if an optical path difference between a reconstruction illumination light component L1 that reaches an incidence point P1 and a reconstruction illumination light component L3 that reaches an incidence point P3 is d as shown in FIG. 19, because geometrically, $d=\xi \sin \phi$, the above formula indicates the relationship: optical path difference $d=\lambda$. This signifies that the phase difference of the reconstruction illumination light components L1 and L3 that reach the points P1 and P3, which are separated by just $\xi$, is the wavelength $\lambda$. Because the phase difference $2\pi$ that corresponds to the wavelength $\lambda$ is equivalent to the phase difference 0, the above formula has the significance of being a condition by which a phase difference does not arise between the reconstruction illumination light components L1 and L3 that reach the points P1 and P3, which are separated by just $\xi$.

Meanwhile, the reconstruction illumination light component L1 that reaches the point P1 is diffracted by just the angle $\phi$ and emitted as the diffracted light component LL1. Here, after passing through the triangular portion 50, formed of the light transmitting material with the refractive index n2, the light propagates into the medium (generally, air) with the refractive index n1. In this case, the distance of passage through the triangular portion 50 (the material with the refractive index n2) is h. On the other hand, although the reconstruction illumination light component L3 that reaches the point P3 is diffracted by just the angle $\phi$ and emitted as the diffracted light component LL3, the distance of passage through the triangular portion 50 (the material with the refractive index n2) is 0. Thus when the distance h is determined so that the phase difference between "propagation of light of the wavelength λ through the material with the refractive index n1 by just the distance h" and "propagation of light of the wavelength λ through the material with the refractive index n2 by just the distance h" is 2π and the height of the triangular portion 50 is set equal to this distance h, a phase difference does not arise (the phase difference of 2π that arises at the point of incidence is canceled out) between the diffracted light components LL1 and LL3 that have been emitted from the points P1 and P3 and have passed through the triangular portion 50.

The phase difference of a reconstruction illumination light component that is made incident on an arbitrary intermediate point between the points P1 and P3 shall now be considered. For example, at a point of reaching an incidence point P2 (which shall be deemed to be a midpoint between the points P1 and P3 here), the reconstruction illumination light component L2 shown in FIG. 19 has an optical path difference of d/2 with respect to the reconstruction illumination light component L1 that reaches the incidence point P1. Here, because as mentioned above, the optical path difference d=λ, the optical path difference d/2 corresponds to λ/2. The reconstruction illumination light component L2 that reaches the incidence point P2 thus gives rise to a phase difference of just λ with respect to the reconstruction illumination light component L1 that reaches the incidence point P1.

However, this phase difference of π becomes eliminated by propagation through the triangular portion 50. That is, because the height h of the triangular portion 50 is set to "the distance, for which the phase difference, between propagation through the material with the refractive index n1 by just the distance h and propagation through the material with the refractive index n2 by just the distance h, is 2π," the diffracted light component LL2 that has propagated through the triangular portion 50 by just the distance h/2 gives rise to a phase difference of just π during this propagation and cancels out the phase difference π that arose due to the optical path difference of d/2. The phenomenon, by which the optical path difference, occurring at the point in time of incidence on the recording plane 20, is canceled out by the passage through the triangular portion 50, does not occur only with the reconstruction illumination light component L2 but also occurs in likewise manner with any reconstruction illumination light component that is made incident on an arbitrary position between the points P1 and P3.

A phase difference that arises due to a geometrical difference in incidence position on the recording plane 20 is thus canceled out by passage through the triangular portion 50. This is a basic function of a diffraction grating with a periodic structure such as that illustrated and the phenomenon, with which a light component is bent in a direction in which such cancellation of phase difference occurs, is the essence of diffraction of light. However, even if this phenomenon of cancellation of phase difference due to a geometrical difference in incidence position occurs, the specific phase θ that is recorded in each individual three-dimensional cell is observed as a phase of the diffracted light that reaches the viewpoint E. The reason for this can be readily understood by a comparison of the phenomenon that occurs in the diffraction grating shown in FIG. 19 and the phenomenon that occurs in the diffraction grating shown in FIG. 20.

The triangular portion 50, having the exact same shape as that of the diffraction grating shown in FIG. 19, is disposed on the diffraction grating shown in FIG. 20 as well. The only difference between the two is that the position of the triangular portion 50 is shifted by just ξ/4 (that is, there is a phase difference of π/2). Thus when the cell shown in FIG. 20 is noted, because phase differences that arise due to geometrical differences in incidence positions on the recording plane 20 are canceled out by passage through the triangular portion 50, a phase difference does not occur mutually among diffracted light components LL1', LL2', and LL3' that reach the viewpoint E. However, even if the reconstruction illumination light components L1, L2, and L3 and the incidence angle φ shown in FIG. 19 are exactly the same as the reconstruction illumination light components L1, L2, and L3 and the incidence angle φ shown in FIG. 20, the phase of the diffracted light LL1 shown in FIG. 19 and the phase of the diffracted light LL1' shown in FIG. 20 are different. Needless to say, the phase of the diffracted light LL2 shown in FIG. 19 and the phase of the diffracted light LL2' shown in FIG. 20 are also different, and the phase of the diffracted light LL3 shown in FIG. 19 and the phase of the diffracted light LL3' shown in FIG. 20 are different as well. The phase difference that occurs between these light components corresponds to the specific phase θ recorded in each cell.

For example, if the specific phase θ recorded in the cell shown in FIG. 19 is deemed to be θ=0 and thus made the base, the specific phase θ recorded in the cell shown in FIG. 20 becomes θ=λ/2 (a shift amount of ξ/4 corresponds to a phase of π/2). Here, a comparison of the phase of the diffracted light component LL1, shown in FIG. 19, and the diffracted light component LL1', shown in FIG. 20, shows the two to be equal in phase at the position of the incidence point P1. However, at the point of reaching the viewpoint E, whereas the diffracted light component LL1, shown in FIG. 19, has passed through the triangular portion 50 by just the distance h and is shifted in phase by 2π, the diffracted light component LL1', at the point of reaching the viewpoint E, has passed through the triangular portion 50 by just the distance (3/4)h and is shifted in phase by (3/4)×2π. Thus at the point of reaching the viewpoint E, there is a phase difference of 2π−(3/4)×2π=π/2 between the two light components.

In exactly the same manner, at the point of reaching the viewpoint E, a phase difference of π/2 occurs between the diffracted light component LL2, shown in FIG. 19, and the diffracted light component LL2', shown in FIG. 20. That is, a comparison of the phase of the diffracted light component LL2, shown in FIG. 19, and the diffracted light component LL2', shown in FIG. 20, shows the two to be equal in phase at the position of the incidence point P2. However, at the point of reaching the viewpoint E, whereas the diffracted light component LL2, shown in FIG. 19, has passed through the triangular portion 50 by just the distance h/2 and is shifted in phase by π, the diffracted light component LL2', at the point of reaching the viewpoint E, has passed through the triangular portion 50 by just the distance h/4 and is shifted in phase by (1/4)×2π. Thus at the point of reaching the viewpoint E, there is a phase difference of π−(1/4)×2π=π/2 between the two light components.

It can be understood that in exactly the same manner, at the point of reaching the viewpoint E, a phase difference of π/2 occurs between the diffracted light component LL3, shown in FIG. 19, and the diffracted light component LL3, shown in FIG. 20. Thus even if reconstruction illumination light components of exactly the same phase are illuminated at exactly the same incidence angle φ, the phase of the diffracted light observed from the cell shown in FIG. 20 is always shifted by π/2 with respect to the phase of the diffracted light observed from the cell shown in FIG. 19, regardless of the geometrical position. This is because whereas the specific phase θ that is recorded in the cell shown in FIG. 19 is θ=0, the specific phase θ that is recorded in the cell shown in FIG. 20 is θ=π/2.

It can thus be understood that a three-dimensional cell, in which a phase θ is recorded as a spatial, positional phase of a diffraction grating functions as a cell that is in accordance with the model shown in FIG. 6. Consequently, by using a three dimensional cell having the structure shown in FIG. 12, recording the specific amplitude A as the area of the effective region E(x, y), and recording the specific phase θ as the spatial, positional phase of the diffraction grating G(x, y), the three-dimensional cell is made to function as a cell that is in accordance with the model shown in FIG. 6, and the amplitude Ain of an incident light is modulated by the specific amplitude A(x, y) recorded in the cell and changed to the amplitude Aout and the phase θ in of the incident light is modulated by the specific phase θ(x, y) recorded in the cell and changed to the phase θ out.

<<<Section 5. Merits and Appropriate Dimensions of the Three-Dimensional Cell Used in the Present Invention>>>

Merits of the three-dimensional cell with the structure shown in FIG. 12 shall now be described. A greatest merit of this three-dimensional cell is that, in comparison to the three-dimensional cell of the prior invention shown in FIG. 8, the processing precision in manufacture is relaxed, thus making the manufacturing process comparatively easy and enabling the productivity to be improved.

With the embodiment of the prior invention, the values of: C1=0.6 μm; C2=0.25 μm; C3=0.25 μm; G1=0.2 μm; G2=0.05 μm; and G3=0.25 μm are given as examples of the dimensions of the respective portions of the three-dimensional cell shown in FIG. 8. In order to record values of the amplitude A at a precision of seven stages as in the example shown in FIG. 11, seven variations of the groove width G1 must be prepared, and grooves of such microscopic widths as 0.0 μm (no groove), 0.1 μm, 0.2 μm, 0.3 μm, 0.4 μm, 0.5 μm and 0.6 μm (full-surface groove) must be formed at high precision. Although presently, an electron beam lithography device, etc., is used to perform such microfabrication, even when a device of such high precision is used, it is difficult to accurately form grooves with widths that differ in increments of 0.1 μm.

Because even the recording of values of the amplitude A at a precision of seven stages is difficult, the recording of values of the amplitude A at higher precision is extremely difficult with present arts. For example, to record values of the amplitude A at a precision of 13 stages, grooves that differ in width in increments of 0.05 μm (0.0 μm, 0.05 μm, 0.10 μm, 0.15 μm, . . . ) must be formed accurately.

Although obviously if the size of the three-dimensional cell can be set to a larger size, the maximum value of the groove width G1 can be increased, when in the case where the three-dimensional cell having the groove structure shown in FIG. 8 is used, the size of the three-dimensional cell is made larger, the positional pitch of the individual cells must inevitably be made large as well and the function as an optical element, in which a hologram image is recorded, thus becomes impaired. To reproduce a hologram image, the entire set of such three-dimensional cells must serve a function equivalent to a hologram recording medium, on which interference fringes are recorded optically. Thus as long as the three-dimensional cells with the groove structure shown in FIG. 8 are used, the dimensions of each individual cell must be set to dimensions close to the wavelengths of visible light.

Specifically, if the positional pitch of the individual cells is set in a range of 0.2 μm to 4 μm, a reproduction image with a stereoscopic effect that is by no means inferior even in comparison to a hologram recording medium, on which interference fringes are recorded optically, can be obtained. If the positional pitch of the cells becomes less than 0.2 μm, it becomes difficult to form a clear hologram reproduction image with visible light. Oppositely, if the positional pitch of the cells exceeds 4 μm, it becomes difficult to form a reproduction image with an adequate stereoscopic effect. This is because as the positional pitch of the cells increases, the angle in which a stereoscopic vision can be obtained becomes narrow. For example, in the case where wavelength λ of the reconstruction illumination light is 555 nm, whereas the angle in which a stereoscopic vision can be obtained is approximately ±44° when the positional pitch of the cells is set to 0.4 μm, the angle in which a stereoscopic vision can be obtained becomes only approximately ±4° when the positional pitch of the cells is set to 4 μm.

Due to such reasons, when three-dimensional cells with the groove structure shown in FIG. 8 are used, a method of simply increasing the size of each cell to relax the processing precision conditions cannot be employed. Thus in the present invention, a method of relaxing the processing precision conditions while sacrificing the stereoscopic vision in regard to one direction among the two directions of vertical and horizontal along the recording plane is employed. The three-dimensional cell according to the present invention shown in FIG. 12 is a three-dimensional cell for use in such a method. When an optical element is formed by positioning such cells in matrix form along a recording plane, although a stereoscopic effect is obtained in regard to a depth direction of FIG. 12 (the direction parallel to the side with the length C3), a stereoscopic effect obtained in regard to a left/right direction of FIG. 12 (the direction parallel to the side with the length C1) is sacrificed.

Given such a premise of sacrificing the stereoscopic effect in regard to one direction, the length C1 of the cell can be set to a considerably large value in the three-dimensional cell according to the present invention shown in FIG. 12. In the case of a three-dimensional cell with the structure shown in FIG. 12 that the present applicant actually prepared (from an ultraviolet curable resin, having a refractive index of 1.52 for light of wavelength λ=555 nm), the dimensions of the respective portions are: C1=20 μm; C2=0.25 μm; C3=0.4 μm; G1=0 to 20 μm; G2=0.18 μm; G3=0.4 μm; and ξ=1 μm. Here, the length G1 of the effective region E(x, y) takes on a different value in each individual cell in accordance with the specific amplitude A to be recorded, with the minimum value being 0 μm and the maximum value being 20 μm. The case where G1=0 (minimum value) is the case where the specific amplitude A to be recorded in the cell is 0, and in this case a diffraction grating is not formed whatsoever on the cell: The case where G1=20 μm (maximum value) is the case where the specific amplitude A to be recorded in the cell takes on the maximum value, and in this case, a diffraction grating is formed across the entire upper surface of the cell and there are no blank regions B(x, y). Meanwhile, the depth G2 of the relief structure that forms the diffraction grating is a value that corresponds to the height h of the triangular portion shown in FIGS. 19 and 20, and as mentioned above, is set to a value suited to give rise to a phase difference of 2π. The specific value of the depth G2 (height h) must be determined in consideration of the structure of the three-dimensional cell, the refractive index of the material used, and the wavelength of light, and details shall be provided in Section 7.

Although both the three-dimensional cell according to the prior invention shown in FIG. 8 and the three dimensional cell according to the present invention shown in FIG. 12 are rectangular parallelepipeds in basic shape and are drawn to substantially the same size in terms of the drawings, in actuality, the shapes and dimensions of the two differ greatly. In particular, to take note of the length C1 of the cell in the horizontal direction, whereas C=0.6 μm in the three-dimensional cell according to the prior invention shown in FIG. 8, C=20 μm and differs significantly in the three-dimensional cell according to the present invention shown in FIG. 12. That is, with the three-dimensional cell according to the present invention shown in FIG. 12, whereas the cell width is C3=0.4 μm, the cell length is C1=20 μm, and in regard to the embodiment with these dimensions, FIG. 12 is a figure that is drawn with the dimensional ratios being ignored. A three-dimensional cell prepared according to the dimensions will be a stick-like cell that is long in the lateral direction in FIG. 12.

Here, the reason for setting the dimensions of the respective portions of the cell to the values given above shall be described. The respective dimension values given above are determined as optimal values for a case of preparing a reflecting type optical element to be used as a forgery prevention seal for a credit card, etc. To visually check the contents of a credit card, a viewpoint is normally set in front of the credit card (optical element 40) that is held in a hand and observation is performed using a reconstruction illumination light from lighting installed on a ceiling of a room. The observation environment in this case corresponds to an example, with which the positions of the reconstruction illumination light components L1 to L4 in the transmitting type example shown in FIG. 17 are changed to positions that are plane-symmetrical to the recording plane of the optical element 40. Here, for example, when on a premise of an observation environment with which the incidence angle φ=40° (on a premise that the reconstruction illumination light components, which are directed vertically downward from the ceiling lighting, are illuminated at an incidence angle of 40° with respect to a normal direction of the credit card (optical element 40)), the wavelength λ is set to 555 nm (the wavelength at which the visual sensitivity of the naked eye is said to be the highest) and these values are entered in the diffraction formula:

$$\xi \sin \phi = \lambda;$$

the following formula is obtained:

$$\xi \sin 40° = 555 \text{ nm}.$$

When the period of the uneven shape variation of the diffraction grating is determined from this formula, the value ξ=864 nm is obtained.

Because this result of ξ=864 nm is that for the case where the reconstruction illumination light is monochromatic light of 555 nm wavelength and an observation environment of incidence angle φ=40° is premised, the value has only the significance of an approximate numerical value. Because normally in an actual observation environment, a reconstruction illumination light that is close to being substantially white is used and because this light is not constituted of perfect planar waves, the incidence angle φ also cannot be set unambiguously. However, because as a general guideline, the calculation result of ξ=864 nm is obtained for the abovementioned observation condition, the present inventor decided to set a conveniently discrete value of ξ=1 μm. Actually, it has been confirmed that for use as a forgery preventing seal for credit card or other optical element to be observed by a naked eye in daily life, setting the value of ξ in a range of approximately 0.6 to 2 μm does not give rise to any problems.

When the period ξ of the uneven shape variation of a diffraction grating is thus set to 1 μm, the minimum value of the length G1 of the effective region E(x, y) in the case of forming a diffraction grating becomes approximately 5 μm. This is because, in order to make a diffraction grating function with some degree of diffraction efficiency, an uneven shape variation of at least approximately five periods is necessary. The minimum value of G1 in the case where ξ=0.6 μm is thus 3 μm, and the minimum value of G1 in the case where ξ=2 μm is 10 μm. The absolute minimum value of the length G1 of the effective region E(x, y) is thus 3 μm. If recording of the values of the amplitude A at a precision of two stages is adequate, because it then suffices to prepare two types of cells with which a diffraction grating is formed or not formed, the minimum value of the length C1 of the three-dimensional cell used in the present invention is 3 μm.

Meanwhile, in regard to the maximum value of the length G1 of the effective region E(x, y) (in other words, the length C1 of the cell C(x, y)), the greater this value the more preferable, from the standpoint of recording the values of the amplitude A at as high a precision as possible. For example, if C1 is set to 1 mm, even when the length G1 is set at values that differ in increments of 1 μm, values of the amplitude A can be recorded at a high precision of 1000 stages. However, if the length C1 of each cell is set to a value of approximately 1 mm, it becomes possible to observe each individual cell with a naked eye and streaks become apparent when the optical element as a whole is observed with the naked eye. Thus for practical use, the length C1 of a cell is preferably set to an approximate value with which each cell cannot be observed by the naked eye, and specifically, is preferably set to no more than 300 μm. Thus a practical dimension range of the length C1 (the length in the direction in which the periodic uneven variation of the diffraction grating occurs) of the three-dimensional cell is 3 μm to 300 μm.

An appropriate dimension range of the width C3 of the three-dimensional cell used in the present invention shall now be considered. As mentioned above, with the present invention, although the stereoscopic effect in regard to the left/right direction of FIG. 12 (the direction parallel to the side with the length C1) is sacrificed, the stereoscopic effect in regard to the depth direction of FIG. 12 (the direction parallel to the side with the length C3) is exist. The pitch of the respective cells that are adjacently positioned in the depth direction of FIG. 12 must thus be set in a range of 0.2 μm to 4 μm, at which the stereoscopic effect can be obtained as described above. The appropriate dimension range of the width C3 of the three-dimensional cell used in the present invention is thus 0.2 μm to 4 μm.

When a large number of the three-dimensional cells shown in FIG. 12 are positioned in the depth direction of the figure, the diffraction grating G(x, y) also becomes long in the depth direction of the figure. Here, because a different amplitude A and phase θ are recorded respectively in each of the adjacently positioned cells, the spatial positions of the diffraction gratings are shifted gradually. Thus when a large number of the three-dimensional cells are positioned on a recording plane, a state approximating a state, in which interference fringes (diffraction gratings) are formed on the recording plane, is attained. However, when each single cell is noted, the width G3 of the effective region E(x, y) is approximately 0.2 μm to 4 μm. Although in general, there may not be many examples in which a plurality of grating lines with a length of only approximately 0.2 μm to 4 μm are adjacently positioned are called "diffraction gratings," in the present Application, the term, "diffraction grating," is used in a broad sense that includes such an arrangement.

Last, appropriate values of the dimension C2 of the three-dimensional cell shall be considered. Because the dimension C2 is not a parameter that affects the optical phenomena described up to now, in theory, it can be set to any value. However, the dimension C2 defines the thickness of the optical element that is the final product. Thus if the optical element is to be used as a forgery prevention seal for credit card, etc., the value must be set so as to be suited for the application. C2 is set equal to 0.25 μm in the embodiment described here because this value is suitable for the forgery prevention seal.

Consequently, in setting the dimensions of the respective portions of a three-dimensional cell used in the present invention, first, a standard observation condition is set on the premise of observing the optical element from a predetermined observation direction when a reconstruction illumination light of a predetermined standard wavelength λ (for example, 555 nm) is illuminated onto the optical element from a predetermined illumination direction, the period ξ of the uneven shape variation of the diffraction grating is set to a value suited for obtaining the required diffraction angle for guiding the light, made incident from the illumination direction of the reconstruction illumination light, toward the observation direction, the length C1 of the three-dimensional cell is set to a value no less than the dimension required for the diffraction grating to give rise to an adequate diffraction phenomenon, and the width C3 of the three-dimensional cell is set to a value no more than the dimension required to obtain the required stereoscopic angle in regard to the depth direction of FIG. 12.

Appropriate dimensions of the three-dimensional cell according to the present invention shown in FIG. 12 were indicated specifically above, and a greatest merit of this three-dimensional cell is that by setting the dimensions thus, the processing precision in manufacture is relaxed, thus making the manufacturing process comparatively easy and enabling the productivity to be improved. In particular, a considerable magnitude can be secured for the length C1 of the cell (20 μm in the embodiment), and because approximately 0.4 μm is adequate as the width C3 of the cell as well, the processing precision for forming the diffraction grating G(x, y) is significantly relaxed in comparison to the processing precision for forming the groove G(x, y) of the three-dimensional cell according to the prior invention shown in FIG. 8.

As mentioned above, in the case where the three dimensional cell according to the prior invention shown in FIG. 8 is used, grooves having widths that differ in increments of 0.1 μm must be formed accurately to prepare seven variations of the amplitude A. In contrast, with the three-dimensional cell according to the present invention shown in FIG. 12, it suffices, for example, to form diffraction gratings having a period of ξ=1 μm. Because the maximum value of the dimension G1 is 20 μm, an adequate variation of the amplitude A can be secured. For example, by setting G1=0 μm (the case where a diffraction grating is not formed at all) as well as G1=5 μm, 6 μm, 7 μm, . . . , 20 μm and thus recording the amplitude A at increments of 1 μm, a variation of 17 stages can be secured.

With the present invention, although in order to accurately record the phase θ, the spatial position of the diffraction grating must be controlled accurately, because in forming a desired pattern using an electron beam lithography device, positional control of the pattern can be carried out comparatively readily, a major difficulty does not arise in the recording of the phase θ. For example, when the period is set equal to 1 μm and the phase θ is to be recorded at a precision of four stages of θ=0, π/2, π, and 3π/2, cells, with which the spatial positioning of the diffraction grating is shifted by just 0 μm, 0.25 μm, 0.5 μm, and 0.75 μm, respectively, must be prepared, and the position of an exposure pattern can be controlled comparatively readily at such precision with a general electron beam lithography device. Thus by using the method according to the present invention in place of the method of the prior invention, the processing precision in manufacture is relaxed and the productivity can be improved.

Use of the present invention also provides an additional merit of facilitating design premised on diffracting the reconstruction illumination light by just a desired angle. As mentioned above, when an optical element according to the present invention is to be used in a forgery preventing seal for credit card, etc., it is inappropriate to premise an observation environment such as that shown in FIG. 14. For practical use, it is inevitable that an observation environment such as that shown in FIG. 15 or 16 be premised, and for reproduction, a design by which the reconstruction illumination light is diffracted by just a desired angle as shown in FIG. 17 or 18 is required. With the present invention, by simply setting the period ξ of the diffraction grating to an appropriate value, a design premised on diffraction by just a desired diffraction angle φ is enabled.

<<<Section 6. Method for Manufacturing an Optical Element According to the Present Invention>>>

Figure 21:
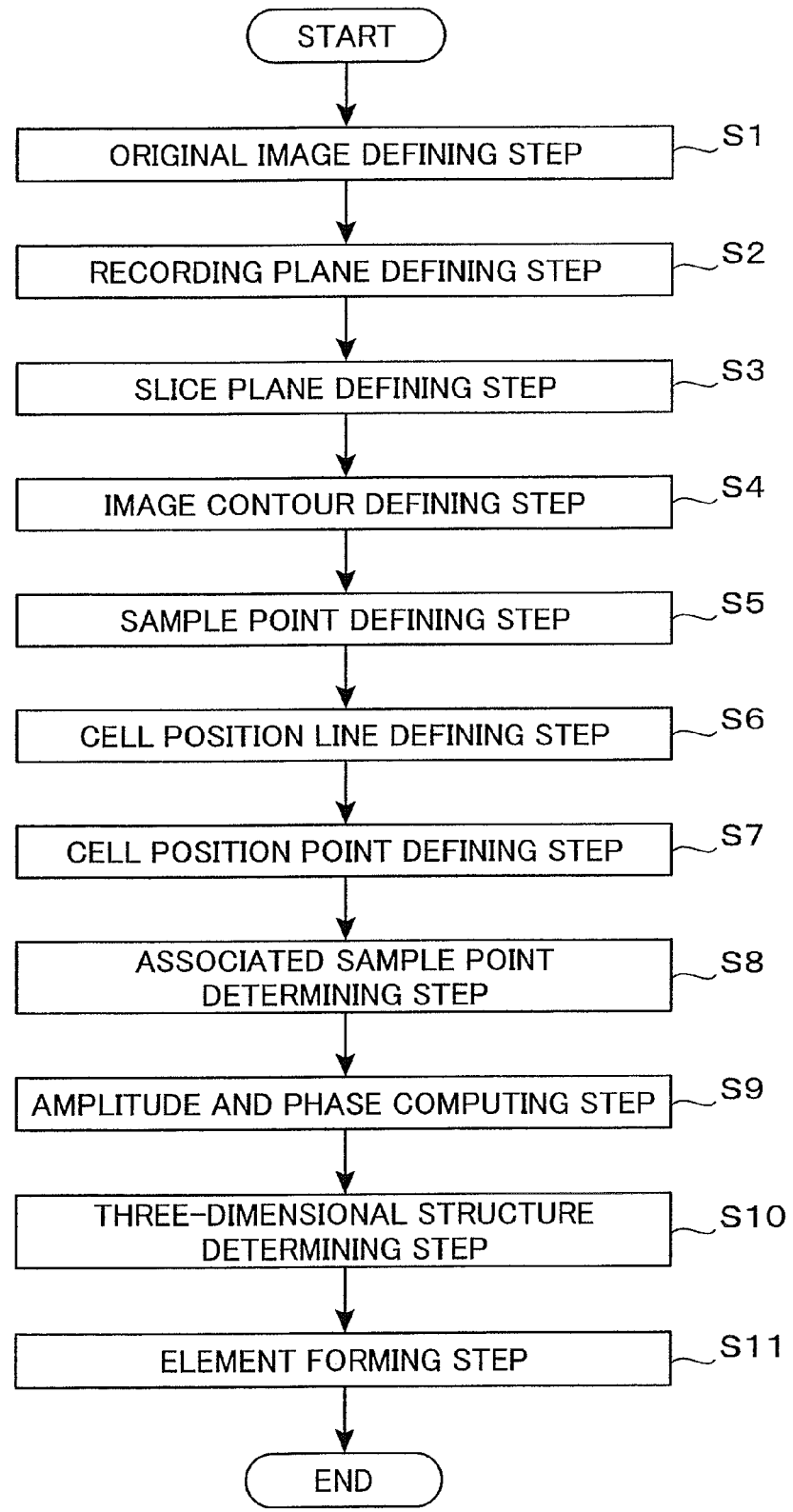
FIG. 21 is a flowchart of basic procedures of a manufacturing method for an optical element according to the present invention.

A method for manufacturing an optical element according to the present invention shall now be described with reference to the flowchart of FIG. 21. This manufacturing method is for manufacturing an optical element that is constituted of a set of a plurality of three-dimensional cells and enables reproduction of a predetermined original image, and the basic principles thereof are the same as the basic principles of the prior invention described in Section 1. However, as mentioned in Section 5, because with the present invention, a method is employed by which the processing precision conditions are relaxed while sacrificing the stereoscopic vision in regard to one direction, a unique process is executed in regard to this aspect. Obviously because the structure of the three-dimensional cell used differs between the prior invention and the present invention, different processes are executed in regard to this aspect as well. The process according to the present invention will be described hereinafter. For practical use, the procedures from step S1 to S10 in the flowchart of FIG. 21 are procedures to be executed by a computer, and a computer program that is in accordance with the algorithms of the respective procedures is prepared. The procedure of the last step S11 is a step of manufacturing an optical element from a set of physical, three-dimensional cells.

First, in step S1, an original image defining step of defining, in a three-dimensional space, an original image (object image) that emits a predetermined object light is executed, and in step S2, that follows, a recording plane defining step of defining, in the three-dimensional space, a recording plane for recording the original image is executed. Specifically as shown in FIG. 3, a three-dimensional XYZ coordinate system is defined, and three-dimensional image data that are to form the original image 10 and planar data that are to form the recording plane 20 are prepared. Although the embodiment described here is an example using a three-dimensional stereoscopic image as the original image 10, the original image 10 does not necessarily have to be a three-dimensional stereoscopic image and, for example, a two-dimensional planar image may be used as the original image. The recording plane 20 does not necessarily have to be a plane, and if the optical element that is to be prepared in the final stage is a product with a curved surface, a recording plane constituted of a curved surface may be defined. However, for practical use, an optical element constituted of a plane is prepared in most cases, and here, an example of defining the recording plane 20 as a plane shall be described.

Figure 22:
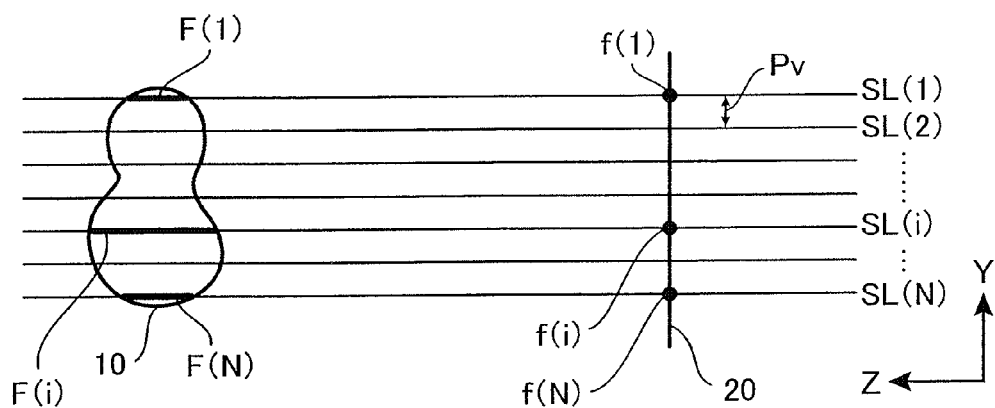
FIG. 22 is a front view for describing the procedures of steps S1 to S3 of the flowchart of FIG. 21.

In step S3 that follows, a slice plane defining step of defining a plurality N of slice planes, each constituted of a plane that enables slicing of the original image 10 and the recording plane 20, is executed. FIG. 22 is a front view of a positional relationship of the original image 10, the recording plane 20, and the N slice planes SL(1) to SL(N). As illustrated, each of the slice planes SL(1) to SL(N) is constituted of a plane that can slice both the original image 10 and the recording plane 20. In the example described here, the plurality N of slice planes, constituted of mutually parallel planes that are positioned at a fixed pitch Pv in a vertical direction, are defined. With the example described here, the recording plane 20 is defined on an XY plane in the three-dimensional XYZ coordinate system, and the respective slice planes SL(1) to SL(N) are defined as planes parallel to the XZ plane. The respective slice planes SL(1) to SL(N) are thus orthogonal to the recording plane 20.

Obviously, the definition of the respective slice planes is not restricted to that of the embodiment of FIG. 22. For example, the intervals between the respective slice planes do not need to be set to the fixed pitch Pv and the intervals may differ at respective portions. Also, the respective slice planes do not necessarily have to be orthogonal to the recording plane 20 and do not have to be made mutually parallel. However, in terms of lightening the load of a computation process to be described below, a definition of slice planes such as that of the embodiment shown in FIG. 22 is preferable. For forming an optical element that is filled with the three-dimensional cells without any gaps in between, the pitch Pv of the slice plane is set equal to the length C1 (see FIG. 12) of each three-dimensional cell. Because C1 is set equal to 20 μm in the embodiment described above, the pitch Pv of the slice planes is also set to 20 μm.

In step S4 that follows, an image contour defining step of defining image contours F(1) to F(N) respectively at the sliced portions obtained by slicing the original image 10 by the respective slice planes SL(1) to SL(N) is executed, and in step S5 that follows, a sample point defining step of defining a plurality of sample points S on each of the image contours F(1) to F(N) is executed. Also in step S6, a cell position line defining step of defining cell position lines f(1) to f(N) respectively at the sliced portions obtained by slicing the recording plane 20 by the respective slice planes SL(1) to SL(N) is executed, and in step S7 that follows, a cell position point defining step of defining a plurality of cell position points Q on each of the cell position lines f(1) to f(N) is executed.

In FIG. 22, three image contours F(1), F(i), and F(N) are exemplarily indicated by thick lines, and three cell position lines f(1), f(i), and f(N) are exemplarily indicated by black dots. With the embodiment described here, because the respective slice planes SL(1) to SL(N) are defined as mutually parallel planes, the N cell position lines f(1) to f(N) formed on the recording plane 20 are mutually parallel lines (in FIG. 22, lines extending in a direction perpendicular to the paper surface (X-axis direction)).

Figure 23:
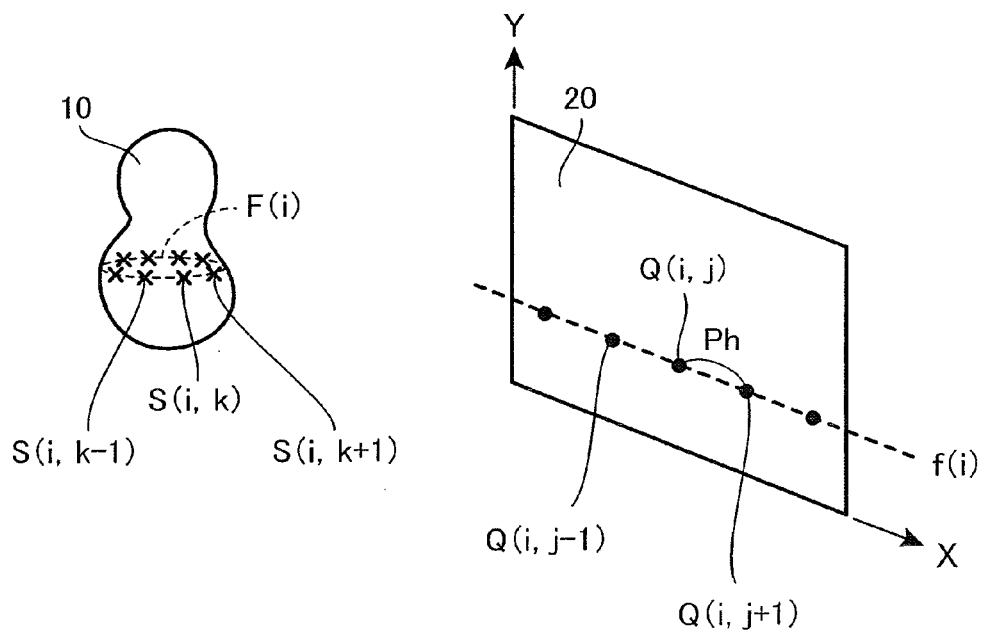
FIG. 23 is a perspective view for describing the procedures of steps S4 to S7 of the flowchart of FIG. 21.

In a perspective view of FIG. 23, the i-th image contour F(i), defined on the original image 10 by the slicing by the i-th slice plane SL(i), and the i-th cell position line f(i), defined on the recording plane 20, are respectively indicated by broken lines. Also, a state in which the plurality of sample points S are defined as x-mark points on the i-th image contour F(i) is shown. The sample points S(i, k−1), S(i, k), and S(i, k+1), which are provided with the symbols and exemplarily indicated in the figure, are the (k−1)-th, k-th, and (k+1)-th sample points that are respectively defined on the image contour F(i). Also, shown is a state in which the plurality of cell position points Q are defined as black dots on the i-th cell position line f(i). The cell position points Q(i, j−1), Q(i, j), and Q(i, j+1), which are provided with the symbols and exemplarily indicated in the figure, are the (j−1)-th, j-th, and (j+1)-th cell position points that are respectively defined on the cell position line f(i).

Although with the embodiment described here, the sample points S are defined at fixed intervals along the image contour F, the interval of the sample points S does not necessarily have to be fixed. However, to prevent non-uniformity of an image, the sample points S are preferably distributed as uniformly as possible. In the case where the interval of the sample points S is fixed, the distance along each image contour F may be fixed or a rectilinear distance may be fixed. Because the interval of the sample points S is a factor that determines the definition of the original image 10, if an original image of high definition is to be recorded, the interval of the sample points S is set to a small value to increase the density. However, as the density of the sample points S is increased, the computation load is increased accordingly.

Meanwhile, each cell position point Q defined on each cell position line f functions as a position mark for positioning a single three-dimensional cell. Thus in forming an optical element that is filled without any gaps with three-dimensional cells, a pitch Ph in a horizontal direction of the figure of the respective cell position points Q (the pitch in the X-axis direction along the cell position line f) is set equal to the width C3 (see FIG. 12) of each three-dimensional cell. Because with the above-described embodiment, C3 is set equal to 0.4 μm, the pitch Ph of the cell position points Q is also set to 0.4 μm. Although obviously the interval of the cell position points Q does not necessarily have to be fixed, in forming an optical element that is filled with three-dimensional cells of the same size, it is preferable to make the interval fixed.

In step S8 that follows, an associated sample point determining step of associating the image contour and the cell position line defined by slicing by the same slice plane, and determining, for each cell position point Q, sample points S, defined on the image contour associated with the cell position line to which the cell position point Q belongs, as associated sample points is executed. With the example shown in FIG. 23, the image contour F(i) and the cell position line f(i) that are defined by the slicing by the same slice plane SL(i) are associated. Then for each cell position point Q defined on the cell position line f(i), the respective sample points S defined on the associated image contour F(i) are determined as the associated sample points. Thus for example, with the illustrated cell position point Q(i, j), all of the sample points ( . . . , S(i, k−1), S(i, k), S(i, k+1), . . . ) defined on the image contour F(i) are determined as the associated sample points. In exactly the same manner, all of the sample points ( . . . , S(i, k−1), S(i, k), k+1), . . . ) defined on the image contour F(i) are determined as the associated sample points for each of the illustrated cell position points Q(i, j−1) and Q(i, j+1).

In step S9 that follows is executed an amplitude and phase computing step of determining by computation, for each cell position point Q, an amplitude A and a phase θ at a predetermined time of a synthetic wave of object light components, among object light components emitted from the associated sample points, that reach the position of the cell position point Q.

For example, the cell position point Q(i, j), shown in FIG. 23, is the j-th cell position point on the cell position line f(i), defined by the i-th slice plane SL(i), and the associated sample points of the cell position point Q(i, j) are, as mentioned above, all of the sample points ( . . . , k−1), S(i, k), S(i, k+1), . . . ) defined on the image contour F(i). Here, it is first judged whether the object light components emitted from the respective associated sample points reach the cell position point Q(i, j). The object light components from sample points that are positioned at a portion that is a hidden surface when the original image 10 is viewed from the cell position point Q(i, j) are blocked by other portions of the original image 10 and do not reach the cell position point Q(i, j). Thus not all of the object light components from the respective corresponding sample points reach the cell position point Q(i, j) necessarily. When the object light components that reach the cell position point Q(i, j) have been sorted out, the synthetic wave at the position of the cell position point Q(i, j) due to the reaching object light components is determined and the amplitude A and the phase θ at the predetermined time is determined.

Figure 24:
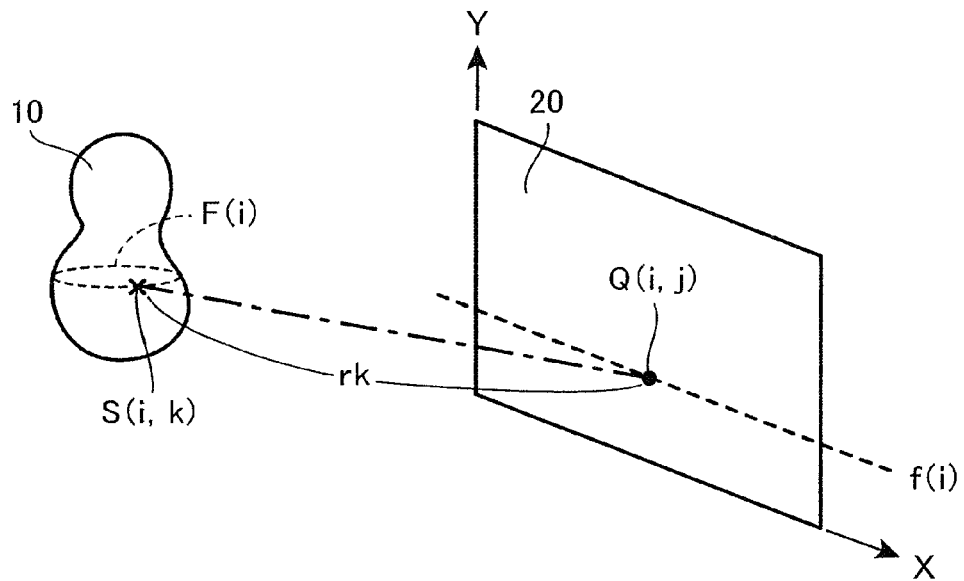
FIG. 24 is a perspective view for describing the procedure of step S8 of the flowchart of FIG. 21.

FIG. 24 is a perspective view of an optical path, up to the point of reaching the cell position point Q(i, j), of an object light component emitted from the k-th associated sample point S(i, k) on the image contour F(i). As described in Section 1, the object light component emitted from the sample point S(i, k) is expressed by the following complex function:

$$Ak \cos θk + iAk \sin θk.$$

Here, Ak is a parameter that indicates an amplitude at a position separated by just a unit distance from the sample point S(i, k) and is determined in accordance with a gradation value of a pixel present at the position of the sample point S(i, k). θk is a parameter that indicates an initial phase of the object light component, and in general, θk may be set equal to 0. When the object light components, respectively expressed by the above complex function, have been defined for all K associated sample points, which, among all the associated sample points along the image contour F(i), emit object light components that reach the cell position point Q(i, j), a synthetic complex amplitude of all K object light components at the position of the cell position point Q(i, j) is expressed, as described in Section 1, by the complex function:

$$\Sigma_{k=1-K}(Ak/rk \cos(θk±2 πrk/λ)+i Ak/rk \sin(θk±2 πrk/λ)).$$

In the above, λ, Ak, and θk are the wavelength, amplitude, and phase, respectively, of the object light component emitted from the k-th (k=1 to K) associated sample point S(i, k) and, as shown in FIG. 24, rk is the distance between the sample point S(i, k) and the cell position point Q(i, j).

Figure 25:
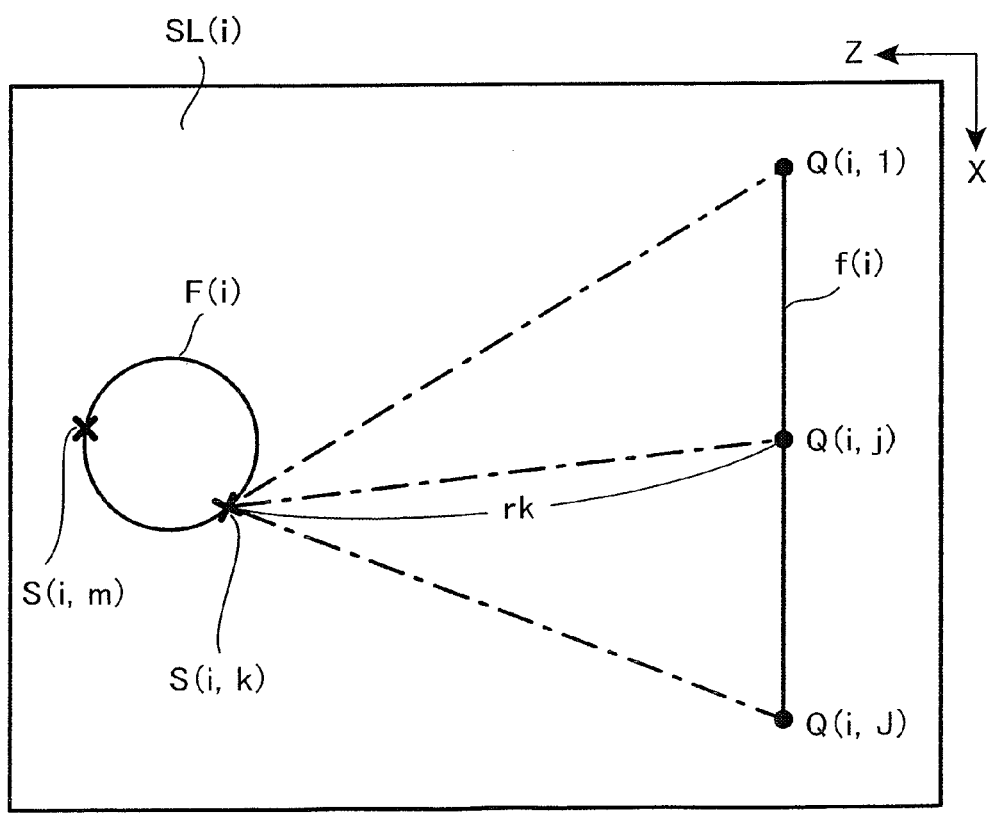
FIG. 25 is a plan view for describing the procedure of step S8 of the flowchart of FIG. 21.

As mentioned above, the object light components, from the sample points positioned at the portion that becomes a hidden surface when the original image 10 is viewed from the cell position point Q(i, j), are eliminated from being subject to the computation. The total of K object light components in the above formula are thus the object light components remaining after the elimination. For example, in the planar view of the i-th slice plane SL(i), shown in FIG. 25, because the object light component from the k-th associated sample point S(i, k) reach all of the total of J cell position points Q(i, 1) to Q(i, J) on the cell position line f(i), it is taken into consideration in the computations regarding these J cell position points Q(i, 1) to Q(i, J). However, the object light component from the associated sample point S(i, m), which is positioned at the hidden surface as viewed from the recording plane 20 side, does not reach any of the total of J cell position points Q(i, 1) to Q(i, J) on the cell position line f(i). The object light component from the associated sample point S(i, m) is thus not taken into consideration whatsoever in the computations regarding the J cell position points Q(i, 1) to Q(i, J).

As mentioned in Section 1, if the real part of the above function is expressed as Rxy and the imaginary part is expressed as Ixy to make the function take on the form, Rxy+iIxy, the complex amplitude (the amplitude that takes the phase into consideration) at the cell position point Q(i, j) of the synthetic wave can be indicated as a coordinate point T on a complex coordinate plane as shown in FIG. 4. The amplitude of the synthetic object light wave at the cell position point Q(i, j) is thus given by the distance A(x, y) from the origin O of the coordinate plane, shown in FIG. 4, and the coordinate point T, and the phase is given by the angle θ(x, y) formed by the vector OT and the real number axis.

The above function is a formula for a case where each sample point that emits an object light component is presumed to be a point light source. In putting the present invention to practice, although a major problem does not occur even if computations presumed on the sample points being point light sources (light sources, with which the emitted object light components spread in the manner of a spherical surface) are performed, experiments conducted by the present inventor have shown that the information of the original image 10 can be recorded more accurately when computations presumed on the sample points being line light sources (light sources, with which the emitted object light components spread in the manner of a side surface of a cylinder). The present inventor considers that the reason for this is because the process using slice planes is performed in the present invention.

As mentioned in Section 5, with the present invention, a method is employed by which the processing precision conditions are relaxed while sacrificing the stereoscopic vision regarding one direction among the two directions of vertical and horizontal on the recording plane. In executing the steps of defining the slice planes (step S3), defining the image contours and the sample points (steps S4 and S5), defining the cell position lines and the cell position points (steps S6 and S7), determining the associated sample points (step S8), and executing the amplitude and phase computing step (step S9) in the procedures shown in FIG. 21, the stereoscopic vision regarding the vertical direction (Y-axis direction) in FIGS. 22 and 23 is sacrificed when computation that takes into consideration only the object light components from the associated sample points is performed. That is, although properly speaking, in FIG. 23, the information of the object light components emitted from sample points distributed across the entirety of the original image 10 should be recorded in the cell position point Q(i, j), in actuality, only the information of the object light components emitted from the sample points on the image contour due to the slice plane SL(i) are recorded. Thus when the information recorded on the recording plane 20 is reproduced, although a stereoscopic vision is provided in regard to the horizontal direction along the slice planes, the stereoscopic vision in regard to the vertical direction is sacrificed.

Thus with the present invention, although the stereoscopic effect in the vertical direction is sacrificed, because it suffices to record the same amplitude and phase in a region spanning the width Pv (interval of the slice planes) in the vertical direction, it becomes possible to position three-dimensional cells with the structure shown in FIG. 12 (elongate cells with the length C1 equal to the pitch Pv) at the positions of the cell position points Q(i, j). When the specific amplitude A(i, j) and the specific phase θ(i, j) are determined for the position of the cell position point Q(i, j) in FIG. 23, the three dimensional cell (i, j), in which the specific amplitude A(i, j) and the specific phase θ(i, j) are recorded, is positioned at the position of the cell position point Q(i, j). The length in the vertical direction of this three-dimensional cell is equal to the pitch Pv. Thus the location in the region on the recording plane 20, shown in FIG. 23, at which the specific amplitude A(i, j) and the specific phase θ(i, j) are recorded is not the single point of the cell positioning point Q(i, j) but is a region with a width equal to the pitch Pv in the up/down direction. Such a phenomenon, in which the same amplitude and phase are defined for a region having a fixed width in the up/down direction of the recording plane 20 is, properly speaking, a phenomenon that occurs when each sample point on the original image is a line light source (segment light source with a length corresponding to Pv).

The present inventor considers that in putting the present invention into practice, better results are obtained when the individual sample points on the original image are handled as line light sources instead of as point light sources because of the reason described above. As can be understood from the plan view of FIG. 25, because an object light component emitted from an i-th sample point S(i, k) is deemed to propagate only through an i-th slice plane SL(i) and reach a cell position point Q(i, j), object light components that pass through portions besides the corresponding slice plane do not have to be considered at all in the actual computation. The point of change in handling the sample point S(i, k) as a line light source instead of as a point light source thus only lies in the computation of an attenuation amount of the amplitude.

When the sample point S(i, k) is handled as a point light source, because the wavefront of the emitted object light component spreads spherically, an intensity of light (square of the amplitude) attenuates in inverse proportion to a surface area of a sphere (the amplitude is inversely proportion to a radius r of the sphere). On the other hand, when the sample point S(i, k) is handled as a line light source, because the wavefront of the object light component spreads in the form of a side surface of a cylinder, the intensity of light (square of the amplitude) attenuates in inverse proportion to a surface area of the side surface of the cylinder (the amplitude is inversely proportion to a square root of a radius r of the cylinder). Thus when the sample point S(i, k) is handled as a line light source, the attenuation amount of the amplitude of the object light component propagating from the sample point S(i, k) to the cell position point Q(i, j) is calculated in the amplitude and phase computing step by using an amplitude attenuation term of an object light component emitted from a line light source. Specifically, the amplitude A(i, j) and the phase θ(i, j) at the cell position point Q(i, j) are determined by computation using the function:

$$\Sigma_{(k=1-K)}(Ak/\sqrt{rk}\cdot\cos(\theta k \pm 2\pi rk/\lambda)+iAk/\sqrt{rk}\cdot\sin(\theta k \pm 2\pi rk/\lambda)).$$

instead of the above mentioned complex function.

Also, although for the above embodiment, a description was provided under the premise that object light components are emitted in all directions at the outer side of the object from each associated sample point S(i, k), a computation, in which the emission angle of the object light components emitted from each associated sample point S(i, k) is restricted, may be performed in the amplitude and phase computing step. Although when such computation, with which the emission angle of object light components is restricted, is performed, the stereoscopic effect is weakened, an effect of lightening the computation load is provided.

Figure 26:
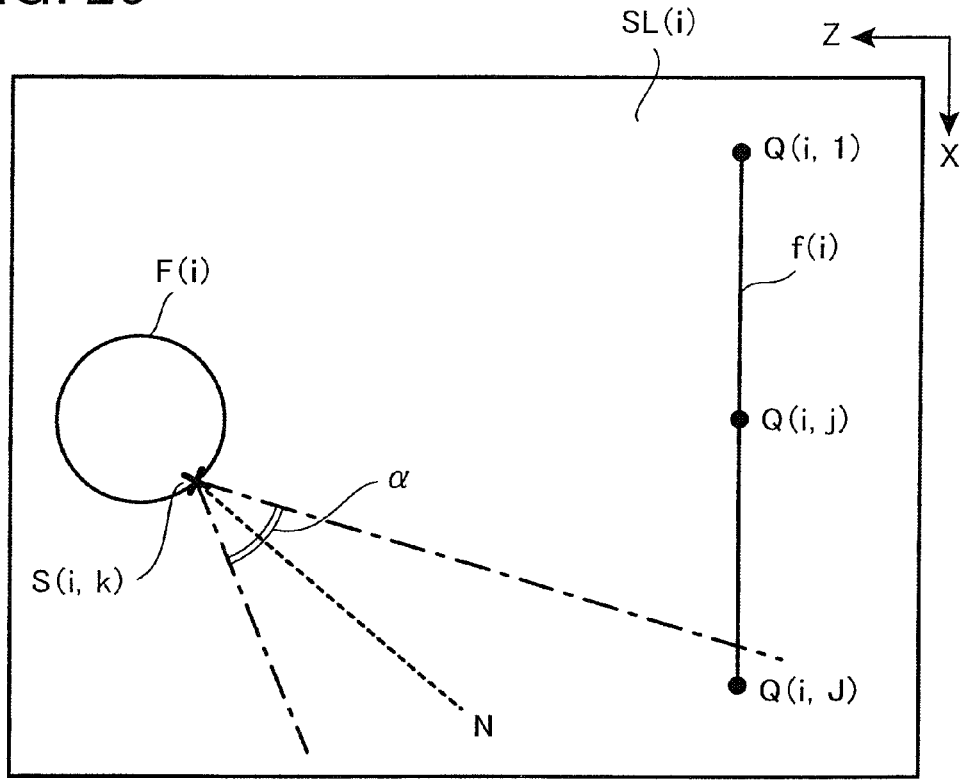
FIG. 26 is a plan view for describing a method for applying a restriction to an emission angle of an object light component emitted from each associated sample point in performing the procedure of step S8 of the flowchart of FIG. 21.

FIG. 26 is a plan view for describing a method of applying such a restriction to the emission angle of object light components, and shows an example where the emission angle of object light components emitted from an associated sample point S(i, k) on the i-th slice plane SL(i) is restricted to within a restriction angle α. As illustrated, in this example, a normal N is set at the position of the sample point S(i, k) on the image contour F(i) and the amplitude and phase computing step is executed upon deeming that the object light components from the sample point S(i, k) are emitted only within a range of the restriction angle α centered about the normal N. Thus although a computation, which takes into consideration an object light component from the sample point S(i, k), is performed in the amplitude and phase computation concerning the cell position point Q(i, J) in the figure, because the object light components from the sample point S(i, k) do not reach the cell position points Q(i, 1) and Q(i, j), these object light components are excluded from being subject to computation in the amplitude and phase computation concerning these cell position points.

Figure 27:
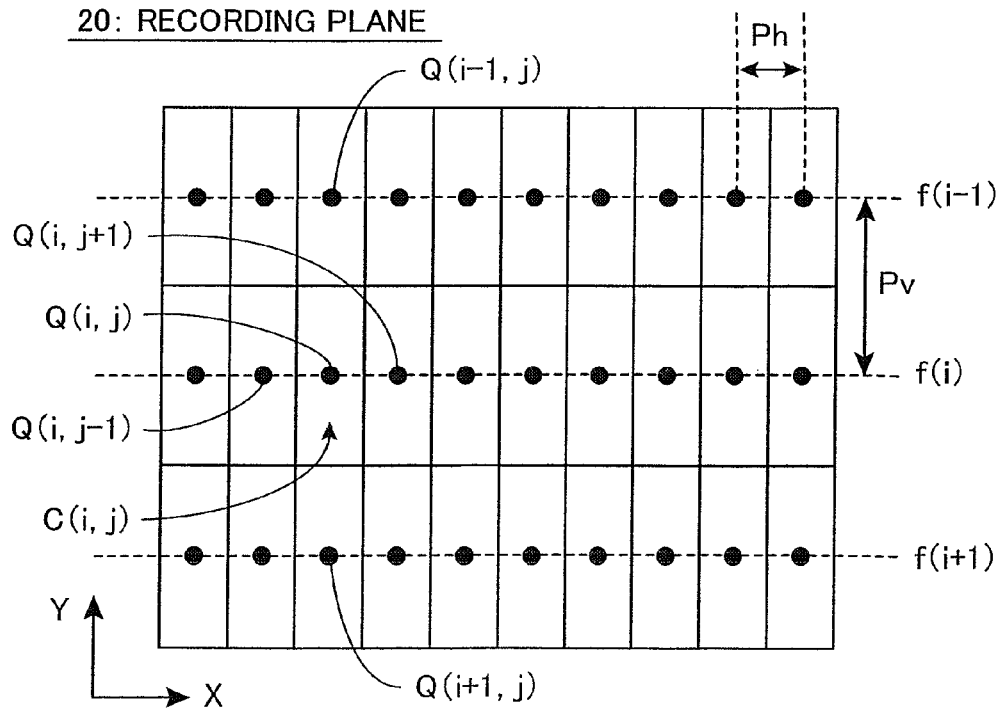
FIG. 27 is a plan view of an example of cell positioning lines and cell positioning points defined on a recording plane 20 by the procedures of steps S5 and S6 of the flowchart of FIG. 21.

When the amplitude and phase computing step S9 is thus completed, the specific amplitude A and the specific phase θ have been determined for each individual cell position point Q defined on the recording plane 20. FIG. 27 is a plan view of an example of cell position lines and cell position points defined on the recording plane 20. As illustrated, on the recording plane 20, the cell position lines f(i−1), f(i), and f(i+1) are defined at the pitch Pv in the vertical direction, and on each cell position line, the cell position points Q are defined at the pitch Ph in the horizontal direction. The illustrated cell position points Q(i, j−1), Q(i, j), and Q(i, j+1) are respectively the (j−1)-th, j-th, and (j+1)-th cell position point defined along the i-th cell position line f(i).

In step S10 that follows is executed a three-dimensional structure determining step of determining, on the basis of the amplitudes A and phases θ determined for the respective cell position points Q on the recording plane 20, the structures of the three-dimensional cells to be positioned at the positions of the respective cell position points Q to determine a three-dimensional structure constituted of a set of a plurality of the three-dimensional cells positioned on the recording plane 20. The large number of rectangles that are drawn with solid lines on the recording plane 20 shown in FIG. 27 indicate outlines of the three-dimensional cells positioned on the respective cell position points Q. For example, a three-dimensional cell C(i, j) is positioned at a position of the cell position point Q(i, j).

Here, the shape of the three-dimensional cell C(i, j) is determined based on the amplitude A(i, j) and the phase θ(i, j) determined for the cell position point Q(i, j). Specifically, the specific three-dimensional shape of the three-dimensional cell C(i, j) is determined by forming a diffraction grating, having a phase that is in accordance with the phase θ(i, j), in an effective region E(i, j), having an area that is in accordance with the amplitude A(i, j).

Figure 28:
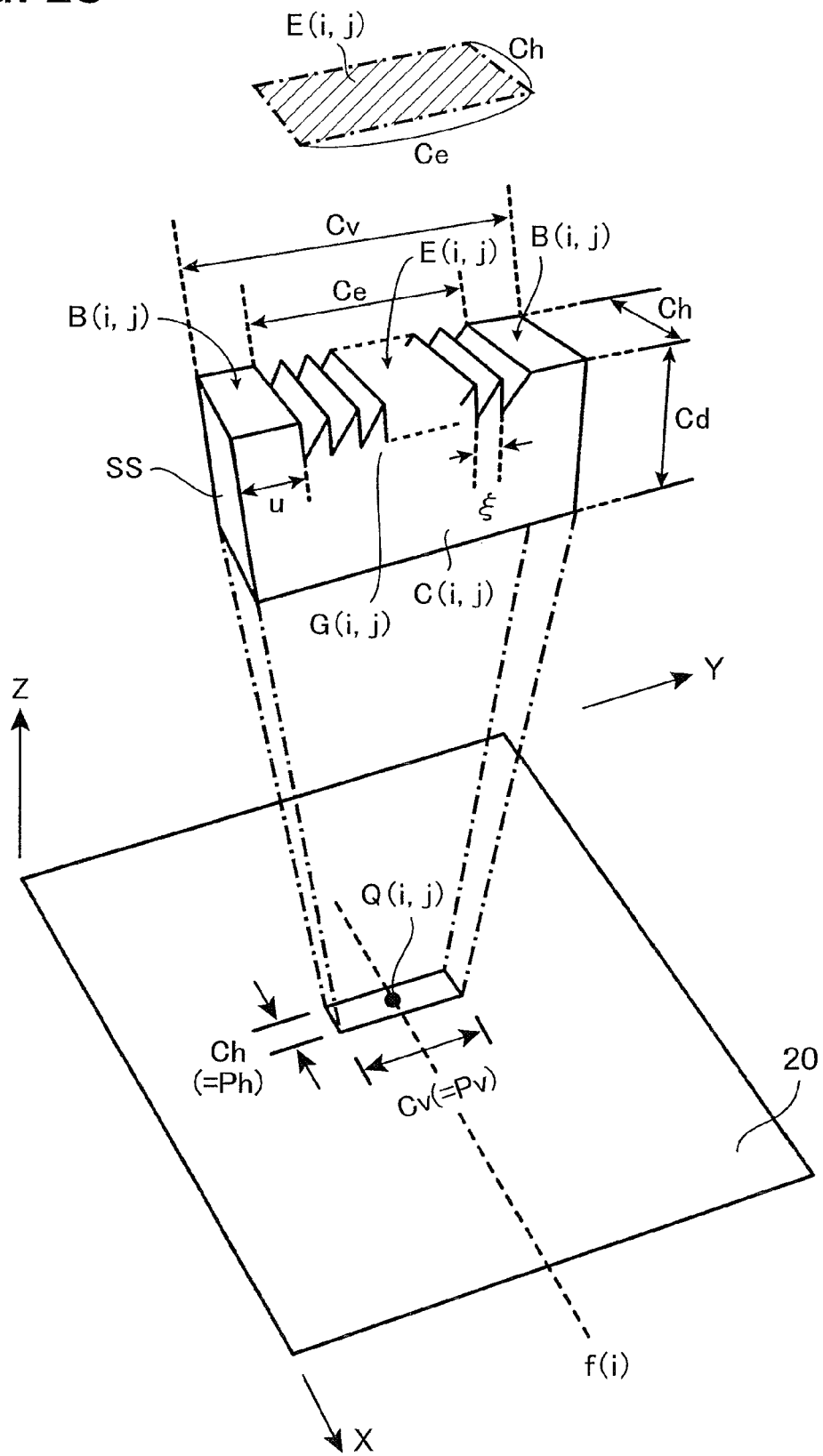
FIG. 28 is a perspective view of an example of a structure of a three-dimensional cell determined by the procedure of step S9 of the flowchart of FIG. 21.

FIG. 28 is a perspective view of a state of positioning a three-dimensional cell C(i, j) at a position of a cell position point Q(i, j) on the recording plane 20. The three-dimensional cell C(i, j) has exactly the same basic shape as the three-dimensional cell C(x, y) shown in FIG. 12 and is a cell having a rectangular parallelepiped basic shape with a dimension Cv, a dimension Ch, and a dimension Cd. Here, for the sake of description, a direction along a side with the dimension Cv shall be referred to as a vertical direction of the cell, a direction along a side with the dimension Ch shall be referred to as a horizontal direction of the cell, and a direction along a side with the dimension Cd shall be referred to as a depth direction of the cell. As mentioned in Section 4, with the embodiment described here, with the three-dimensional cell C(i, j), the vertical dimension Cv=20 μm, the horizontal dimension Ch=0.4 μm, and the depth dimension Cd=0.25 μm, and in actuality, the length Cv is considerably greater than the width Ch, and the cell has a stick-like form as a whole (the figure is drawn with the actual dimensional ratios being ignored).

With the embodiment described here, the cell length Cv is set equal to the vertical direction pitch Pv of the cell position point Q, and the cell width Ch is set equal to the horizontal direction pitch Ph of the cell position point Q. Thus when the three-dimensional cell C(i, j) is positioned, with an upper surface facing upward as shown in the figure and in accordance with a two-dimensional matrix on the recording plane 20, the recording plane 20 can be filled without gaps by cells. In step S10, data indicating the three-dimensional structure constituted of the set of the large number of three-dimensional cells are obtained.

With the illustrated example, the upper surface of the three-dimensional cell C(i, j) is a grating forming surface, and a diffraction grating is formed on this grating forming surface. When the three-dimensional cell C(i, j) is positioned on the recording plane 20, the grating forming surface (the upper surface in the present example) becomes parallel to the recording plane 20, and a horizontal side (side with the length Ch) of the cell becomes parallel to the cell position line f(i). The grating forming surface itself is formed of a rectangular shape having a vertical side with the dimension Cv and a horizontal side with the dimension Ch, and the area thereof is given by Cv×Ch. The grating forming surface is partitioned into the effective region E(i, j) and blank regions B(i, j) besides the effective region E(i, j), and a diffraction grating G(i, j) is formed at the portion of the effective region E(i, j). As indicated by being provided with hatching at an upper portion of FIG. 28, the effective region E(i, j) is formed of a rectangular shape having a vertical side with a dimension Ce and a horizontal side with the dimension Ch, and the area thereof is given by Ce×Ch. With the embodiment shown here, with all of the three-dimensional cells, the horizontal width of the effective region is set equal to the horizontal width Ch of each three-dimensional cell. In other words, the diffraction grating G(i, j) is always formed fully across the horizontal width Ch of the three-dimensional cell. The area of the effective region of each individual three-dimensional cell is thus defined by the vertical dimension Ce of the effective region.

The diffraction grating G(i, j) is formed by repeatedly setting an uneven shape variation, with the period ξ, in the vertical direction of the cell. Because the three-dimensional cell C(i, j) is positioned so that its horizontal side (the side with the length Ch) is parallel to the cell position line f(i), a state in which the uneven shape variation with the period ξ occurs along a direction (Y-axis direction) orthogonal to the cell position line f(i) is attained. With the illustrated example, within a period section of the length ξ along the direction (Y-axis direction) orthogonal to the cell position line f(i), a slope, with which a depth decreases monotonously and continuously from a deepest portion to a shallowest portion, is formed, and by repeatedly setting this slope, a relief structure surface with a sawtooth-like cross section is formed. The diffraction grating G(i, j) gives rise to a predetermined diffraction phenomenon by means of the relief structure surface.

The amplitude A(i, j), determined for the cell position point Q(i, j) is recorded as the area (vertical dimension Ce) of the effective region E(i, j) of the three-dimensional cell C(i, j). Here, the area of the effective region E(i, j) does not necessarily have to be made proportional to the amplitude A(i, j), and it suffices that a relationship such that the area of the effective region E(i, j) becomes large as the amplitude A(i, j) becomes high holds. An experiment by the present inventor has shown that making the area of the effective region E(i, j) proportional to a square of the amplitude A(i, j) is most preferable for faithfully reproducing gradation information of the original image 10. This is because what is modulated according to an area of an effective region E is an energy amount (corresponding to the square of an amplitude A) of light.

With the embodiment described here, first, for all of the cell position points Q defined on the recording plane 20, square values $A^2$ of the respectively determined amplitudes A are obtained and a maximum value $A^2$max of the square values $A^2$ is determined. Then for a three-dimensional cell to be positioned at an individual cell position point Q, the effective region is set to a region corresponding to [$A^2/A^2$max] of the total area (Cv×Ch) of the grating forming surface. For example, in the case of an amplitude A(i, j)=8, determined for a cell position point Q(i, j), the square value $A^2$=64, and if the maximum value $A^2$max=100, a portion corresponding to 64/100 of the upper surface (grating forming surface) of a three-dimensional cell C(i, j) becomes the effective region E(i, j), and a portion corresponding to the remaining 36/100 becomes the blank regions B(i, j). In this case, the vertical width dimension Ce=Cv×(64/100) for the effective region E(i, j).

Meanwhile, the phase θ(i, j), determined for the cell position point Q(i, j), is recorded as a spatial, positional phase of the diffraction grating G(i, j) formed on the three-dimensional cell C(i, j). Specifically, some form of reference position is defined on the three-dimensional cell and the diffraction grating G(i, j) must be positioned at a position of a phase θ with respect to this reference position. The reference position on the cell is not a position related to the effective region E(i, j) and is set at a predetermined position in common to all three-dimensional cells. The position of the effective region E(i, j) is not necessarily fixed because the vertical dimension Ce varies according to the magnitude of the amplitude A(i, j). Thus in the present embodiment, as shown in FIG. 28, one surface of the cell (the surface closest to the X-axis in the present example) is defined as a reference surface SS, and the phase is defined based on a distance u from the reference surface SS to the shallowest portion or the deepest portion of the diffraction grating G(i, j) (in the case of a relief structure with a sawtooth-like cross section, the position of the shallowest portion and the position of the deepest portion are the same). Thus if R is a remainder of determining an integer quotient by dividing the distance u by the period (R=u mod ξ), the phase is given by: θ=2 πR.

Although in the example shown in FIGS. 27 and 28, a central point of a bottom surface of a three-dimensional cell C(i, j) is set as a reference point and this reference point is made to overlap with a cell position point Q(i, j), the positioning of cells onto the recording plane 20 does not necessarily have to be performed in this manner. For example, one corner of the bottom surface of a three-dimensional cell C(i, j) may be set as the reference point and this reference point may be made to overlap with a cell positioning point Q(i, j).

When the three-dimensional structure, constituted of the set of the large number of three-dimensional cells, has been determined in step S10, a physical optical element with the determined three-dimensional structure is formed in step S11, which is the last step. As mentioned above, whereas the procedures of steps S1 to S10 in the flowchart of FIG. 21 are procedures to be executed by a computer, step S11 is a step of manufacturing an optical element from a set of physical, three-dimensional cells. At the stage at which step S10 ends, structure data, indicating the determined three-dimensional structure, are output from the computer, and based on the structure data, a physical hologram recording medium is prepared. Although because a method for preparing such a hologram recording medium is a known method, a detailed description thereof shall be omitted here, normally, a step of providing the three-dimensional structure data to an electron beam lithography device and forming an uneven pattern on a physical medium is performed. The present invention provides the merit of being able to relax the processing precision in this step as described above.

<<<Section 7. Variations of the Three-Dimensional Cell>>>

Various variations of the three-dimensional cell used in the present invention shall now be described. A typical example of the three-dimensional cell used in the present invention is shown in FIG. 28. By using a set of such three-dimensional cells to record a complex amplitude distribution of object light from an object image so that the object image is reproduced upon observation from a predetermined viewpoint position, an optical element that can be used as a hologram is obtained. In this case, with each individual cell, a specific amplitude and a specific phase are defined and a diffraction grating, having a phase that is in accordance with the specific phase, is formed in an effective region having an area that is in accordance with the specific amplitude. When a predetermined incident light is provided to each individual cell, emitted light, with which the amplitude and the phase of the incident light are modulated according to the specific amplitude and the specific phase defined in the cell, is obtained and by observation of this emitted light, the object image is reproduced.

The diffraction grating formed in each individual three-dimensional cell has a relief structure surface, where the same uneven shape variation is repeated at a predetermined period $\xi$, and such a diffraction grating is positioned at a position of a phase $\theta$ with respect to a predetermined reference position inside the predetermined effective area in each individual three-dimensional cell.

The three dimensional cell $C(i, j)$, shown in FIG. 28, has the rectangular parallelepiped basic shape with the vertical dimension Cv, the horizontal dimension Ch, and the depth dimension Cd, includes the grating forming surface (upper surface), constituted of the rectangular shape, having the vertical sides with the dimension Cv, having the horizontal sides with the dimension Ch, and being parallel to one surface (bottom surface) of the rectangular parallelepiped, and has the relief structure surface formed along the grating forming surface. By positioning three-dimensional cells of such a structure in the form of a two-dimensional matrix on the recording plane 20, an optical element is obtained. On the grating forming surface (upper surface) of the three-dimensional cell $C(i, j)$ is defined the effective region $E(i, j)$, constituted of the rectangular shape having the vertical sides with the dimension Ce and the horizontal sides with the dimension Ch, and for all three-dimensional cells, the horizontal width of the effective region is set equal to the horizontal width Ch of the cell itself. The grating $G(i, j)$, constituted of the relief structure, is formed so that the uneven shape variation occurs in the direction (Y-axis direction) along the vertical sides with the dimension Ce.

As mentioned above, the dimensions of the respective portions of such a three-dimensional cell $C(i, j)$ preferably are set so that the period $\xi$ of the uneven shape variation of the diffraction grating is within a range of 0.6 to 2 µm, the vertical dimension Cv of the three-dimensional cells is within a range of 3 to 300 µm, and the horizontal dimension Ch is within a range of 0.2 to 4 µm.

(1) Type 1A (Transmitting Type)

Figure 29:
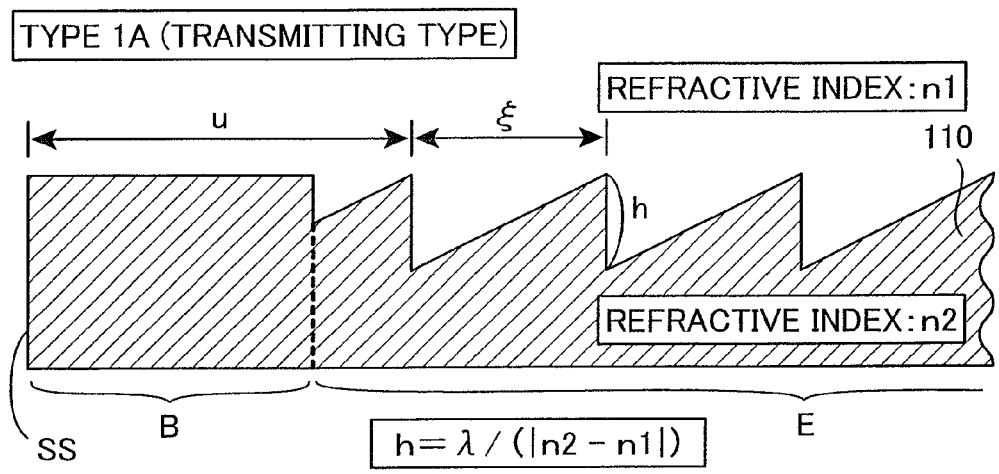
FIG. 29 is a partial front section view of an example of a physical structure (type 1A) of a three-dimensional cell determined by the procedure of step S9 of the flowchart of FIG. 21.

FIG. 29 is a partial front section view of a physical structure example "type 1A (transmitting type)" of a three-dimensional cell used in the present invention (only a portion of a left side portion of the cell is shown). In the present Application, a "transmitting type" refers to a type, with which a reconstruction illumination light is illuminated from one surface of an optical element and light transmitted to another surface is observed. When the cell shown in FIG. 29 is used, the reconstruction illumination light is illuminated from above and the light that is transmitted below is observed, or the reconstruction illumination light is illuminated from below and the light that is transmitted above is observed. Meanwhile, in the present Application, a "reflecting type" refers to a type, with which a reconstruction illumination light is illuminated from one surface of an optical element and light reflected by and returning from the same surface is observed.

The three-dimensional cell shown in FIG. 29 corresponds to being a "type 1A (transmitting type)" cell and is constituted of a light transmitting layer 110 on a top surface of which is formed a relief structure surface. Although the three-dimensional cell shown in FIG. 29 and the three-dimensional cell $C(i, j)$ shown in FIG. 28 differ in the dimensional ratios of the respective portions, these cells are exactly the same in basic arrangement. A portion indicated by B in FIG. 29 is a blank region of the cell, and a portion indicated by E in the figure is the effective region of the cell. The period $\xi$ of the uneven shape variation is set to a value of approximately 0.6 to 2 µm, and the distance u from the reference surface SS to the shallowest portion or the deepest portion of the slope that forms the relief structure is set according to the specific phase $\theta$ to be recorded in the cell as described above.

The "type 1A (transmitting type)" cell, shown in FIG. 29, is a cell for an optical element premised on use in a space filled with a substance having the refractive index n1. For example, in a general application, such as a forgery preventing seal for credit card, etc., because use in the air is premised, the refractive index n1 is the refractive index of air. Obviously in the case of a cell for an optical element that is premised on observation in water, the refractive index n1 is the refractive index of water. Meanwhile, the main cell body is constituted of the light transmitting layer 110 with the refractive index n2 and has the relief structure surface formed on the top surface thereof, and with this cell, the reconstruction illumination light that is transmitted through the light transmitting layer 110 is observed.

As mentioned in Section 4, in theory, the depth h (distance between the shallowest portion and the deepest portion) of the relief structure is optimally set to "a distance, for which the phase difference, between propagation through the material with the refractive index n1 by just the distance h and propagation through the material with the refractive index n2 by just the distance h, is $2\pi$." This is because, by "setting the depth h so that the phase difference between a light component reaching the observation position via the deepest portion and a light component reaching the observation position via the shallowest portion is $2\pi$," optical path differences that arise due to position are canceled out for light components reaching the observation position via any location of the optical element and the mutual phase differences among light components arriving from the respective positions are canceled out at the observation position (refer to descriptions of FIGS. 19 and 20).

Because the phase difference is a physical quantity that is determined according to the wavelength $\lambda$, the wavelength $\lambda$ must be set to calculate the theoretical depth h based on the above condition. Thus in actually designing a three-dimensional cell, a standard observation condition, premised on using a reconstruction illumination light of a predetermined standard wavelength $\lambda$, is set, and a theoretical depth h is calculated on the premise that observation is performed under the standard observation condition. Although obviously, the actual observation conditions normally do not necessarily match the standard observation condition, by designing a cell with the depth h calculated under the standard observation condition, the most ideal reproduction image can be obtained to the extent possible.

In regard to actual observation environments, observation is performed in most cases under illumination light that is close to being substantially white, and the present inventor considers it most preferable to set the standard wavelength $\lambda$ to 555 nm, at which the visual sensitivity is considered to be the highest. The wavelength of 555 nm is the wavelength at which the visual sensitivity is the highest, is positioned at a substantially middle point of the visible wavelength range, has a property of being an average wavelength value of all visible wavelengths, and is thus an optimal wavelength value for the standard wavelength $\lambda$. In the case of the "type 1A (transmitting type)" cell shown in FIG. 29, when the standard wavelength $\lambda$, the refractive index n1 of the external space (for example, the refractive index of air), and the refractive index n2 of the light transmitting layer 110 that constitutes the main cell body are determined, the ideal depth h can be determined by the formula: "$h=\lambda/|n2-n1|$." This formula is optically derived by the abovementioned condition of "setting the depth h so that the phase difference between a light component reaching the observation position via the deepest portion and a light component reaching the observation position via the shallowest portion is $2\pi$." For example, calculation using: n1=1.0 (the refractive index of air), n2=1.46 (the refractive index of synthetic quartz); and $\lambda$=555 nm; the ideal depth h is calculated to be approximately 1.2 μm.

(2) Type 1B (Transmitting Type)

Figure 30:
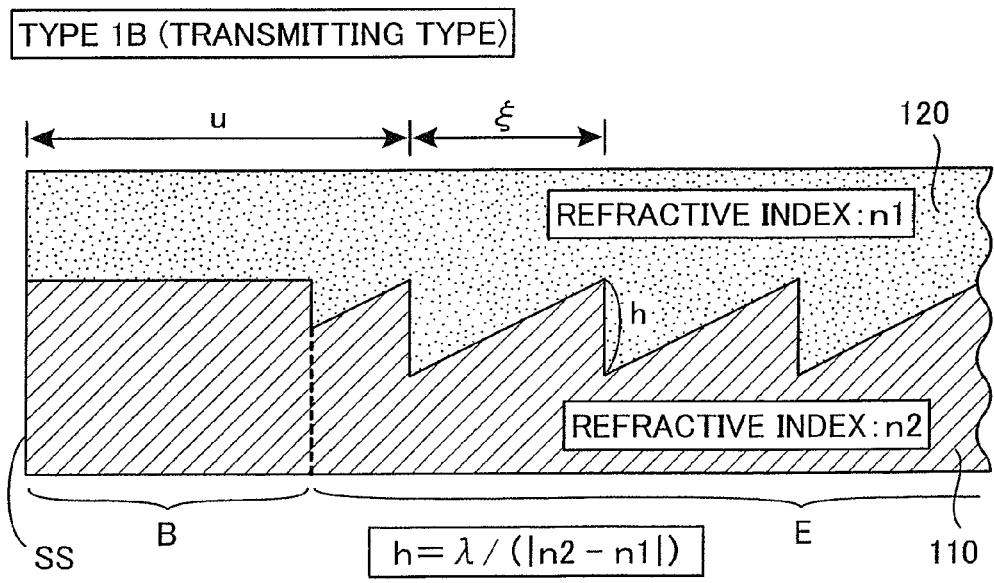
FIG. 30 is a partial front section view of an example of a physical structure (type 1B) of a three-dimensional cell determined by the procedure of step S9 of the flowchart of FIG. 21.

A "type 1B (transmitting type)" cell, shown in FIG. 30 has a structure with which another light transmitting layer 120 is laminated onto an upper portion of the light transmitting layer 110 of the "type 1A (transmitting type)" cell shown in FIG. 29. That is, the light transmitting layer 120 that is an upper layer is formed of a light transmitting substance with the refractive index n1, and the light transmitting layer 110 that is a lower layer is formed of a light transmitting substance with the refractive index n2. The relief structure surface is formed as an interface between two layers that constitute the layered structure, and as an optical element, a transmitting type optical element, with which a reconstruction illumination light that is transmitted through both the light transmitting layer 120 and the light transmitting layer 110 is observed, is arranged. Whereas in the case of the "type 1A (transmitting type)" cell shown in FIG. 29, the upper surface of the light transmitting layer 110 is the relief structure surface and is in an exposed state, with the "type 1B (transmitting type)" cell shown in FIG. 30, the relief structure surface is formed at the interface of two layers and is not exposed to the exterior. Such a type of cell, with which the relief structure surface is not exposed to the exterior, has a merit that the relief structure surface is less likely to become damaged.

From the standpoint of the optical phenomenon that occurs for light that is transmitted through the cell, the "type 1A (transmitting type)" cell shown in FIG. 29 and the "type 1B (transmitting type)" cell shown in FIG. 30 are exactly the same. That is, the light transmitting layer 110 at the lower layer in FIG. 30 is exactly the same as the light transmitting layer 110 shown in FIG. 29. The light transmitting layer 120 at the upper layer in FIG. 30 serves a function equivalent to the medium (such as air) of the external space shown in FIG. 29. Consequently, in regard to the physical structure that the light transmitting layer with the first refractive index n1 and the light transmitting layer with the second refractive index n2 are formed with the relief structure surface as the interface, there is no difference between the types 1A and 1B. Thus in designing the "type 1B (transmitting type)" cell, once the standard wavelength $\lambda$, the refractive index n1 of the upper light transmitting layer 120, and the refractive index n2 of the lower light transmitting layer 110 are determined, the ideal depth h can be determined by the formula: "$h=\lambda/|n2-n1|$."

(3) Type 2A (Reflecting Type)

Figure 31:
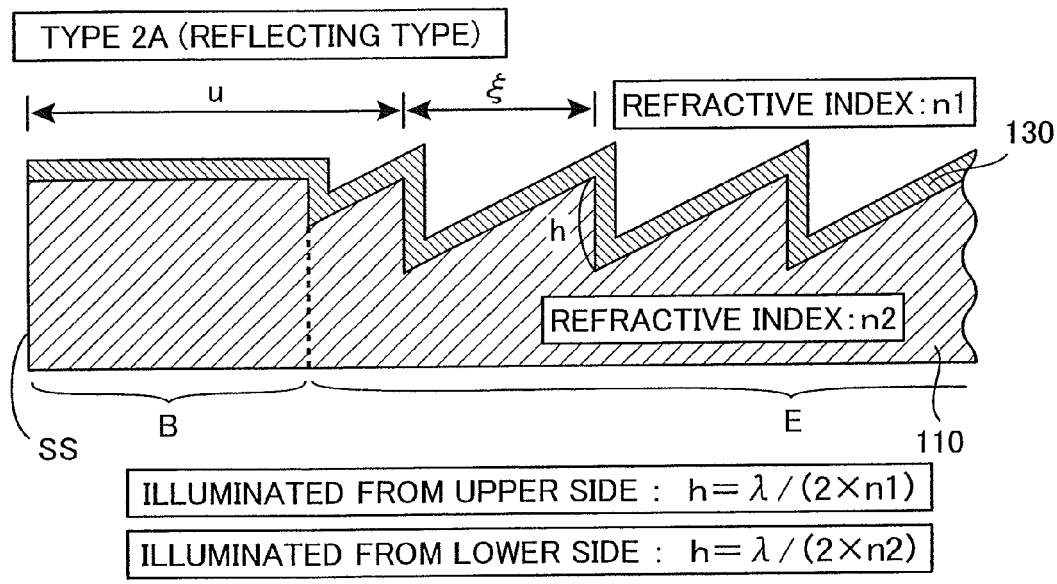
FIG. 31 is a partial front section view of an example of a physical structure (type 2A) of a three-dimensional cell determined by the procedure of step S9 of the flowchart of FIG. 21.

A "type 2A (reflecting type)" cell is shown in FIG. 31. With this cell, a reflecting layer 130 is formed on the upper surface of the light transmitting layer 110 of the "type 1A (transmitting type)" cell, shown in FIG. 29, and is constituted of a layered structure of the light transmitting layer 110 and the reflecting layer 130. The relief structure surface is formed as the interface of the light transmitting layer 110 and the reflecting layer 130. With this embodiment, the film thickness of the reflecting layer 130 is comparatively small and the relief structure surface formed on the upper surface of the light transmitting layer 110 is manifested as it is at an upper surface of the reflecting layer 130 as well. With this "type 2A (reflecting type)" cell, two modes of observation are possible. In a first observation mode, a reconstruction illumination light is illuminated from the upper side of the figure and a light reflected by the upper surface of the reflecting layer 130 and returning to the upper side is observed. In a second observation mode, a reconstruction illumination light is illuminated from the lower side of the figure and a light that is transmitted through the light transmitting layer 110, is reflected by a lower surface of the reflecting layer 130, is transmitted through the light transmitting layer 110 again, and returned to the lower side of the figure is observed. The formula for computing the ideal depth h differs according to which observation mode is premised.

In a case where the first observation mode is premised, the distance of propagation through the external medium (for example, air) with the refractive index n1 differs between the deepest portion and the shallowest portion, and thus an optical path difference arises. This optical path difference arises in both the incidence path and the return path. The ideal depth h that satisfies the condition of "setting the depth h so that the phase difference between a light component reaching the observation position via the deepest portion and a light component reaching the observation position via the shallowest portion is $2\pi$" can thus be determined by the formula: "$h=\lambda/(2\times n1)$." When this first observation mode is premised, because the reconstruction illumination light reflected by the reflecting layer 130 is observed inside the space filled with the external medium with the refractive index n1, light does not propagate into the light transmitting layer 110. Because the light transmitting layer 110 thus functions merely as a supporting substrate, with which the upper surface forms the relief structure surface and which is for supporting the reflecting layer 130, it does not have to have a light transmitting property. From this standpoint, a two-layer structure, such as that shown in FIG. 31 is not necessary, and a usage premised on the first observation mode is possible even when a single-layer structure cell, with which an upper surface forms the relief structure surface and the relief structure surface is a reflecting surface (that is, a cell constituted by a plate on a top surface of which a reflecting relief structure surface is formed), is used. The ideal depth h in this case can also be determined by the formula: "$h=\lambda/(2\times n1)$."

A case where the second observation mode is premised shall now be considered. The cell shown in FIG. 31 is premised on use in a space filled with a substance having the refractive index n1, and the relief structure surface is formed as the interface of the light transmitting layer 110, formed of the substance having the refractive index n2, and the reflecting layer 130, having the property of reflecting the reconstruction illumination light. In the second observation mode, the reconstruction illumination light that is transmitted through the light transmitting layer 110, is reflected by the reflecting layer 130, and is transmitted through the light transmitting layer 110 again is observed. Here, because the relief structure has no effect whatsoever on an optical phenomenon that occurs at a lower side of the bottom surface of the light transmitting layer 110 of FIG. 31, the refractive index n1 does not have to be taken into consideration. The optical path difference of a light component reflected by the deepest portion of the relief structure and a light component reflected by the shallowest portion occurs during propagation through the light transmitting layer 110 with the refractive index n2. The ideal depth h in the case of premising the second observation mode can thus be determined by the formula: "$h=\lambda/(2 \times n2)$."

(4) Type 2B (Reflecting Type)

Figure 32:
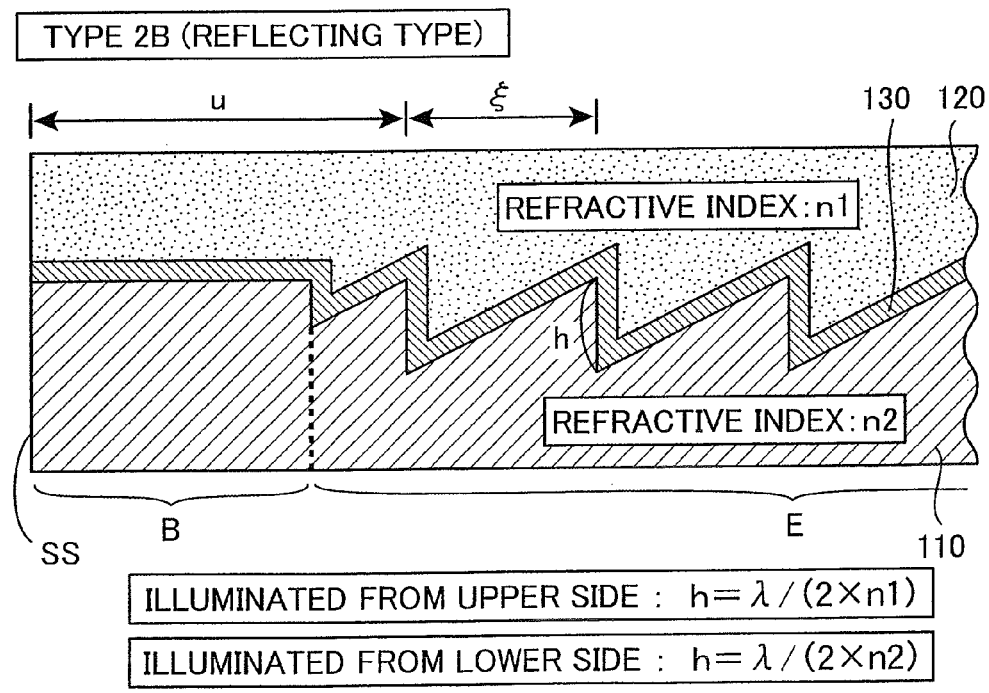
FIG. 32 is a partial front section view of an example of a physical structure (type 2B) of a three-dimensional cell determined by the procedure of step S9 of the flowchart of FIG. 21.

Meanwhile, a "type 2B (reflecting type)" cell, shown in FIG. 32, has a structure, with which another light transmitting layer 120 is laminated onto an upper portion of the "type 2A (reflecting type)" cell shown in FIG. 31. That is, the light transmitting layer 120 that is an upper layer is formed of a light transmitting substance with the refractive index n1, and the light transmitting layer 110 that is a lower layer is formed of a light transmitting substance with the refractive index n2. The reflecting layer 130 is formed so as to be sandwiched between the light transmitting layers 110 and 120. As mentioned above, a cell of a type with which the relief structure surface is sandwiched between two layers and is not exposed to the exterior has the merit that the relief structure surface is unlikely to become damaged.

From the standpoint of optical phenomena, the "type 2A (reflecting type)" cell shown in FIG. 31 and the "type 2B (reflecting type)" cell shown in FIG. 32 are exactly the same. That is, the light transmitting layer 110 and the reflecting layer 130 in FIG. 32 are exactly the same as the light transmitting layer 110 and the reflecting layer 130 shown in FIG. 31. The light transmitting layer 120 at the upper layer in FIG. 32 serves a function equivalent to the medium (for example, air) of the external space shown in FIG. 31. Thus from an optical standpoint, there are no differences between the types 2A and 2B. Thus in designing the "type 2B (reflecting type)" cell, shown in FIG. 32, examinations must be made separately according to the two observation modes.

First, if the first observation mode of illuminating illumination light from above and observing upwardly reflected light is premised, the ideal depth h can be determined by the formula: "$h=\lambda/(2 \times n1)$." In this case, the light transmitting layer 110 simply serves the function of a supporting substrate and does not necessarily have to be formed of a light transmitting material. On the other hand, if the second observation mode of illuminating illumination light from below and observing downwardly reflected light is premised, the ideal depth h can be determined by the formula: "$h=\lambda/(2 \times n2)$." In this case, the light transmitting layer 120 simply serves the function of a supporting substrate and does not necessarily have to be formed of a light transmitting material. To summarize, with the "type 2B (reflecting type)" cell, shown in FIG. 32, the optically important point is that a layered structure of the light transmitting layer 110 or 120 and the reflecting layer 130 is formed and that the relief structure surface is formed as the interface between the two layers.

(5) Type 3A (Reflecting Type)

Figure 33:
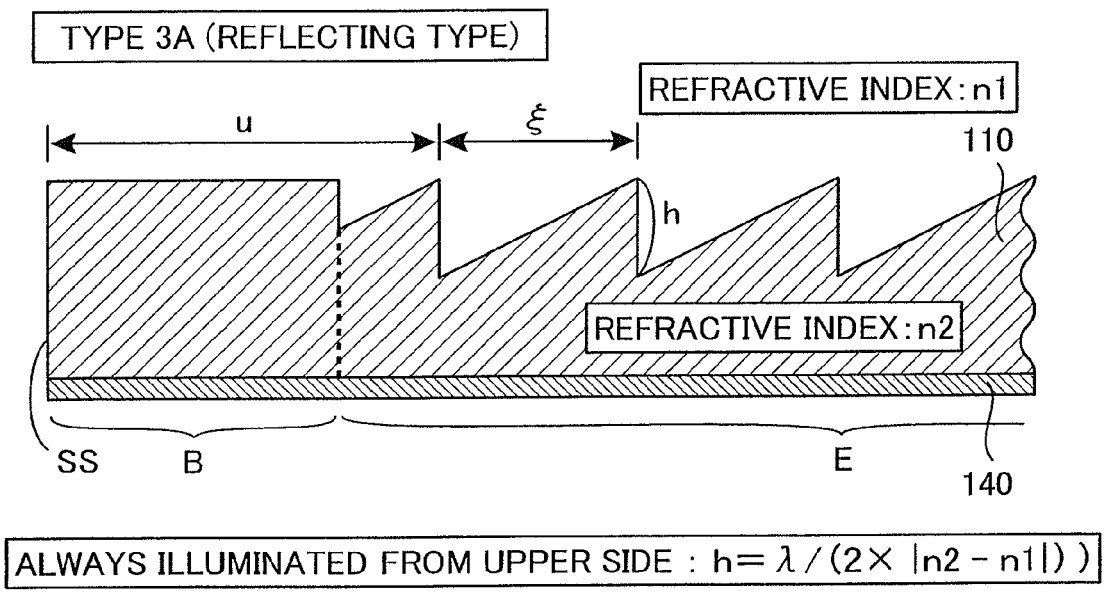
FIG. 33 is a partial front section view of an example of a physical structure (type 3A) of a three-dimensional cell determined by the procedure of step S9 of the flowchart of FIG. 21.

A "type 3A (reflecting type)" cell is shown in FIG. 33. With this cell, a reflecting layer 140 is formed on the lower surface of the light transmitting layer 110 of the "type 1A (transmitting type)" cell, shown in FIG. 29, and is constituted of a layered structure of the light transmitting layer 110, formed of a substance with the refractive index n2, and the reflecting layer 140, having the property of reflecting the reconstruction illumination light. The relief structure surface is formed at the top surface of the light transmitting layer 110, that is, the surface at the opposite side of the surface of the light transmitting layer 110 that contacts the reflecting layer 140. This "type 3A (reflecting type)" cell is premised on usage in a space (such, as air) that is filled with a substance with the refractive index n1, and is used in a mode, in which a reconstruction illumination light is illuminated from the upper side of the figure, and a light that is transmitted through the light transmitting layer 110, is reflected by an upper surface of the reflecting layer 140, is transmitted again through the light transmitting layer 110, and returns to the upper side of the figure is observed.

In a case of use in such an observation mode, the ratio of the distance of propagation through the external medium (for example, air) with the refractive index n1 and the distance of propagation through the light transmitting layer 110 with the refractive index n2 differs between the deepest portion and the shallowest portion, and this gives rise to a phase difference. This phase difference arises in both the incidence path and the return path. The ideal depth h that satisfies the condition of "setting the depth h so that the phase difference between a light component reaching the observation position via the deepest portion and a light component reaching the observation position via the shallowest portion is $2\pi$" can thus be determined by the formula: "$h=\lambda/(2 \times |n2-n1|)$."

(6) Type 3B (Reflecting Type)

Figure 34:
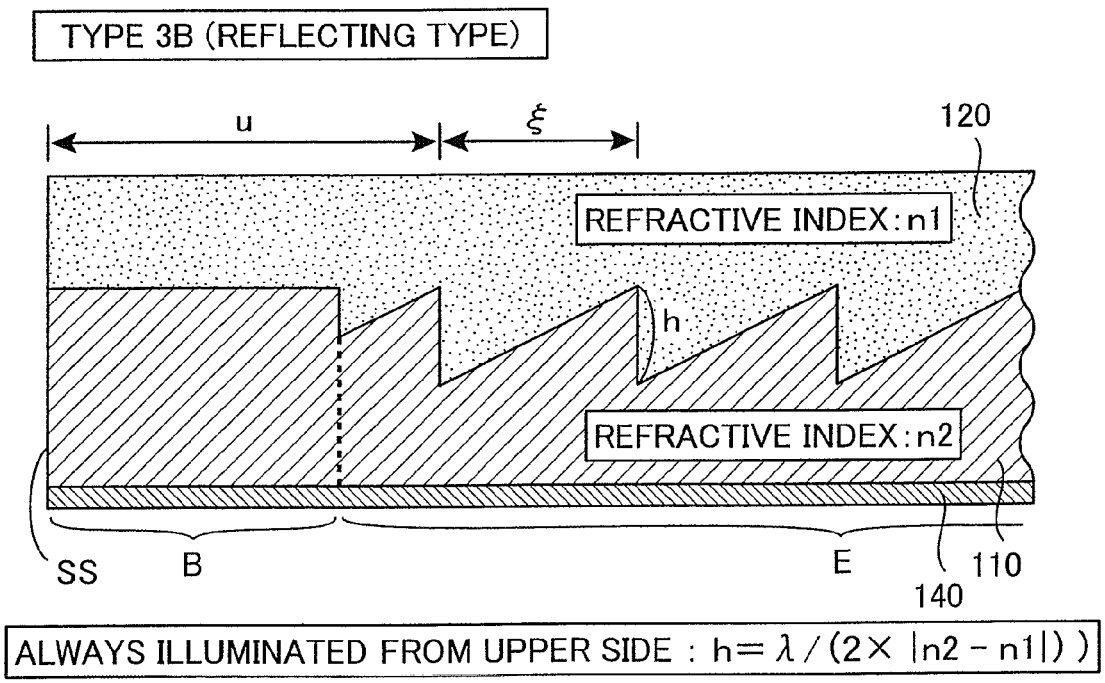
FIG. 34 is a partial front section view of an example of a physical structure (type 3B) of a three-dimensional cell determined by the procedure of step S9 of the flowchart of FIG. 21.

Meanwhile, a "type 3B (reflecting type)" cell, shown in FIG. 34, has a structure, with which another light transmitting layer 120 is laminated onto an upper portion of the "type 3A (reflecting type)" cell shown in FIG. 33. That is, this cell is constituted of a layered structure of the light transmitting layer 120, formed of a substance with the refractive index n1, the light transmitting layer 110 formed of a substance with the refractive index n2, and the reflecting layer 140. The relief structure surface is formed at the interface of the light transmitting layer 110 and the light transmitting layer 120, and the reflecting layer 140 is formed at the surface of the light transmitting layer 110 at the opposite side of the surface in contact with the light transmitting layer 120.

This "type 3B (reflecting type)" cell is used in a mode, in which a reconstruction illumination light is illuminated from the upper side of the figure, and a light that is transmitted through both the light transmitting layer 110 and the light transmitting layer 120, is reflected by the reflecting layer 140, is transmitted again through both the light transmitting layer 110 and the light transmitting layer 120, and returns to the upper side of the figure is observed.

From the standpoint of optical phenomena, the "type 3A (reflecting type)" cell shown in FIG. 33 and the "type 3B (reflecting type)" cell shown in FIG. 34 are exactly the same. That is, the light transmitting layer 110 and the reflecting layer 140 in FIG. 34 are exactly the same as the light transmitting layer 110 and the reflecting layer 140 shown in FIG. 33. The light transmitting layer 120 at the upper layer in FIG. 34 serves a function equivalent to the medium (for example, air) of the external space shown in FIG. 33. Thus from an optical standpoint, there are no differences between the types 3A and 3B. Thus in designing the "type 3B (reflecting type)" cell, shown in FIG. 34, the ideal depth h can be determined by the formula: "$h=\lambda/(2 \times |n2-n1|)$."

(7) Type 4A (Transmitting Type)

Figure 35:
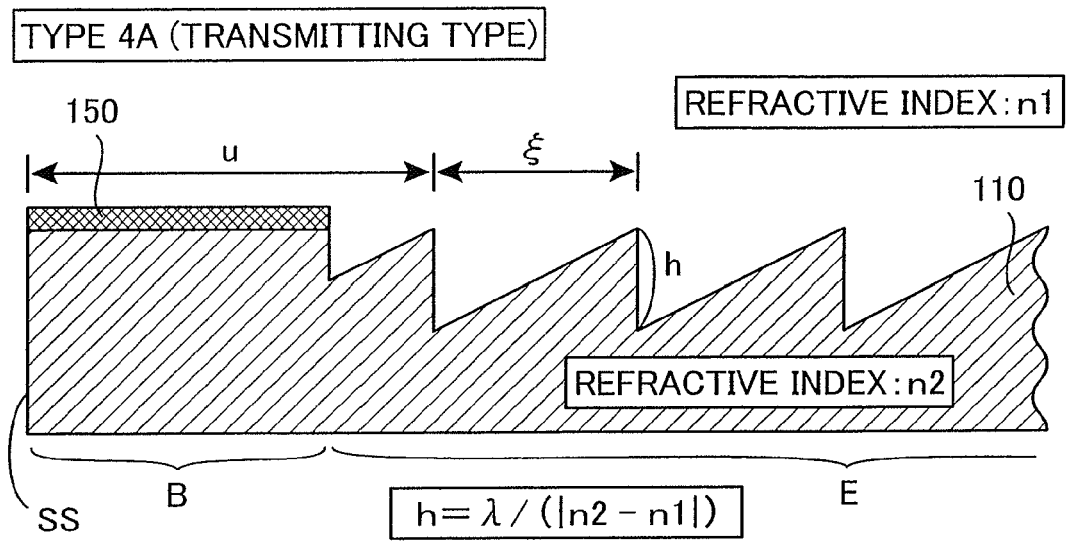
FIG. 35 is a partial front section view of an example of a physical structure (type 4A) of a three-dimensional cell determined by the procedure of step S9 of the flowchart of FIG. 21.

With a "type 4A (transmitting type)" cell, shown in FIG. 35, a light blocking layer 150 is formed at a portion of the blank region B of the "type 1A (transmitting type)" cell, shown in FIG. 29. With a three-dimensional cell used in the present invention, a blank region B is a region in which a diffraction grating is not formed, and properly speaking, is a region that does not serve a role whatsoever of providing information at the observation position. However in actuality, there are cases where light that is transmitted through this blank region is observed at the observation position, and such light becomes a cause of generating noise components with respect to the reproduced original image.

With the cell shown in FIG. 35, because the light blocking layer 150 is formed at the portion of the blank region B, light that tends to be transmitted through the blank region B is blocked and is prevented from reaching the observation position. The generation of noise components with respect to the reproduced original image can thereby be suppressed.

(8) Type 4B (Transmitting Type)

Figure 36:
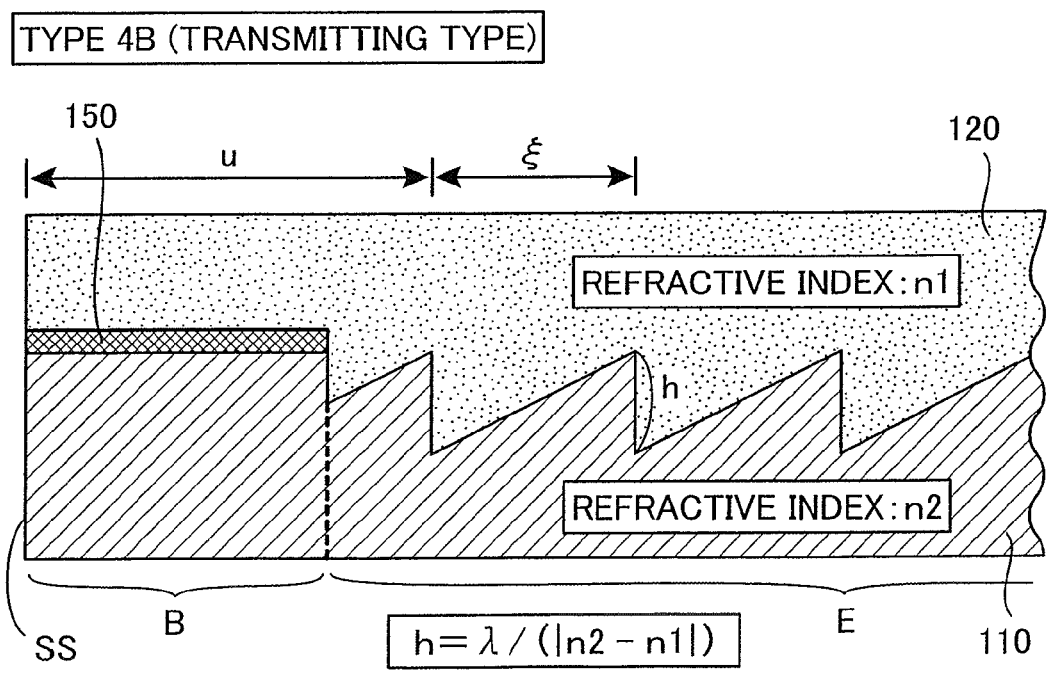
FIG. 36 is a partial front section view of an example of a physical structure (type 4B) of a three-dimensional cell determined by the procedure of step S9 of the flowchart of FIG. 21.

With a "type 4B (transmitting type)" cell, shown in FIG. 36, the light blocking layer 150 is formed at a portion of the blank region B of the "type 1B (transmitting type)" cell, shown in FIG. 30. With this example, the light blocking layer 150 is inserted between the transmitting layer 110 and the transmitting layer 120, and a noise component suppression effect is provided.

(9) Type 5A (Reflecting Type)

Figure 37:
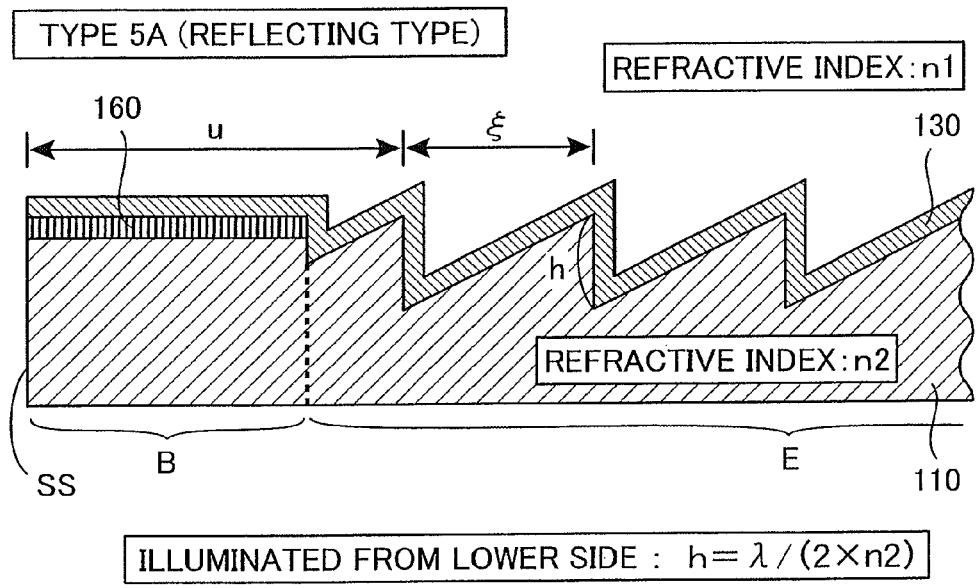
FIG. 37 is a partial front section view of an example of a physical structure (type 5A) of a three-dimensional cell determined by the procedure of step S9 of the flowchart of FIG. 21.

With a "type 5A (reflecting type)" cell, shown in FIG. 37, a light absorbing layer 160 is formed at a portion of the blank region B of the "type 2A (reflecting type)" cell, shown in FIG. 31. With a reflecting type cell, when light reflected at a blank region B reaches the observation position, the light becomes a cause of generating noise components. With the cell shown in FIG. 37, because the light absorbing layer 160 is inserted between the transmitting layer 110 and the reflecting layer 130 at the portion of the blank region B, the light that reaches this portion is absorbed here and is prevented from being emitted to the exterior. The generation of noise components with respect to the reproduced original image can thereby be suppressed.

(10) Type 5B (Reflecting Type)

Figure 38:
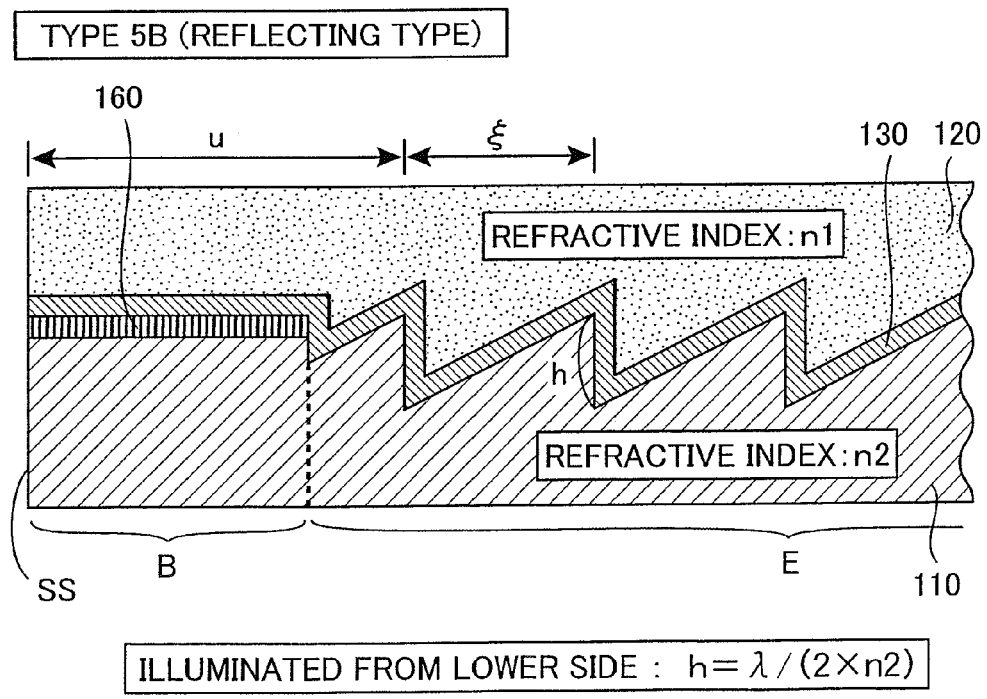
FIG. 38 is a partial front section view of an example of a physical structure (type 5B) of a three-dimensional cell determined by the procedure of step S9 of the flowchart of FIG. 21.

With a "type 5B (reflecting type)" cell, shown in FIG. 38, the light absorbing layer 160 formed at a portion of the blank region B of the "type 2B (reflecting type)" cell, shown in FIG. 32. With this example, the light absorbing layer 160 is inserted between the transmitting layer 110 and the transmitting layer 120, and a noise component suppression effect is provided.

(11) Type 6A (Reflecting Type)

Figure 39:
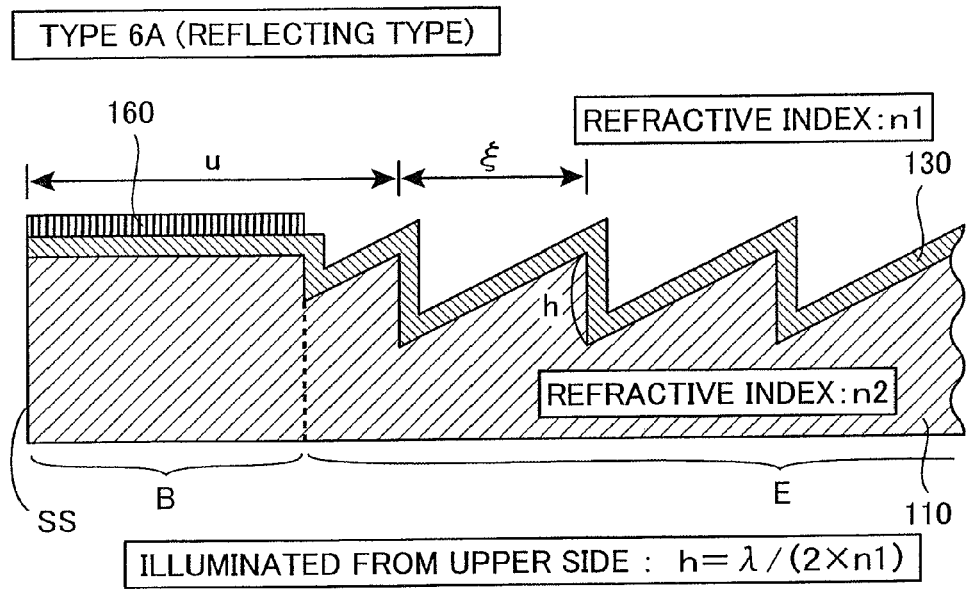
FIG. 39 is a partial front section view of an example of a physical structure (type 6A) of a three-dimensional cell determined by the procedure of step S9 of the flowchart of FIG. 21.

With a "type 6A (reflecting type)" cell, shown in FIG. 39, the light absorbing layer 160 in the "type 5A (reflecting type)" cell, shown in FIG. 37, is formed on the upper surface of the reflecting layer 130. Although restricted to the case where the illumination light is illuminated from above, an effect of suppressing the generation of noise components with respect to the reproduced original image is obtained with this type as well.

(12) Type 6B (Reflecting Type)

Figure 40:
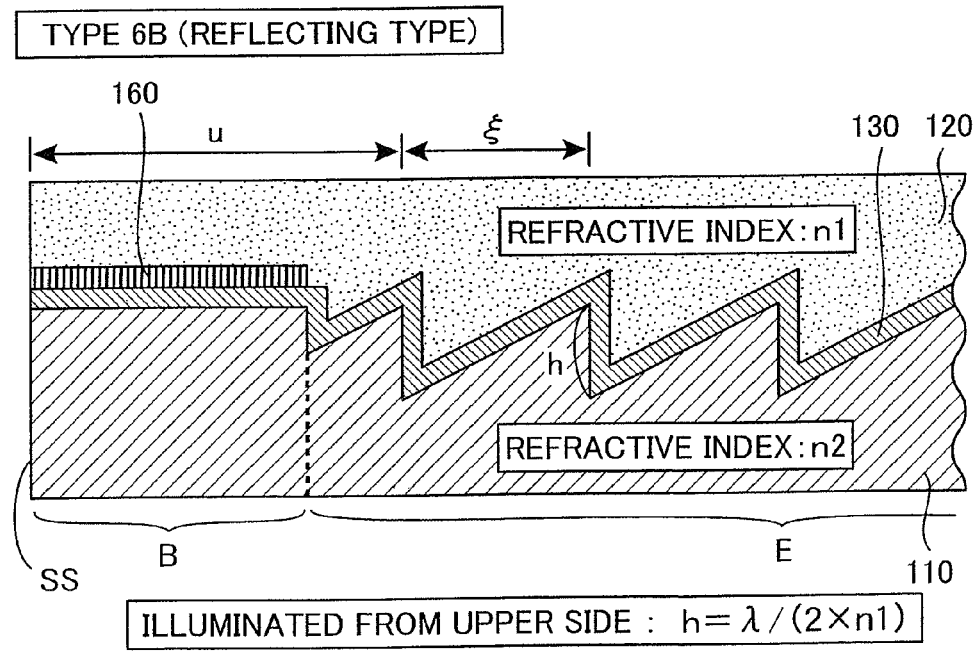
FIG. 40 is a partial front section view of an example of a physical structure (type 6B) of a three-dimensional cell determined by the procedure of step S9 of the flowchart of FIG. 21.

With a "type 6B (reflecting type)" cell, shown in FIG. 40, the light absorbing layer 160 in the "type 5B (reflecting type)" cell, shown in FIG. 38, is formed on the upper surface of the reflecting layer 130. Although restricted to the case where the illumination light is illuminated from above, an effect of suppressing the generation of noise components with respect to the reproduced original image is obtained with this type as well.

(13) Type 7A (Reflecting Type)

Figure 41:
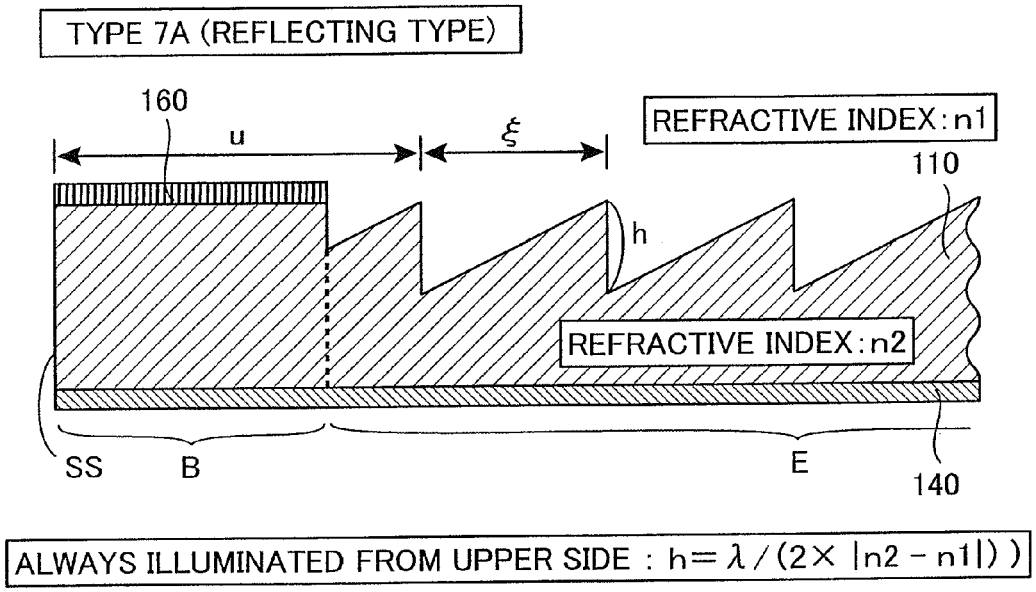
FIG. 41 is a partial front section view of an example of a physical structure (type 7A) of a three-dimensional cell determined by the procedure of step S9 of the flowchart of FIG. 21.

With a "type 7A (reflecting type)" cell, shown in FIG. 41, the light absorbing layer 160 is formed on a portion of the blank region B of the "type 3A (reflecting type)" cell, shown in FIG. 33. An effect of suppressing the generation of noise components with respect to the reproduced original image is obtained with this type as well.

(14) Type 7B (Reflecting Type)

Figure 42:
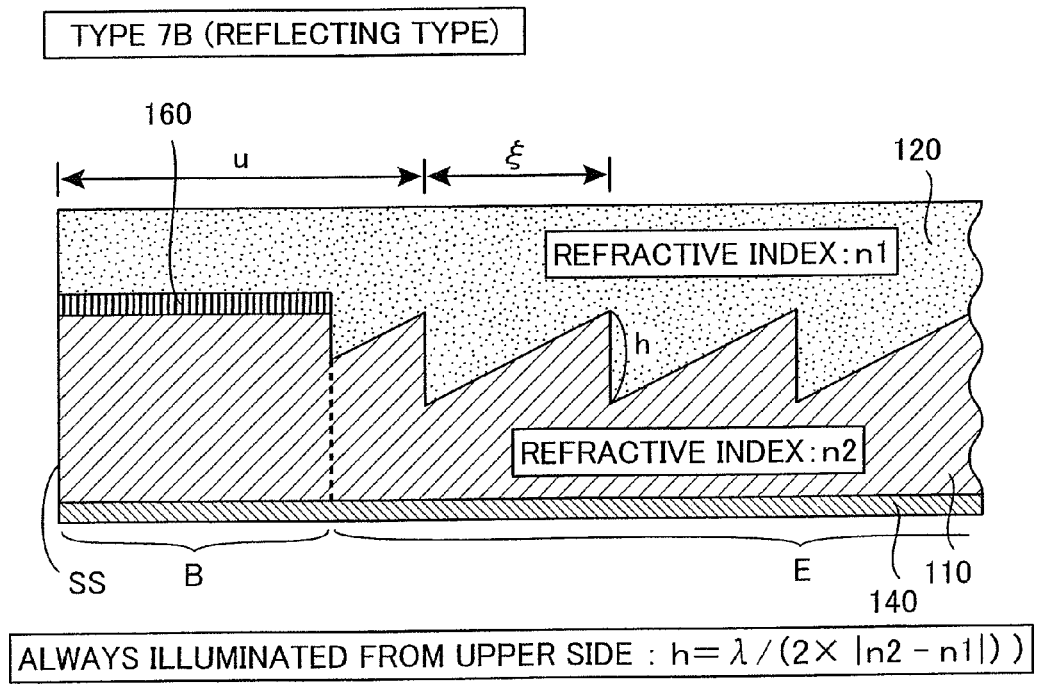
FIG. 42 is a partial front section view of an example of a physical structure (type 7B) of a three-dimensional cell determined by the procedure of step S9 of the flowchart of FIG. 21.

With a "type 7B (reflecting type)" cell, shown in FIG. 42, the light absorbing layer 160 is formed on a portion of the blank region B of the "type 3B (reflecting type)" cell, shown in FIG. 34. The absorbing layer 160 is inserted between the light transmitting layer 110 and the light transmitting layer 120. An effect of suppressing the generation of noise components with respect to the reproduced original image is obtained with this type as well.

Although some examples of forming a light blocking layer or a light absorbing layer on a portion of a blank region B of a cell were described above, the light blocking layer may be formed of any material as long as the material has a property of blocking the transmission of light. Likewise, the light absorbing layer may be formed of any material as long as the material has a property of absorbing light. To summarize, it suffices that it be possible to prevent light, which becomes a cause of noise components, from reaching the observation position by forming a light blocking layer that blocks light components that do not pass through the effective region in the diffraction grating forming surface or a light absorbing layer that absorbs light components that reach portions besides the effective region.

(15) Types 2A', 2B', 3A' and 3B' (Reflecting Types)

Figure 43:
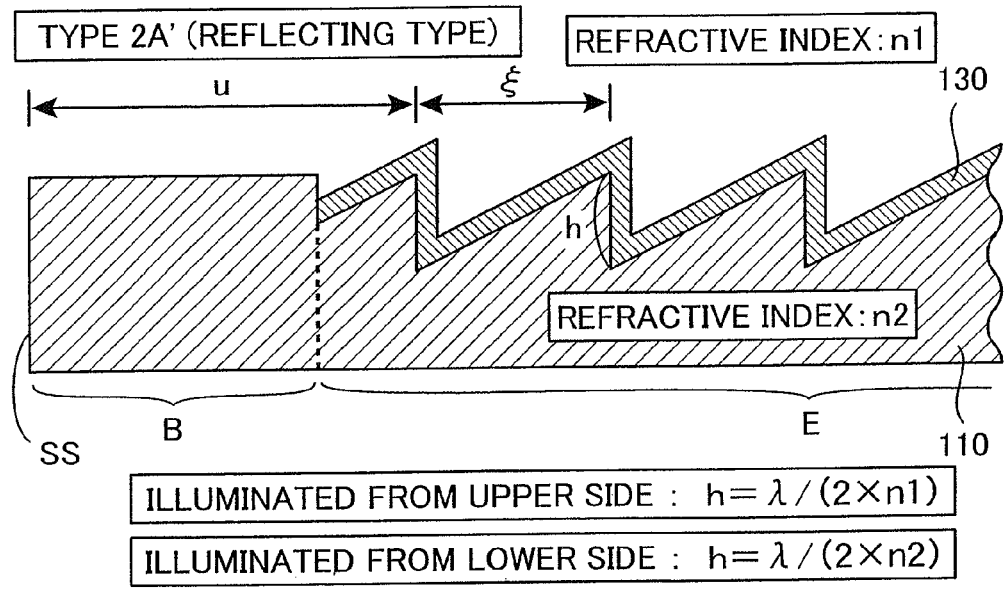
FIG. 43 is a partial front section view of an example of a physical structure (type 2A'), with which a reflecting layer at a blank region of the type 2A cell, shown in FIG. 31, is removed.
Figure 44:
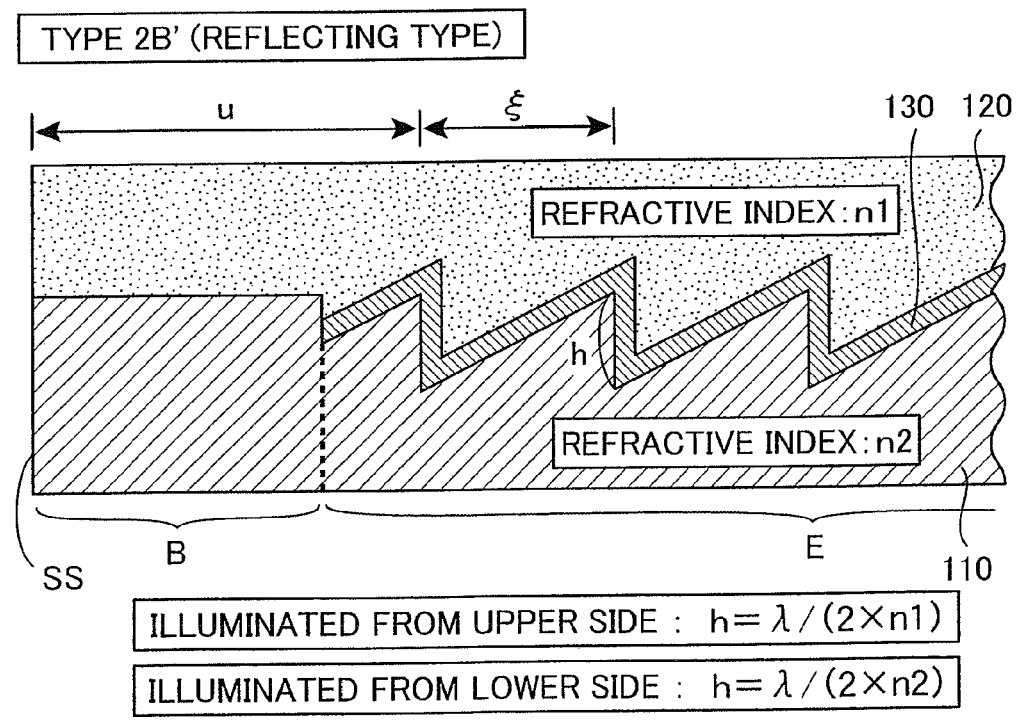
FIG. 44 is a partial front section view of an example of a physical structure (type 2B'), with which a reflecting layer at a blank region of the type 2B cell, shown in FIG. 32, is removed.
Figure 45:
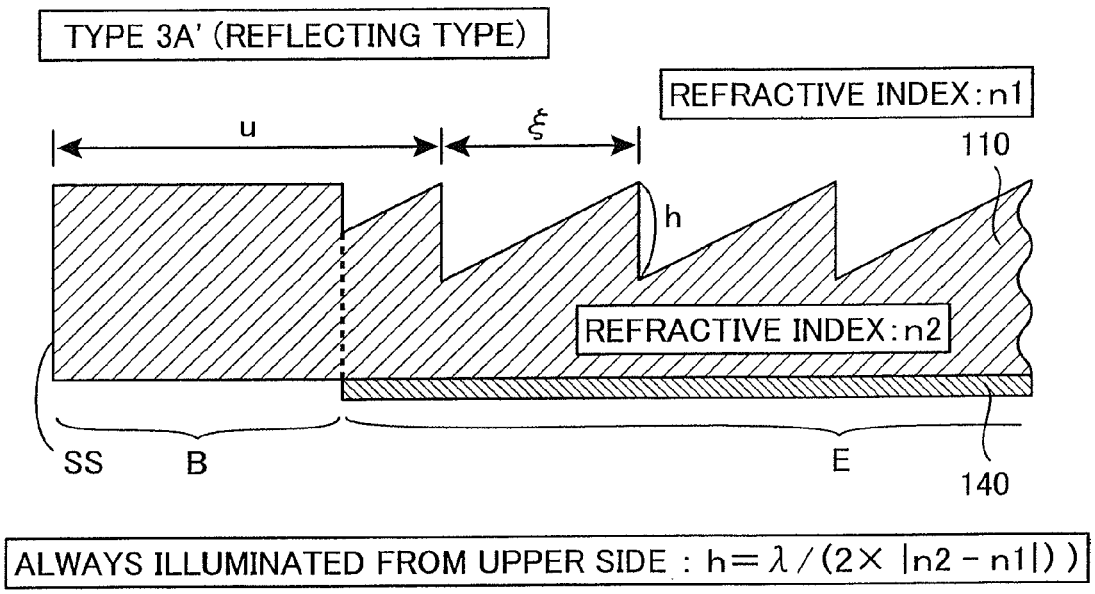
FIG. 45 is a partial front section view of an example of a physical structure (type 3A'), with which a reflecting layer at a blank region of the type 3A cell, shown in FIG. 33, is removed.
Figure 46:
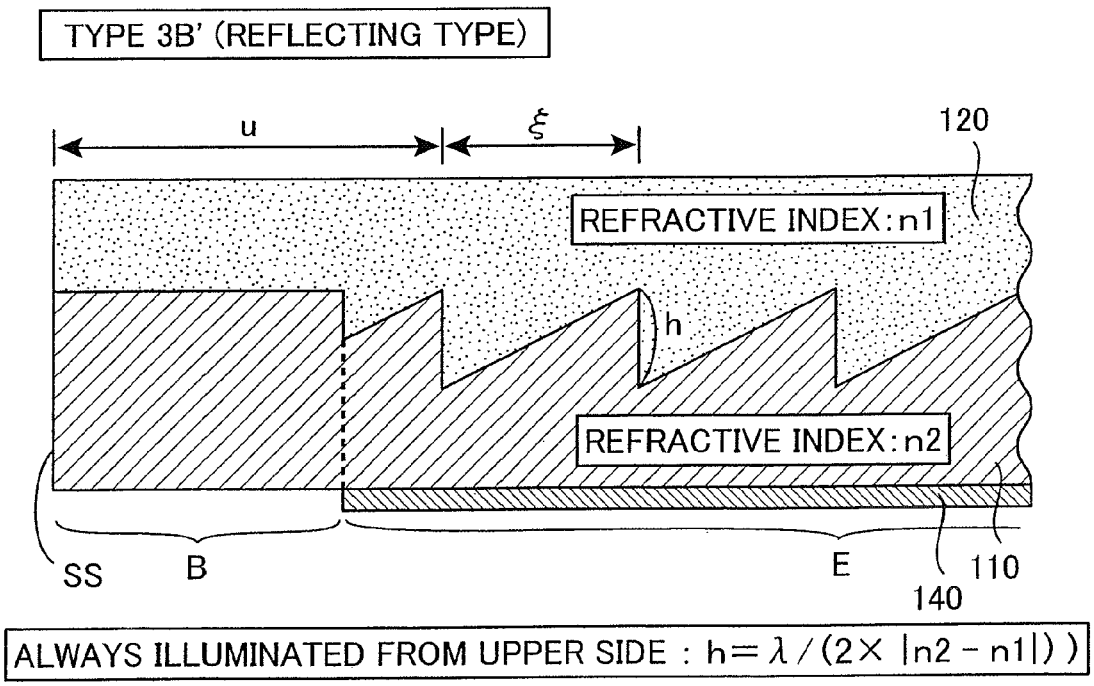
FIG. 46 is a partial front section view of an example of a physical structure (type 3B'), with which a reflecting layer at a blank region of the type 3B cell, shown in FIG. 34, is removed.

With a "type 2A' (reflecting type)" cell, shown in FIG. 43, the reflecting layer 130 at a portion of the blank region B of the "type 2A (reflecting type)" cell, shown in FIG. 31, is removed. Likewise, with a "type 2B' (reflecting type)" cell, shown in FIG. 44, the reflecting layer 130 at a portion of the blank region B of the "type 2B (reflecting type)" cell, shown in FIG. 32, is removed, with a "type 3A' (reflecting type)" cell, shown in FIG. 45, the reflecting layer 140 at a portion of the blank region B of the "type 3A (reflecting type)" cell, shown in FIG. 33, is removed, and with a "type 3B' (reflecting type)" cell, shown in FIG. 46, the reflecting layer 140 at a portion of the blank region B of the "type 3B (reflecting type)" cell, shown in FIG. 34, is removed. Because light components from the blank region B become a cause of generating noise components during reproduction, by forming each reflecting layer only inside the effective region E and not at the blank region B, an effect of eliminating noise components is obtained.

<<<Section 8. Modification Examples of the Present Invention>>>

Lastly, some modification examples of putting the present invention into practice shall be described.

(1) Example of Using a Staircase Diffraction Grating

With each of the embodiments described thus far, as shown in FIG. 12 and FIG. 28, a diffraction grating, with a sawtooth-shaped cross section, is formed by the relief structure surface. That is, in the three-dimensional cell, a slope, which continuously decreases monotonously in depth from a deepest portion to a shallowest portion, is formed in a period section of a length $\xi$ extending along a vertical side in an effective region, and the relief structure surface is formed by repeatedly setting this slope. When a diffraction grating is formed by such a relief structure surface having a sawtooth-shaped cross section, in theory, the diffraction phenomenon described with FIGS. 19 and 20 occurs, enabling an ideal diffraction efficiency to be obtained and a bright, clear reproduction image to be obtained.

However, in consideration of mass production of an optical element, the preparation of cells with such an ideal relief structure surface is extremely difficult. That is, although a slope that continuously decreases monotonously in depth can be formed comparatively readily by a mechanical cutting process, etc., with an optical cell used in the present invention, the period ξ of the slope is a length of approximately 1 μm, which makes manufacture of mass-produced products by use of a mechanical cutting process unrealistic. Although presently for mass production of an optical element on a commercial scale, the use of the processes of lithography and development by an electron beam lithography device to prepare the relief structure surface that constitutes the diffraction grating is the most realistic method, a slope structure cannot be formed by this method.

Figure 47:
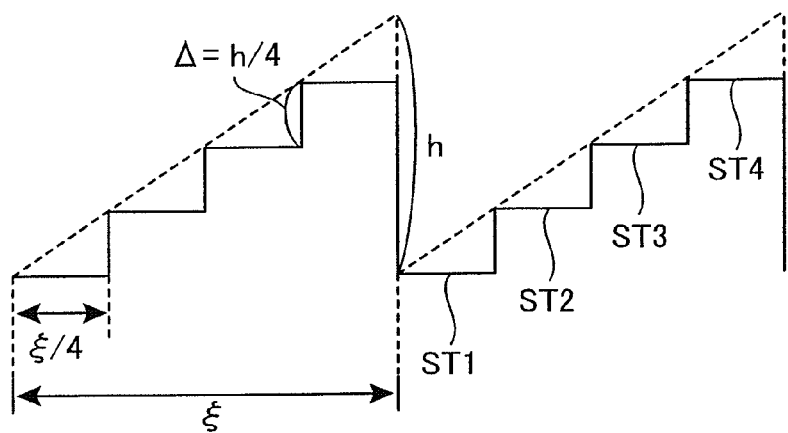
FIG. 47 is an enlarged front view of an embodiment, with which an uneven shape of a diffraction grating formed on a three-dimensional cell, is realized by a four-step staircase structure in place of a slope structure.

The present inventor thus trial-manufactured an optical element according to the present invention using, in place of the slope structure of the embodiments described thus far, a staircase structure that approximates the slope structure. FIG. 47 is an enlarged front view of an embodiment, with which an uneven shape of a diffraction grating formed on a three-dimensional cell is realized by a four-step staircase structure instead of a slope structure. The shape indicated by broken lines in the figure is the uneven shape of the slope structure used in the embodiments described thus far, and the shape indicated by solid lines is the uneven shape of the staircase structure according to the modification example described here. As illustrated, this staircase structure is constituted of the four steps of steps ST1, ST2, ST3, and ST4. With the present example, because all fours steps are made equal in step difference, the step difference Δ of a step is given by: Δ=h/4; and the width of a step is ξ/4. Thus when the period ξ of the uneven shape variation is set to 1 μm, the step width is 0.25 μm.

Thus with the diffraction grating of the staircase structure shown in FIG. 47, a staircase, with which the depth from a deepest portion to a shallowest portion decreases monotonously in stepwise manner, is formed in a section of the period ξ, and the relief structure surface is formed by repeatedly setting this staircase. A comparison of the solid lines and the broken lines in FIG. 47 shows a slight deviation between the two, and the diffraction grating constituted of the staircase structure cannot provide the ideal diffraction efficiency provided by a diffraction grating constituted of a slope structure. However, a trial-manufacture product manufactured by the present inventor enabled a satisfactory reproduction image that does not present any problems whatsoever for practical use to be obtained.

To form the four-step staircase structure shown in FIG. 47 by the processes of lithography and development by an electron beam lithography device, for example, a first process of setting the position of the step ST4 as an uppermost surface and excavating a region for forming the steps ST1 and ST2 to just a depth of (2/4)h and a second process of excavating a region for forming the steps ST1 and ST3 to just a depth of (1/4)h are executed.

Figure 48:
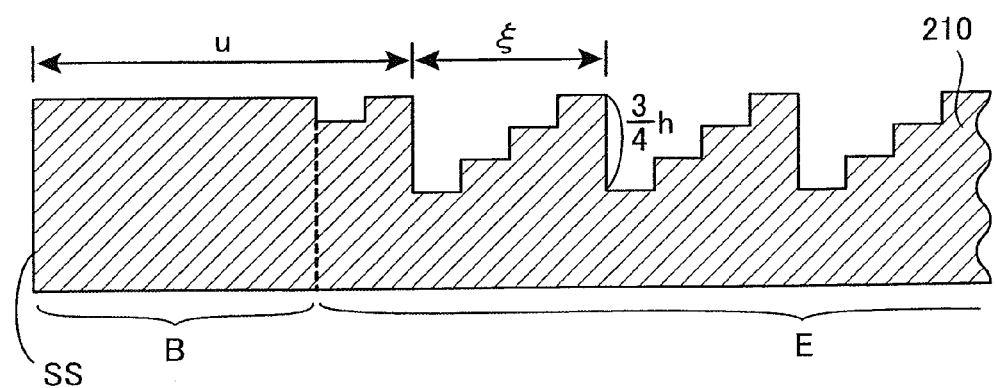
FIG. 48 is a partial front section view of an example where a slope structure of the type 1A cell, shown in FIG. 29, is replaced by a four-step staircase structure.
Figure 49:
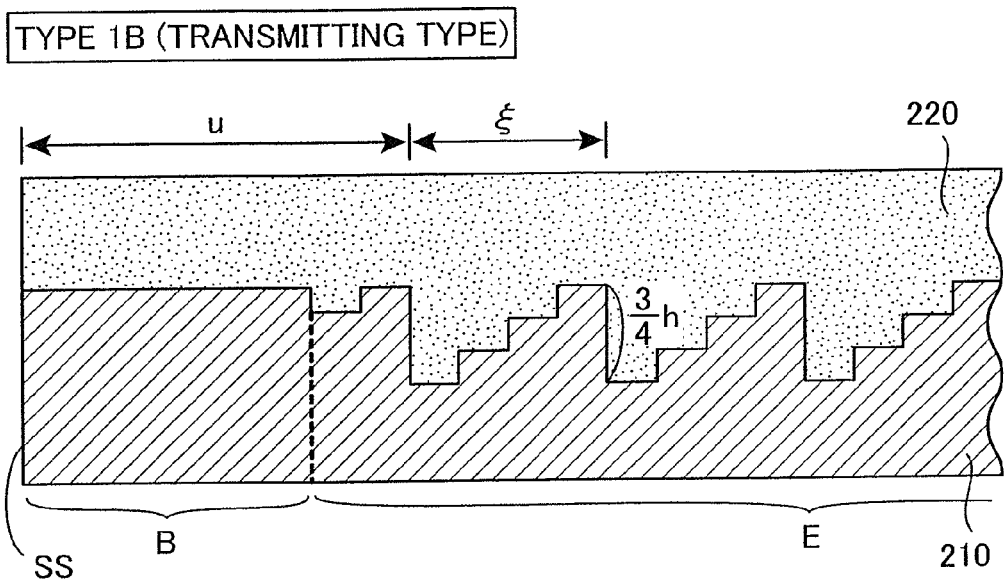
FIG. 49 is a partial front section view of an example where a slope structure of the type 1B cell, shown in FIG. 30, is replaced by a four-step staircase structure.
Figure 50:
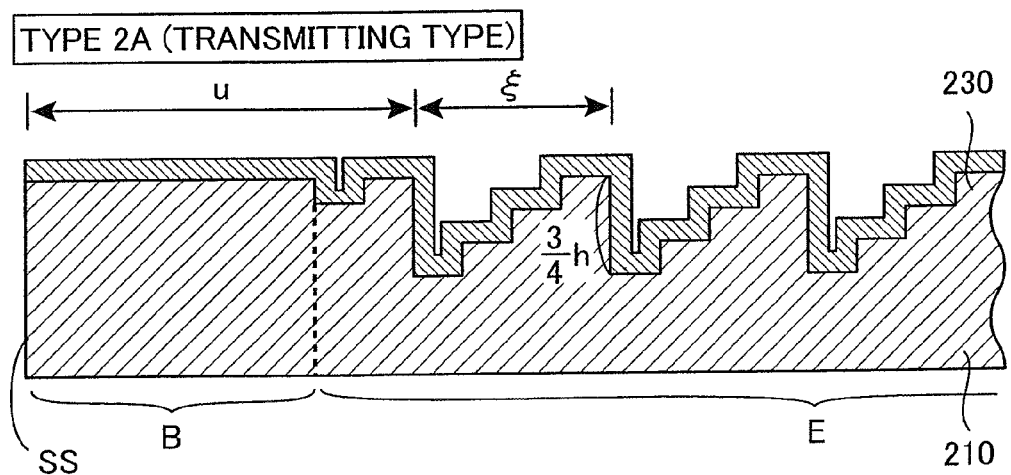
FIG. 50 is a partial front section view of an example where a slope structure of the type 2A cell, shown in FIG. 31, is replaced by a four-step staircase structure.
Figure 51:
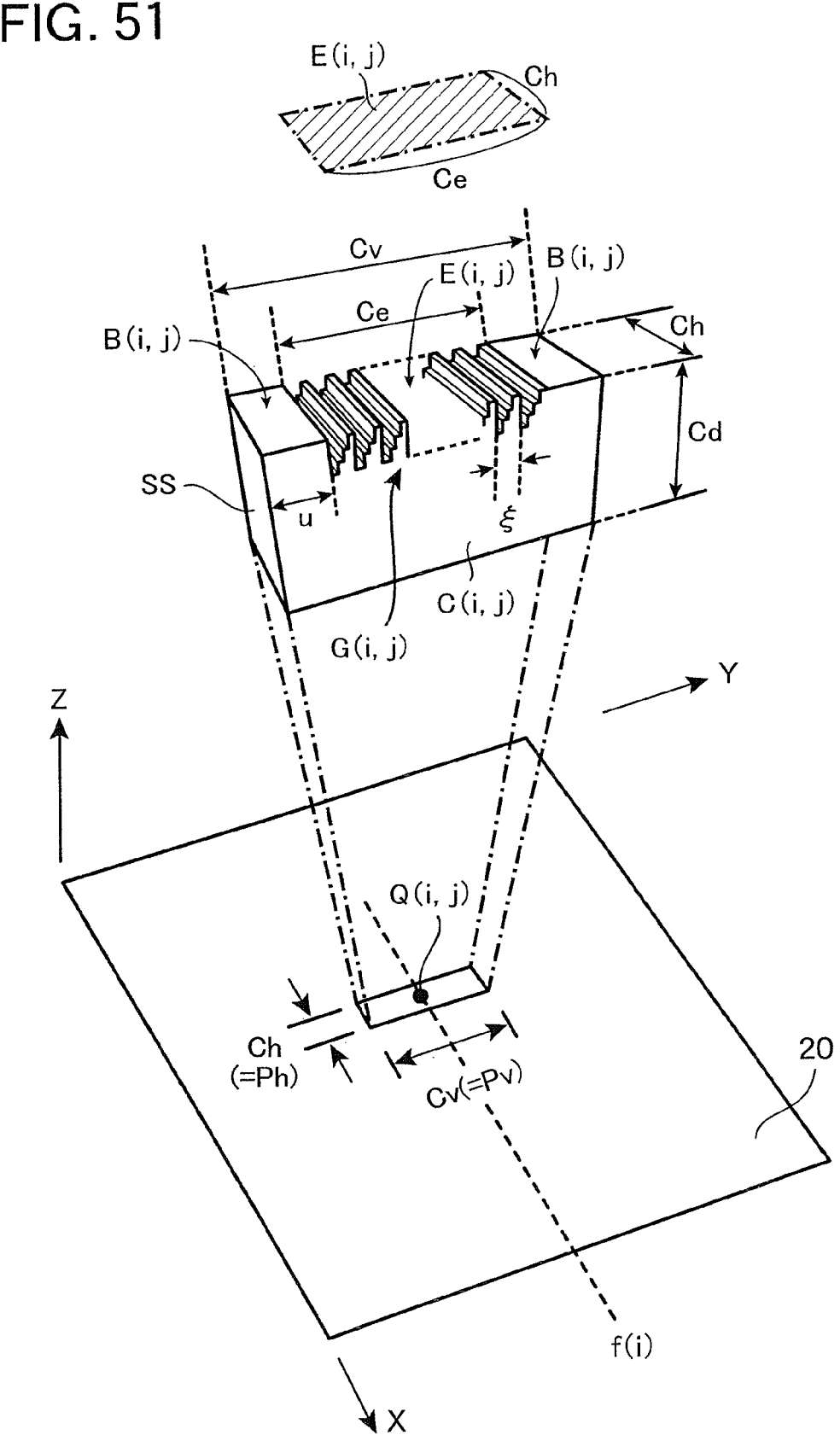
FIG. 51 is a perspective view of an example where a slope structure of the three-dimensional cell, shown in FIG. 28, is replaced by a four-step staircase structure.

FIG. 48 is a partial front section view of an example, with which the slope structure of the type 1A cell, shown in FIG. 29, is replaced by the four-step staircase structure. The section in which the four steps of the steps ST1, ST2, ST3, and ST4 are positioned has a length of a single period ξ. The specific phase θ is defined based on a distance u between the "cell reference surface SS" and the "boundary position between the shallowest portion and the deepest portion." FIG. 49 is a partial front section view of an example, with which the slope structure of the type 1B cell, shown in FIG. 30, is replaced by the four-step staircase structure. FIG. 50 is a partial front section view of an example, with which the slope structure of the type 2A cell, shown in FIG. 31, is replaced by the four-step staircase structure. FIG. 51 is a perspective view of an example, with which the slope structure of the three-dimensional cell C(i, j), shown in FIG. 28, is replaced by the four-step staircase structure. Thus with the any of the embodiments described thus far, the slope structure can be replaced by a staircase structure.

The steps of the staircase structure does not necessarily have to be set to four steps and can be set to any number of steps. In general, if a slope structure with the depth h is to be replaced by a staircase structure with L steps, a staircase with a step difference of h/L is formed. In this case, the depth from the shallowest portion to the deepest portion of the staircase structure is: (L−1)h/L. Although the greater the number L of steps, the closer the structure becomes to an ideal slope structure and the higher the diffraction efficiency, the manufacturing process is made correspondingly more complex. To simplify the manufacturing process the most, the staircase structure is made to have just two steps.

Figure 52:
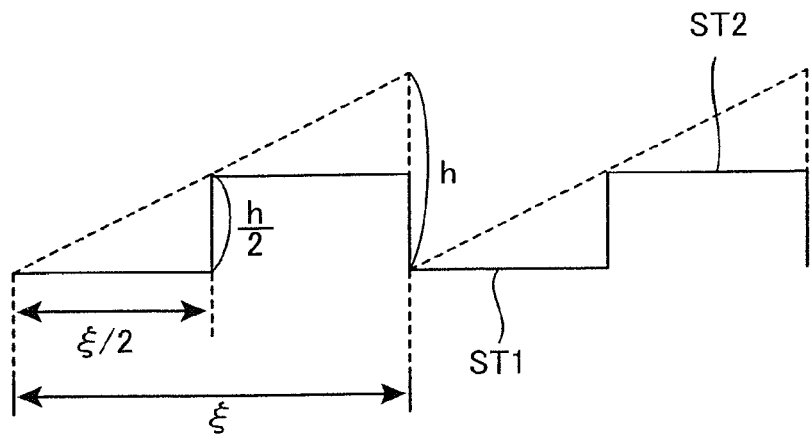
FIG. 52 is an enlarged front view of an embodiment, with which an uneven shape of a diffraction grating formed on a three-dimensional cell, is realized by a two-step staircase structure in place of a slope structure.

FIG. 52 is an enlarged front view of an embodiment, with which an uneven shape of a diffraction grating formed on a three-dimensional cell is realized by a two-step staircase structure instead of a slope structure. The shape indicated by broken lines in the figure is the uneven shape of the slope structure, and the shape indicated by solid lines is the uneven shape of the two-step staircase structure. Because as illustrated, this staircase structure is constituted of just the two steps of steps ST1 and ST2, the step difference of a step is equal to h/2 and the width of a step is ξ/2. Thus when the period ξ of the uneven shape variation is set to 1 μm, the step width is 0.5 μm. Although a comparison of the solid lines and the broken lines in FIG. 52 shows a considerable deviation between the two, a diffraction efficiency of some degree is obtained even with such a two-step staircase structure and depending on the application, an optical element of use can be obtained.

Figure 53:
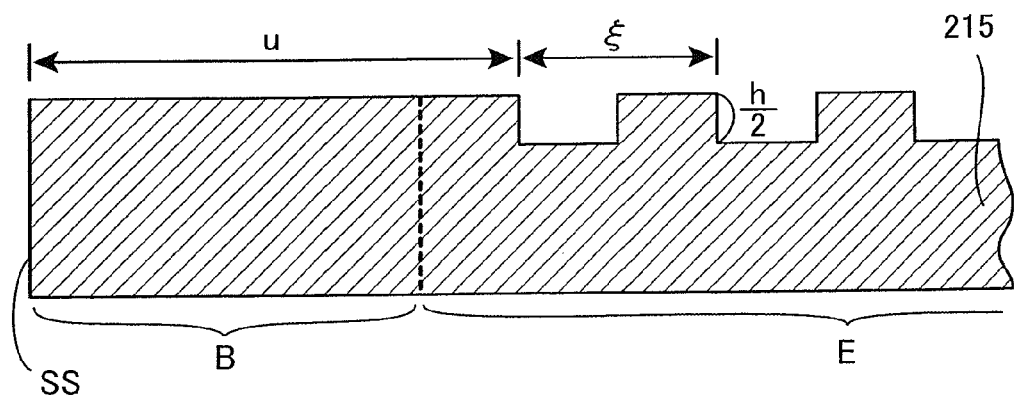
FIG. 53 is a partial front section view of an example where a slope structure of the structural example of the type 1A cell, shown in FIG. 29, is replaced by a two-step staircase structure.

FIG. 53 is a partial front section view of an example, with which the slope structure of the type 1A cell, shown in FIG. 29, is replaced by the two-step staircase structure. The section in which the two steps of the steps ST1 and ST2 are positioned has a length of a single period ξ. The specific phase θ is defined based on a distance u between the "cell reference surface SS" and the "boundary position between the shallowest portion and the deepest portion."

(2) Examples of Using Special Original Images

In preparing an optical element by the method according to the present invention, any image may be used as the original image as long as it functions as an image that emits a predetermined object light into a three-dimensional space. Just two examples of using special original images shall be disclosed here. The original images used in these examples are both special original images that emit different object light components according to direction.

Figure 54:
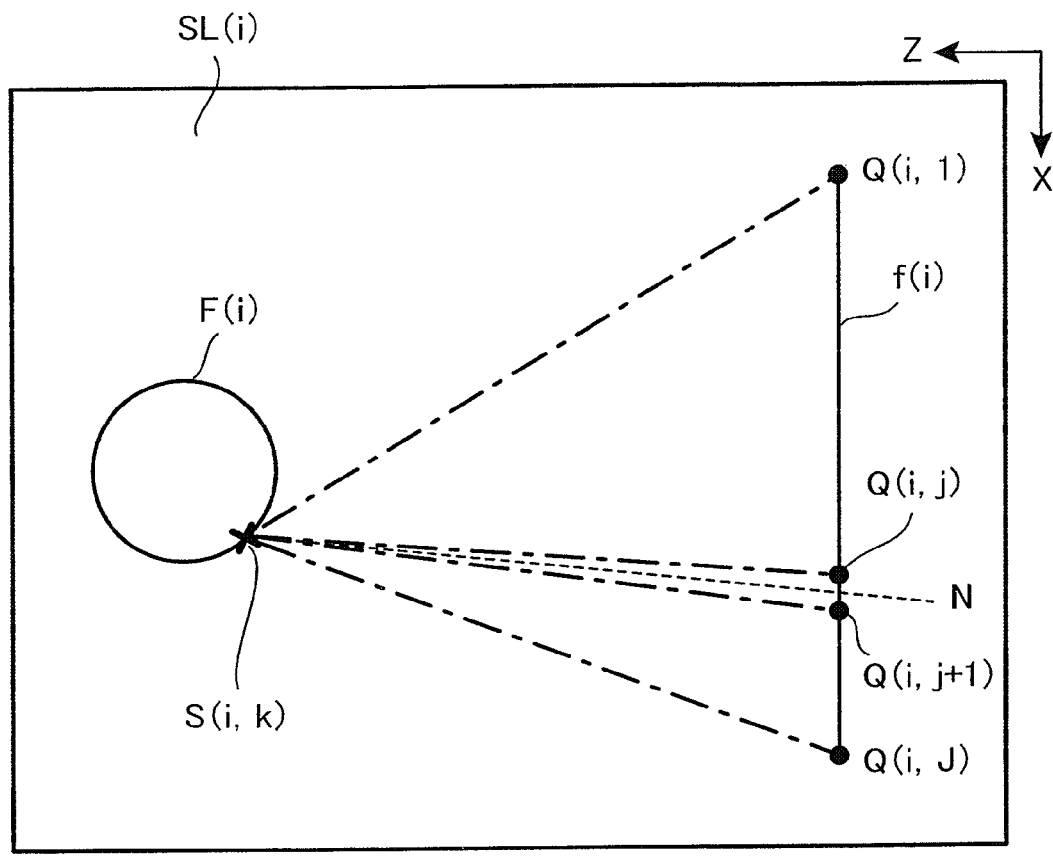
FIG. 54 is a plan view of a first example of defining an original image that emits different object light components according to direction.

A first example is an original image that is used in a method disclosed in Japanese Unexamined Patent Publication No. 2004-309709A. Here, it shall be deemed that an image contour F(i) and a cell position line f(i) are defined on an i-th slice plane SL(i) as shown in FIG. 54. A sample point S(i, k) is defined on the image contour F(i), and cell position points Q(i, 1), . . . , Q(i, j), Q(i, j+1), . . . , Q(i, J) are defined on the cell position line f(i). Here, object light components are emitted toward the respective cell position points Q from the sample point S(i, k) and the original image is defined so that these object light components differ according to the direction of emission.

Figure 55A:
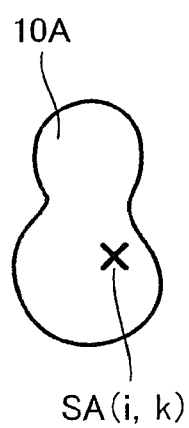
FIGS. 55A and 55B show front views of two stereoscopic images that are actual entities of the original image in FIG. 54.
Figure 55B:
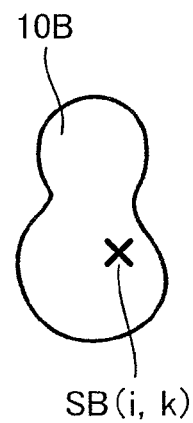

Specifically, as shown in FIGS. 55A and 55B, two original images 10A and 10B of the same shape and same size are prepared. At respective portions of surfaces of these original images, predetermined pixel values (pixel values of a broad meaning that includes not only pixel values that indicate so-called gray-scale or color values but also includes, for example, parameters that indicate reflectance, etc.) are defined. Here, a pixel value defined on the surface of the original image 10A and a pixel value defined on the surface of the original image 10B are defined to be different pixel values that are separate and independent. Thus a pixel value defined at the position of a sample point SA(i, k) shown in FIG. 55A is a completely different value from a pixel value defined at the position of a sample point SB(i, k) shown in FIG. 55B.

Although an object light component emitted toward each of the cell position points Q from the sample point S(i, k) is determined based on the pixel value defined at the position of the sample point S(i, k), in this process, one of either the pixel value defined at the sample point SA(i, k) or the pixel value defined at the sample point SB(i, k) is selected based on the emission direction, and the object light component is defined based on the selected pixel value. For example, as shown in FIG. 54, a normal N is set at the position of the sample point S(i, k) on the image contour F(i), and with the normal N as a boundary, the pixel value defined at the position of the sample point SA(i, k) is selected in the case of an object light component propagating toward the upper side of the figure and the pixel value defined at the position of the sample point SB(i, k) is selected in the case of an object light component propagating toward the lower side of the figure. By doing so, in the case of the illustrated example, the object light components that reach the cell position points Q(i, 1), ..., Q(i, j) become the object light components based on the pixel values defined at the position of the sample point SA(i, k), and the object light components that reach the cell position points Q(i, j+1), ..., Q(i, J) become the object light components based on the pixel values defined at the position of the sample point SB(i, k).

That is, with this first example, the original image is defined as a set of sample points, each having a plurality of types of pixel values, a rule for selecting one of the pixel values according to the emission direction is set, and the emitted object light component is determined based on the selected pixel value.

Figure 56:
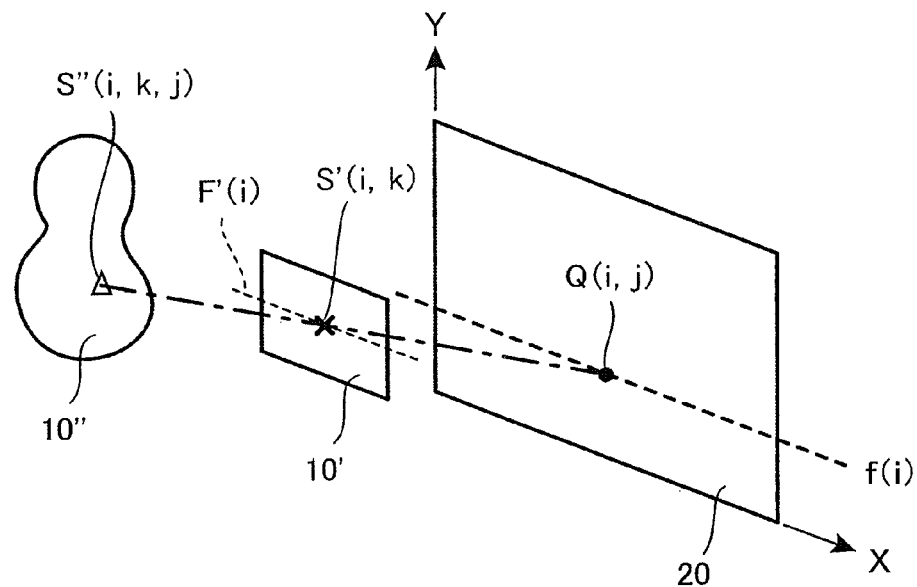
FIG. 56 is a perspective view of a second example of defining an original image that emits different object light components according to direction.

A second example is an original image that is used in a method disclosed in Japanese Unexamined Patent Publication No. 2004-264839A. Here, a case of defining a main original image 10' and a sub-original image 10" as an original image and recording these onto the recording plane 20 as shown in FIG. 56 shall be considered. Here, although the main original image 10' is a plane, on which sample points S'(i, k) that are distributed in a discrete manner are defined, no pixel value whatsoever is defined for each sample point S'(i, k) itself. Each sample point S'(i, k) that is defined on the main original image 10' simply functions as a point that indicates a discrete position distribution. Meanwhile, the sub-original image 10" is an image with the properties of a proper original image, and predetermined pixel values are defined at respective portions of its surface.

When the original image has thus been defined by the two images of the main original image 10' and the sub-original image 10", recording onto the recording plane 20 is performed as follows. Here, a case of performing a computation concerning a cell position point Q(i, j) on the recording plane 20 shall be considered. In this case, an object light component that propagates from the sample point S'(i, k), defined on the main original image 10', toward the cell position point Q(i, j) must be defined, and in this process, the object light component is determined based on a pixel value defined for an intersection S"(i, k, j) of a straight line, joining the cell position point Q(i, j) and the sample point S'(i, k), with the sub-original image 10". That is, an object light component, propagating from a certain sample point of the main original image 10' toward a certain cell position point Q, is determined based on the pixel value defined at the intersection of "a straight line joining the cell position point Q and the certain sample point" with the "sub-original image 10"." By defining the object light components thus, object light components that are emitted from the same sample point S'(i, k) are made to differ mutually in content according to the cell position point Q that is the destination.

Figure 57:
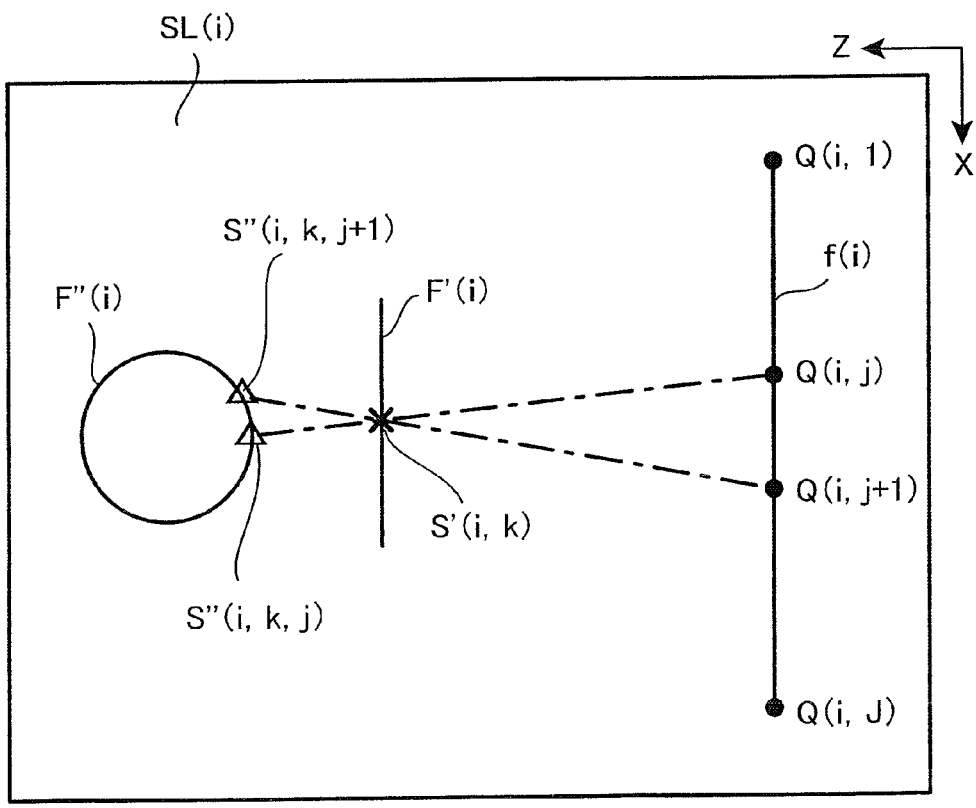
FIG. 57 is a plan view for describing a method for recording onto a recording plane by using the original image shown in FIG. 56.

This point shall now be described in more detail using FIG. 57. FIG. 57 is a plan view of a state where an image contour F'(i) of the main original image 10', an image contour r(i) of the sub-original image 10", and a cell position line f(i) are defined on an i-th slice plane SL(i). The sample point S'(i, k) is defined on the image contour F'(i) of the main original image 10', and cell position points Q(i, 1), ..., Q(i, j), Q(i, j+1), ..., Q(i, J) are defined on the cell position line f(i). In this case, the object light component that propagates from the sample point S'(i, k), defined on the main original image 10', toward the cell position point Q(i, j) is determined based on the pixel value defined at the intersection S"(i, k, j) of the straight line, joining the cell position point Q(i, j) and the sample point S'(i, k), with the sub-original image 10". However, an object light component that propagates from the sample point S'(i, k), defined on the main original image 10', toward the cell position point Q(i, j+1) is determined based on the pixel value defined at an intersection S"(i, k, j+1) of a straight line, joining the cell position point Q(i, j+1) and the sample point S'(i, k), with the sub-original image 10". Thus even though being object light components that are emitted from the same sample point S'(i, k), the object light component propagating toward the cell position point Q(i, j) and the object light component propagating toward the cell position point Q(i, j+1) become different object light components.

(3) Modification Example of a Method for Determining the Area of the Effective Region E With the present invention, with each individual three-dimensional cell, a diffraction grating is formed in an effective region E with an area that is in accordance with an amplitude A. For this purpose, with the embodiment described in Section 6, the square value $A^2$ of the amplitude A is determined for all cell position points Q, and upon performing normalization using the maximum value $A^2$max as the maximum area, the area of the effective region E is determined for each cell. Thus for a three-dimensional cell to be positioned at each individual cell position point Q, a region corresponding to "$A^2/A^2$max" of the total area (Cv×Ch) of a grating forming surface is set as the effective region E.

However, because in actuality the frequency of occurrence of a cell position point Q for which a value close to the maximum value $A^2$max is obtained is extremely low, when the area of the effective region E of each cell is determined by the method according to the embodiment described in Section 6, the proportion of the effective region E becomes small and only a reproduction image that is dark overall can be obtained in many cases. Thus for practical use, it is preferable to set a predetermined value $A^2$base such that $A^2$max≧$A^2$base, and to make the effective region E a region corresponding to "$A^2/A^2$base" of the total area (Cv×Ch) of a grating forming surface (a region corresponding to the total area in the case where "$A^2$>$A^2$base).

For example, consider a case where $A^2$base is set equal to 100 when the maximum value $A^2$max=128. In this case, for a cell for which $A^2$=50 is obtained, a region that is 50% of the total area of the grating forming surface becomes the effective region E, for a cell for which $A^2$=100 is obtained, a region that is 100% of the total area of the grating forming surface becomes the effective region E, and for a cell for which $A^2$ exceeds 100, a region that is 100% of the total area of the grating forming surface becomes the effective region E. The embodiment described in Section 6 can be said to be an example where the setting, $A^2 max = A^2 base$, is implemented.

(4) Examples of Carrying Out Dimension Design in Consideration of a Mass Production Process Thus far, dimension setting methods and specific dimension values for the respective portions of three-dimensional cells that constitute an optical element according to the present invention have been indicated. Obviously because these dimensions are dimensions of an optical element (for example, a hologram recording medium) itself that is presented as a final product, in terms of designing an original production master to be used in performing mass production, it is preferable to carry out dimension design in consideration of a mass production process using this original production master.

For example, in a case where an original production master is prepared from a material with durability and a relief structure of this original production master is transferred onto an ultraviolet curable resin or thermosetting resin to mass produce copies of the original production master, the depths of the grooves of recessed portions of the copied mass-produced product tend to be shallower than the initial design dimensions of the original production master. Thus in the case where such a mass production process is performed, the changes of the uneven dimensions in the process of transfer/copying are taken into consideration in the dimension design of the original production master so that the dimensions of the mass-produced product after transfer become the optimal dimensions.

(5) Example of Using a Diffraction Grating That Does Not use a Relief Structure

Although with the three-dimensional cells used in the embodiments described thus far, a diffraction grating is formed by a physical, relief structure, the diffraction grating does not necessarily have to be formed by a relief structure. For example, a diffraction grating can be formed by forming a dark-and-light stripe pattern on one surface of a three-dimensional cell with a rectangular parallelepiped shape, or a diffraction grating can be formed by alternately lining up stick-like structures, respectively formed of two materials that differ in refractive index, in a gapless manner.

What is claimed is:

1. A method for manufacturing an optical element that comprises a set of a plurality of three-dimensional cells and is enabled to reproduce an original image, the optical element manufacturing method comprising:

an original image defining step of defining, in a three-dimensional space, the original image that emits a predetermined object light;

a recording plane defining step of defining, in the three-dimensional space, a recording plane for recording the original image;

a slice plane defining step of defining a plurality N of slice planes, each constituted of a plane that enables slicing of the original image and the recording plane;

an image contour defining step of defining image contours each of which is located at each sliced portion obtained by slicing the original image by each slice plane;

a sample point defining step of defining a plurality of sample points S on each of the image contours;

a cell position line defining step of defining cell position lines each of which is located at each sliced portion obtained by slicing the recording plane by each slice plane;

a cell position point defining step of defining a plurality of cell position points Q on each of the cell position lines;

an associated sample point determining step of associating an image contour and a cell position line defined by slicing by a same slice plane and determining, for each cell position point Q, sample points S on an image contour which is associated with a cell position line to which said cell position point Q belongs, as associated sample points;

an amplitude and phase computing step of determining by computation, for said each cell position point Q, an amplitude A and a phase θ at a predetermined time of a synthetic wave of object light components, among object light components emitted from the associated sample points, that reach a position of said each cell position point Q;

a three-dimensional structure determining step of determining a three-dimensional structure comprising a set of a plurality of the three-dimensional cells positioned on the recording plane, as structures of the three-dimensional cells to be positioned at positions of the respective cell position points Q, on the basis of specific amplitudes A and specific phases θ determined for respective cell position points Q on the recording plane, by determining a structure of a three-dimensional cell on which a diffraction grating having a phase that is in accordance with a specific phase θ is formed in an effective region with an area that is in accordance with a specific amplitude A; and an element forming step of forming a physical optical element having the determined three-dimensional structure; wherein in the three-dimensional structure determining step, a particular direction parallel to the recording plane is defined and a reference position is defined for each individual three-dimensional cell, and a structure of a three-dimensional cell, on which a diffraction grating, having a periodic structure in the particular direction is formed, is defined, wherein a diffraction grating is formed so as to be positioned in a position shifted by a spatial positional phase in accordance with the phase θ in the particular direction from said reference position in each individual three-dimensional cell.

2. The optical element manufacturing method according to claim 1, wherein in the original image defining step, a three-dimensional stereoscopic image or a two-dimensional planar image is defined as the original image.

3. The optical element manufacturing method according to claim 1, wherein in the original image defining step, an original image that emits object light components that differ according to direction is defined.

4. The optical element manufacturing method according to claim 3, wherein in the original image defining step, an original image is defined as a set of sample points, each having a plurality of types of pixel values, a rule for selecting one of the pixel values according to an emission direction is set, and an emitted object light component is determined based on a selected pixel value.

5. The optical element manufacturing method according to claim 3, wherein in the original image defining step, an original image is defined by a main original image, in which sample points that are distributed in a discrete manner are defined, and a sub original image, in which predetermined pixel values are defined at respective portions of surface, and an object light component, propagating from a certain sample point to a certain cell position point Q, is determined based on a pixel value defined at an intersection of a straight line, joining the certain cell position point Q and the certain sample point, and the sub original image.

6. The optical element manufacturing method according to claim 1, wherein a recording plane, comprising a plane, is defined in the recording plane defining step, a plurality of N of slice planes, comprising mutually parallel planes, are defined in the slice plane defining step, and N cell position lines, comprising mutually parallel straight lines, are defined on the recording plane in the cell position line defining step.

7. The optical element manufacturing method according to claim 6, wherein N slice planes, positioned at a fixed pitch Pv and orthogonal to the recording plane, are defined in the slice plane defining step, N cell position lines, positioned at the fixed pitch Pv, are defined on the recording plane in the cell position line defining step, cell position points Q, positioned at a fixed pitch Ph, are defined on each cell position line, to thereby define cell position points Q positioned in a two-dimensional matrix form at a vertical direction pitch Pv and a horizontal direction pitch Ph on the recording plane in the cell position point defining step, and a three-dimensional structure, in which three-dimensional cells, each having a rectangular parallelepiped basic shape, with a vertical dimension Cv equal to the pitch Pv and a horizontal dimension Ch equal to the pitch Ph, are positioned on the two-dimensional matrix, is determined in the three-dimensional structure determining step.

8. The optical element manufacturing method according to any of claim 1, wherein in the amplitude and phase computing step, a computation is performed with which a restriction is applied to an emission angle of object light components emitted from each associated sample point.

9. The optical element manufacturing method according to any of claim 1, wherein in the amplitude and phase computing step, an amplitude attenuation term of an object light component emitted from a line light source is used to compute an attenuation amount of an amplitude of an object light component propagating from a sample point S to a cell position point Q.

10. The optical element manufacturing method according to claim 9, wherein when for an object light component, emitted from a k-th sample point S(k), wherein k=1 to K, among a total of K sample points that emit object light components reaching a predetermined cell position point Q, a wavelength of the object light component is) λ, an amplitude of the object light component at a position separated by just a unit distance from the sample point S(k) is Ak, a phase of the object light component at the sample point S(k) is θ k, and a distance between the cell position point Q and the k-th sample point S(k) is rk, a synthetic complex amplitude, at the cell position point Q, of object light components from K sample points is defined by a formula:

$$\Sigma(k=1 \sim K)(Ak/\sqrt{rk}\cdot\cos(\theta k \pm 2\pi rk/\lambda) + iAk/\sqrt{rk}\cdot\sin(\theta k \pm 2\pi rk/\lambda));$$

and an amplitude A and a phase θ at the cell position point Q are determined by computation using said formula.

11. The optical element manufacturing method according to claim 1, wherein in the three-dimensional structure determining step, the structure of each three-dimensional cell is determined by positioning a diffraction grating, having a relief structure surface on which a same uneven shape variation is repeated at a predetermined period ξ, at a position of a phase θ with respect to a reference position defined respectively for each three-dimensional cell, inside an effective area with an area that is in accordance with an amplitude A.

12. The optical element manufacturing method according to claim 11, wherein in the three-dimensional structure determining step, three-dimensional cells, each having a rectangular parallelepiped basic shape that has a vertical dimension Cv, a horizontal dimension Ch, and a depth dimension Cd and includes a grating forming surface with a rectangular shape, a dimension of vertical sides of the grating forming surface being Cv and a dimension of horizontal sides of the grating forming surface being Ch, are positioned so that the grating forming surface is parallel to the recording plane and the horizontal sides are parallel to a cell position line, an effective region, comprising a portion having an area that is in accordance with the amplitude A, and a blank region, comprising a portion other than the effective region, are defined on each grating forming surface, and a structure of each three-dimensional cell is determined by positioning a diffraction grating, having a relief structure surface, on the effective region.

13. The optical element manufacturing method according to claim 12, wherein in the three-dimensional structure determining step, an effective region with a rectangular shape, having a vertical dimension Ce and a horizontal dimension Ch, is defined, wherein the horizontal dimension Ch of the effective region equals the horizontal dimension Ch of the cells so that an area of the effective region of each individual three-dimensional cell is defined by the vertical dimension Ce.

14. The optical element manufacturing method according to claim 12, wherein in the three-dimensional structure determining step, a square value $A^2$ of the amplitude A is determined for all cell position points Q defined on the recording plane, $A^2$max is defined as a maximum value of the square values $A^2$, a value $A^2$base such that $A^2$max≧$A^2$base is set, and for each three-dimensional cell to be positioned at an individual cell position point Q, an effective region is made a region corresponding to "$A^2/A^2$base" of a total area of a grating forming surface, wherein a region corresponds to a total area of grating forming surface when "$A^2$>$A^2$base".

15. The optical element manufacturing method according to claim 12, wherein in the three-dimensional structure determining step, a diffraction grating is formed so that an uneven shape variation occurs in a direction orthogonal to a cell position line.

16. The optical element manufacturing method according to claim 15, wherein in the three-dimensional structure determining step, a slope, a depth of which monotonously decreases continuously from a deepest portion to a shallowest portion, is formed in a periodic section of a length ξ along a direction orthogonal to a cell position line, and a relief structure surface is formed by setting the slope repeatedly.

17. The optical element manufacturing method according to claim 16, wherein in the three-dimensional structure determining step, a standard observation condition, premised on using a reconstruction illumination light of a predetermined standard wavelength λ, is set, and a depth h from the shallowest portion to the deepest portion of the slope is set so that under the standard observation condition, a phase difference, between a light component reaching an observation position via the deepest portion and a light component reaching the observation position via the shallowest portion, is 2π.

18. The optical element manufacturing method according to claim 17, wherein in the element forming step, a relief structure surface is formed on a top surface of a light transmitting layer made of a substance having a refractive index n2, so that a reconstruction illumination light, transmitted through the light transmitting layer, is observed, and in the three-dimensional structure determining step, supposing that the optical element is used in a space filled with a substance having a refractive index n1, h is set to a value determined by: "$h=\lambda/|n2-n1|$".

19. The optical element manufacturing method according to claim 17, wherein in the element forming step, a relief structure surface is formed as an interface of a first light transmitting layer made of a substance having a refractive index n1, and a second light transmitting layer made of a substance having a refractive index n2, so that a reconstruction illumination light, transmitted through both the first light transmitting layer and the second light transmitting layer, is observed, and in the three-dimensional structure determining step, h is set to a value determined by: "$h=\lambda/|n2-n1|$".

20. The optical element manufacturing method according to claim 17, wherein in the element forming step, a relief structure surface is formed on a top surface of a reflecting layer having a property of reflecting a reconstruction illumination light, so that the reconstruction illumination light reflected by the reflecting layer is observed, and in the three-dimensional structure determining step, supposing that the optical element is used in a space filled with a substance having a refractive index n1, h is set to a value determined by: "$h=\lambda/(2\times n1)$".

21. The optical element manufacturing method according to claim 20, wherein the reflecting layer is formed only inside the effective region of each three-dimensional cell and is not formed inside the blank region.

22. The optical element manufacturing method according to claim 17, wherein in the element forming step, a relief structure surface is formed as an interface of a light transmitting layer made of a substance having a refractive index n2, and a reflecting layer having a property of reflecting a reconstruction illumination light, so that the reconstruction illumination light, transmitted through the light transmitting layer, reflected by the reflecting layer, and transmitted again through the light transmitting layer, is observed, and in the three-dimensional structure determining step, h is set to a value determined by: "$h=\lambda/(2\times n2)$".

23. The optical element manufacturing method according to claim 22, wherein the reflecting layer is formed only inside the effective region of each three-dimensional cell and is not formed inside the blank region.

24. The optical element manufacturing method according to claim 17, wherein in the element forming step, a relief structure surface is formed on a top surface of a light transmitting layer made of a substance having a refractive index n2, and a reflecting layer having a property of reflecting a reconstruction illumination light is formed on a surface of the light transmitting layer at an opposite side of the relief structure surface, so that the reconstruction illumination light, transmitted through the light transmitting layer, reflected by the reflecting layer, and transmitted again through the light transmitting layer, is observed, and in the three-dimensional structure determining step, supposing that the optical element is used in a space filled with a substance having a refractive index n1, h is set to a value determined by: "$h=\lambda/(2\times|n2-n1|)$".

25. The optical element manufacturing method according to claim 24, wherein the reflecting layer is formed only inside the effective region of each three-dimensional cell and is not formed inside the blank region.

26. The optical element manufacturing method according to claim 17, wherein in the element forming step, a relief structure surface is formed as an interface of a first light transmitting layer made of a substance having a refractive index n1, and a second light transmitting layer made of a substance having a refractive index n2, and a reflecting layer having a property of reflecting a reconstruction illumination light is formed on a surface of the second light transmitting layer at an opposite side of a surface in contact with the first light transmitting layer, so that the reconstruction illumination light, transmitted through both the first light transmitting layer and the second light transmitting layer, reflected by the reflecting layer, and transmitted again through both the first light transmitting layer and the second light transmitting layer, is observed, in the three-dimensional structure determining step, h is set to a value determined by: "$h=\lambda/(2\times|n2-n1|)$".

27. The optical element manufacturing method according to claim 26, wherein the reflecting layer is formed only inside the effective region of each three-dimensional cell and is not formed inside the blank region.

28. The optical element manufacturing method according to claim 15, wherein in the three-dimensional structure determining step, a staircase, a depth of which monotonously decreases in stepwise manner from a deepest portion to a shallowest portion, is formed in a periodic section of a length along a direction orthogonal to a cell position line, and a relief structure surface is formed by setting the staircase repeatedly.

29. The optical element manufacturing method according to claim 28, wherein in the three-dimensional structure determining step, a standard observation condition, premised on using a reconstruction illumination light of a predetermined standard wavelength $\lambda$, is set, and a slope, with which a depth from a shallowest portion to a deepest portion is h and the depth from the deepest portion to the shallowest portion monotonously decreases continuously and is set so that under the standard observation condition, a phase difference, between a light component reaching an observation position via the deepest portion and a light component reaching the observation position via the shallowest portion, is $2\pi$, is defined, and a staircase approximating the slope is positioned to form a relief structure surface.

30. The optical element manufacturing method according to claim 12, wherein in the three-dimensional structure determining step, the standard observation condition is set on a premise of observing from a predetermined observation direction when a reconstruction illumination light of a predetermined standard wavelength $\lambda$ is illuminated from a predetermined illumination direction onto the optical element, the period $\xi$ of an uneven shape variation of the diffraction grating is set to a value suited for obtaining a diffraction angle required to guide light, made incident from the illumination direction, to the observation direction, the vertical dimension Cv of each three-dimensional cell is set to a value no less than a dimension necessary for the diffraction grating to give rise to an adequate diffraction phenomenon, and the horizontal dimension Ch of each three-dimensional cell is set to a value no less than a dimension necessary for obtaining a required stereoscopic angle in a horizontal direction.

31. The optical element manufacturing method according to claim 30, wherein in the three-dimensional structure determining step, the period $\xi$ of the uneven shape variation of the diffraction grating is set in a range of 0.6 to 2 μm, the vertical dimension Cv of each three-dimensional cell is set in a range of 3 to 300 μm, and the horizontal dimension Ch is set in a range of 0.2 to 4 μm.

32. The optical element manufacturing method according to claim 12, wherein in the element forming step, a light blocking layer or a light absorbing layer is formed in the blank region.

* * * * *

UNITED STATES PATENT AND TRADEMARK OFFICE
CERTIFICATE OF CORRECTION

PATENT NO. : 8,395,842 B2
APPLICATION NO. : 13/236123
DATED : March 12, 2013
INVENTOR(S) : Mitsuru Kitamura It is certified that error appears in the above-identified patent and that said Letters Patent is hereby corrected as shown below:

Title Page, item (54), and in the specification, column 1, title: "reordering" should read --recording--.

Signed and Sealed this
Thirtieth Day of April, 2013

Teresa Stanek Rea
*Acting Director of the United States Patent and Trademark Office*